United States Patent [19]
Fujawa et al.

[11] Patent Number: 4,594,668
[45] Date of Patent: Jun. 10, 1986

[54] TURBOCHARGER CONTROL SYSTEM

[75] Inventors: Charles S. Fujawa; Sara B. Masteller, both of South Bend, Ind.

[73] Assignee: Allied Corporation, Morristown, N.J.

[21] Appl. No.: 467,069

[22] Filed: Feb. 16, 1983

[51] Int. Cl.$^4$ ............... F02D 23/00; F02B 37/12
[52] U.S. Cl. .................. 364/431.02; 60/603; 123/564
[58] Field of Search ............ 364/431.01, 431.02; 60/600, 601, 602, 603; 123/564; 290/52

[56] References Cited

U.S. PATENT DOCUMENTS

| | | | |
|---|---|---|---|
| 4,292,806 | 10/1981 | Moore et al. | 60/600 |
| 4,292,807 | 10/1981 | Rannenberg | 60/601 |
| 4,428,199 | 1/1984 | Moore et al. | 60/600 |
| 4,467,607 | 8/1984 | Rydquist et al. | 60/602 |
| 4,468,928 | 9/1984 | Suzuki | 60/602 |
| 4,473,055 | 9/1984 | Ito et al. | 60/600 X |
| 4,490,622 | 12/1984 | Osborn | 290/52 |

FOREIGN PATENT DOCUMENTS 46872 3/1982 European Pat. Off. ............ 60/600

*Primary Examiner*—Felix D. Gruber
*Attorney, Agent, or Firm*—Ronald D. Welch; Ken C. Decker

[57] ABSTRACT

An electronic control (10) for generating control, diagnostic, and fault signals for a diesel engine (12) with a turbocharger (22) and an injection pump (14). The control (10) provides an injection pump control (78), a turbocharger control (80), a fault monitor (82) and a sequencing control (84). These controllers are embodied as a stored program of a microprocessor controlled processor, timing, and memory module (228). The module (228) communicates with an input section receiving analog and discrete inputs via a serial input data line (CRUIN) and further communicates with an output section generating analog and discrete outputs via a serial output data line (CRUOUT).

21 Claims, 39 Drawing Figures

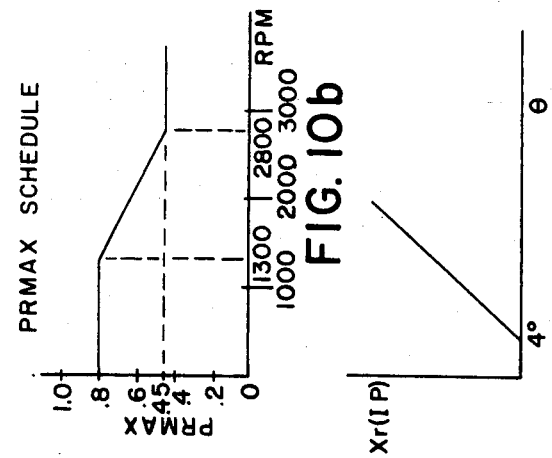
FIG. 10b
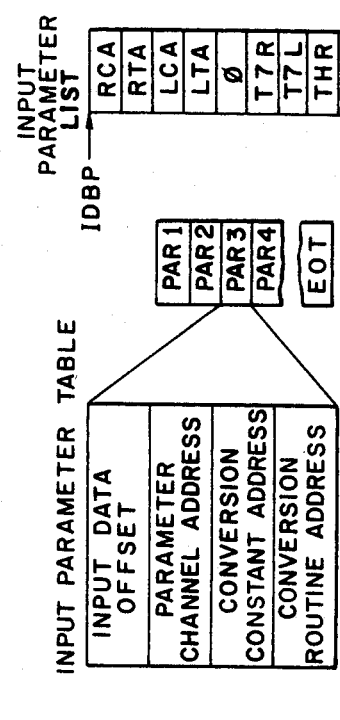
FIG. 10a
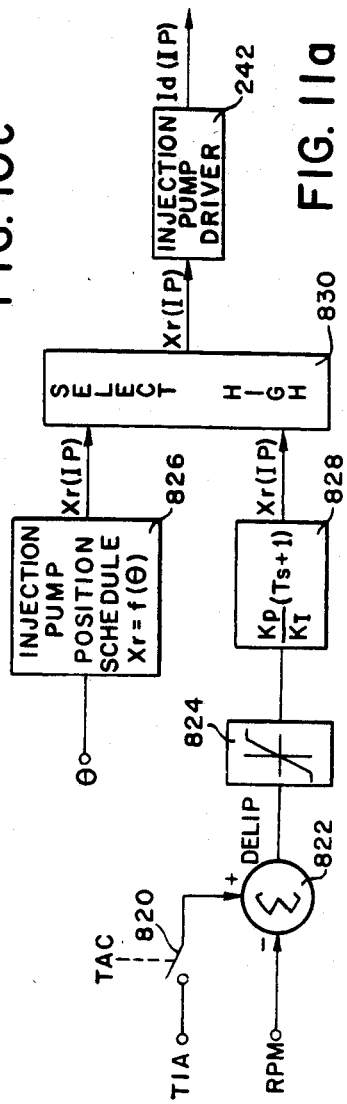
FIG. 10c
FIG. 11a
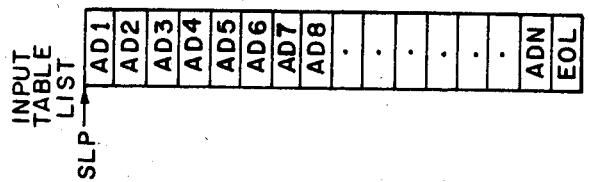

INPUT WORD—DISIN

| 0 | 1 | 2 | 3 | 4 | 5 | 6 | 7 |
|---|---|---|---|---|---|---|---|
|   |   | TACTICAL IDLE | FAULT RESET | AUTO/MANUAL | FLAME HEATERS | SHUT-DOWN | START |
|   |   |   |   |   |   |   |   |
| 8 | 9 | 10 | 11 | 12 | 13 | 14 | 15 |

OUTPUT WORD—DISOUT

| 0 | 1 | 2 | 3 | 4 | 5 | 6 | 7 |
|---|---|---|---|---|---|---|---|
| FLAME HEATERS | REAR FUEL PMP | CUT OFF | ACCESS RELAY | RUN TIME METER | VAT FAULTY | LOW VOLT MONITOR | PRESSURE LAMP |
|   |   |   |   | VAT SEN FAULT | OVER TEMP | OIL PRIM PUMP | FUEL SHUT OFF |
| 8 | 9 | 10 | 11 | 12 | 13 | 14 | 15 |

FIRST FLAG WORD—FWRDL

| 0 | 1 | 2 | 3 | 4 | 5 | 6 | 7 |
|---|---|---|---|---|---|---|---|
| TIMER A | TIMER B | TIMER C | TIMER D | TIMER E | TIMER F | SHUT DOWN LATCH | START LATCH |
| N LE N1 | N LE N2 | N GT N3 |   | FLAME HTR LTCH |   |   |   |
| 8 | 9 | 10 | 11 | 12 | 13 | 14 | 15 |

SECOND FLAG WORD—FWRDL2

| 0 | 1 | 2 | 3 | 4 | 5 | 6 | 7 |
|---|---|---|---|---|---|---|---|
| START TIMER | STOP TIMER | T7L FAULT | T7R FAULT | PRR FAULT | NDOT >205 | PRL FAULT |   |
|   |   |   | RPM FAULT | LCA FAULT | RCA FAULT | LTA FAULT | RTA FAULT |
| 8 | 9 | 10 | 11 | 12 | 13 | 14 | 15 |

FIG. 12

TURBOCHARGER CONTROL SYSTEM

The invention relates generally to turbocharger control systems and is more particularly directed to a turbocharger control system that accounts for rapid engine accelerations without surging the compressor of the turbocharger.

Turbochargers are used to increase the output power of many internal combustion engines in excess of that available from a similar normally aspirated engine. The turbocharger uses the energetic exhaust gases from the engine to power a turbine which is rotationally coupled to a compressor. The compressor boosts the pressure in the intake manifold of the engine, thereby adding density to each ingested air charge and providing more available power from the increased oxygen available per stroke.

However, the sizing of a turbocharger for any particular engine is difficult. When a turbocharger is small enough to work efficiently at high engine speeds, not enough boost is delivered at low speeds and when the turbocharger is large enough to work efficiently at low engine speeds, the engine will be overboosted in its high speed range. The prior art has attempted to solve this problem in a number of ways. In some cases the sizing of the turbocharger was a compromise between efficient operation at a particular speed and a deviation from this most efficient operation at all other speeds. If the engine must operate over a significant range of speeds, this solution creates much inefficiency.

Another method has been to provide a wastegate that is opened to divert a portion of the exhaust gases around the turbine, thus controlling the rotational speed of the compressor and boost pressure. A significant portion of the available energy at high speeds is wasted by this method. This method additionally uses a turbomachine that is larger than one which would be desired at higher speeds and produces an undue backpressure.

The preferred solution to this problem is to provide a variable machine in which the geometry of both the turbine and compressor can be varied. By varying the geometry, the output boost pressure may be controlled over the entire speed and load range of the engine. In such devices the configuration of the turbomachine can be varied to provide a small output machine at low speeds and airflows and a large output machine at high speeds and airflows.

U.S. Pat. No. 4,292,807 illustrates one such variable geometry turbocharger system. The geometry variation is accomplished mechanically by a single actuator regulating the compressor discharge diffuser housing and the turbine inlet nozzle housing in a fixed relationship. This system has the inherent disadvantages of an open loop mechanical system in addition to the disadvantage of the dependent variance of the turbine and compressor geometry. A more dynamic response from the system could be accomplished if the geometry were independently variable.

U.S. Pat. No. 4,292,806 illustrates another variable geometry turbocharger system in which the turbine and compressor geometry are independently variable. This system additionally provides electrically operated actuator devices for positioning the geometry of the turbine and compressor. Each actuator device is controlled in a closed loop manner from the error signal between an electronically derived position request and an electronic signal indicative of the actual position of the actuator.

This turbocharger control system, while improving efficiency to some degree, still lacks the dynamic response that is needed to bring about a rapid change in output power which should be available with a turbocharged engine. This is because the change in output power caused by the turbocharger (as opposed to that being caused by an increase in engine speed) must be regulated in such a manner so as not to surge the compressor.

SUMMARY OF THE INVENTION

In accordance with the invention, a turbocharger control system for a variable geometry turbomachine, including independently regulated turbine and compressor geometry is provided.

The turbine geometry is operated by a turbine actuator in a closed loop manner by providing an actuator position request to a proportional actuator loop feeding back the actual actuator position. The turbine actuator moves the turbine geometry in a direction to null the difference between the request and actual position.

The turbine position request is developed as the output of a proportional plus integral control operating upon an error signal derived as a function of the difference between a desired optimum manifold pressure and the actual manifold pressure. The desired optimum manifold pressure is derived from a look-up table having a pressure value scheduled as a function of turbine inlet (exhaust gas) temperature and engine speed. In a preferred diesel engine embodiment, this produces a schedule of optimum manifold pressure as a function of engine load.

Additionally, means are provided for limiting the turbine actuator position request as a function of engine speed. Because the turbine actuator position request is indicative of manifold pressure at a constant engine speed, this limit provides a maximum manifold pressure limit for a given engine speed.

The proportional plus integral control provides not only an extremely rapid response for increasing the manifold pressure during transient conditions with the proportional part but also provides a precise control on manifold pressure during the steady state by integrating the error difference to zero with the integral part.

The compressor geometry is operated by a compressor actuator in a closed loop manner by providing an actuator position request to a proportional actuator loop feeding back the actual actuator position. The compressor actuator moves the compressor geometry in a direction to null the difference between the request and the actual position.

The compressor position request is developed from a selection between two schedules based upon the acceleration of the engine. A low position request is scheduled as a function of engine RPM and provides for positioning of the geometry during rapid engine speed increases such that the compressor will not surge. A high position request is scheduled as a function of engine RPM such that it provides the most efficient point of operation for the compressor at a relatively steady state engine speed.

A means for selecting between the two schedules is provided which measures engine acceleration. When the engine is accelerating above a certain level the low position request is scheduled. The low request is scheduled until the acceleration drops below the predetermined level and thereafter the compressor actuator position request is moved from the low request schedule to the high request schedule at a constant velocity. The rate at which the compressor position request moves from the low request schedule to the high request schedule is varied according to an engine operating parameter related to the tendency of the compressor to surge. In the preferred embodiment, this parameter is engine speed above a reference level.

An advantage of the invention is that the combination of the integral plus proportional control regulating the turbine geometry and the scheduling of the compressor geometry based on acceleration provides a facile control that can rapidly deliver optimum power output from the engine quickly without surging the compressor of the turbocharger.

These and other objects, features, and aspects of the invention will be more clearly understood and better described if a reading of the detailed description is undertaken in conjection with the appended drawings, wherein:

BRIEF DESCRIPTION OF THE DRAWINGS

FIG. 10a is a pictorial representation of an input parameter table and list for the program sequence stored in the memory modules illustrated in FIG. 4;

FIG. 10b is a graphical illustration of a schedule for relating a limiting parameter PRMAX as a function of RPM;

FIG. 10c is a graphical illustration of a schedule for relating the injection pump position request Xr(IP) as a function of theta;

FIG. 11a is a detailed system block diagram of the injection pump control illustrated in FIG. 1;

FIG. 12 is a pictorial representation of the bit representation of four 16-bit memory locations in the memory of the processor, timing, and memory module illustrated in FIG. 1 including an input word DISIN, an output word DISOUT, a first flag word FWRDL, and a second flag word FWRDL2;

FIG. 13 is a detailed system flow chart for the real time task monitor illustrated in FIG. 8a;

DETAILED DESCRIPTION OF THE PREFERRED EMBODIMENT

Figure 1:
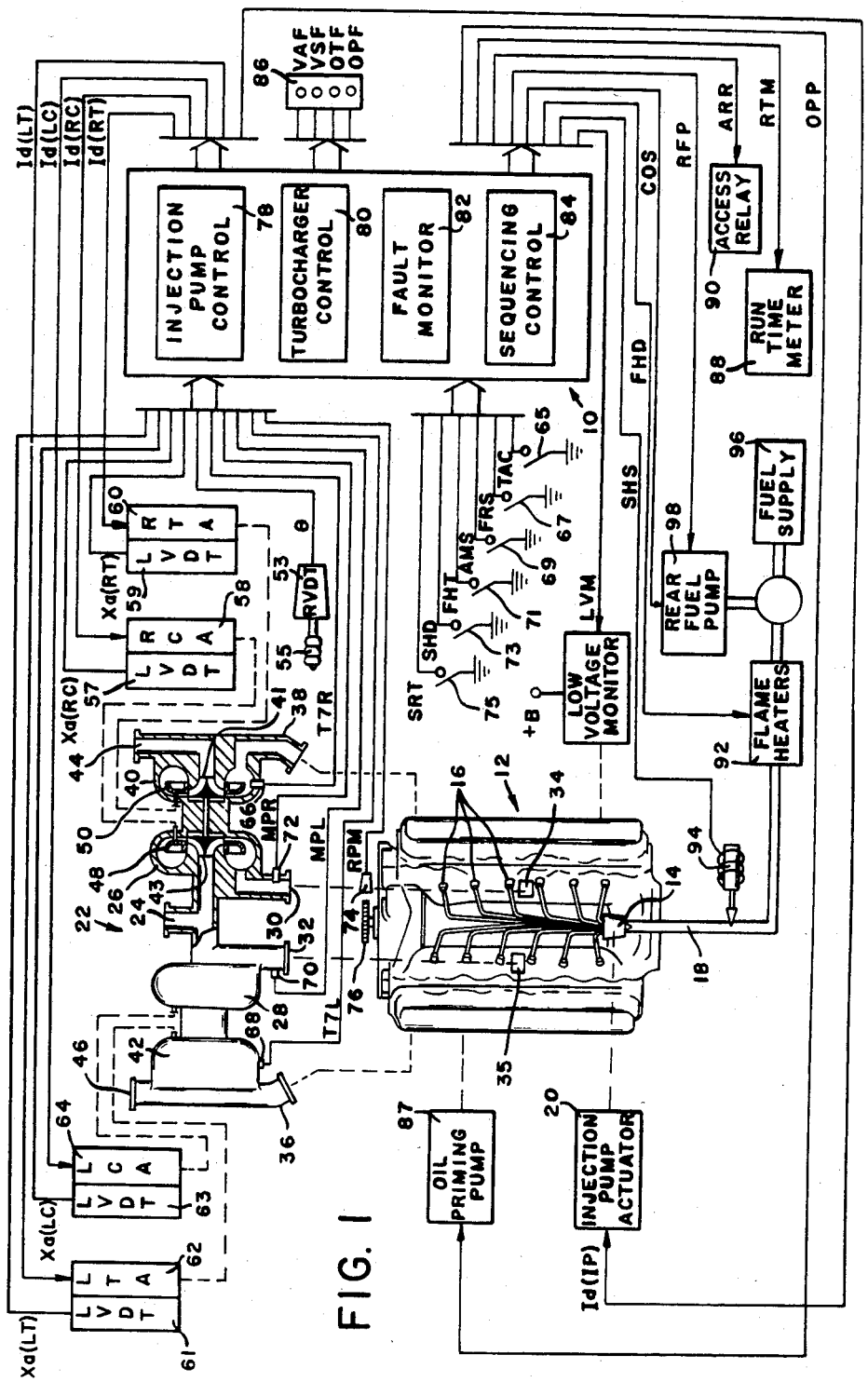
FIG. 1 is a system block diagram of a engine control system for a diesel engine including an injection pump control, a turbocharger control, a fault monitor, and a sequencing control constructed in accordance with the teachings of the invention.

With reference now to FIG. 1 there is shown an electronic control unit 10 for preferably regulating the operating parameters of a V-12 turbocharged diesel engine 12. The diesel engine 12 includes an injection pump 14 as is known in the art to provide fuel flow to the individual cylinders of the engine by means of fuel injectors 16. The amount of fuel which is distributed by each individual injector and hence cylinder is determined by the speed of the engine and the positioning of a fuel metering valve in the injection pump. The fuel metering valve mechanism is positioned by an injection pump actuator 20 controlled by an electrical injection pump driver signal Id(IP). The injection pump actuator 20 and the fuel metering mechanism coact such that fuel flow is substantially proportional to the voltage of the injection pump driver signal Id(IP). Fuel to the injection pump 14 is supplied from a reservoir or fuel supply 96 via a supply conduit 18. In series with the supply conduit is a rear fuel pump 98 used for boosting the fuel pressure during startup and operating conditions. Additionally, in line but surrounding the supply conduit 18 are a plurality of flame heaters 92 which are used to warm the fuel in the conduit to prevent waxing. A fuel shutoff solenoid 94 is provided to effectively cut off fuel flow to the injection pump when energized.

The engine has a dual cylinder bank turbo-charger generally designated 22 which increases the output power of the engine for increased response and operational efficiency. The turbo-charger 22 is partitioned into a left turbo machine turbocharging the left bank of cylinders and a right turbo machine turbocharging the right bank of cylinders for the engine. An intake throat 24 permits air to be drawn from atmospheric pressure and compressed by compressor sections 26 and 28 for the individual cylinder banks. The pressurized air output from the compressors is delivered to the individual banks of cylinders via conduits 30 and 32 which connect to intake manifold entrances 34 and 35, respectively. Exhaust gases from each cylinder bank are routed to conduits 36 and 38 to power the turbine sections 40 and 42 of the turbochargers. After powering the turbines of the separate turbochargers, the exhaust gases are vented to the atmosphere via exhasut pipes 44, 46, respectively.

Each turbo machine, as is shown in the cross-sectional drawing for the right bank, is of variable geometry. This variation in area allows the compressor geometry to be changed for additional airflow upon movement of an output diffuser disc 48 contained in the compressor discharge housing. Similarly, the inlet guide vanes 50 to the turbine wheel 54 of the turbocharger are variable in geometry. This allows a higher or lower pressure drop across the turbine to increase or decrease the speed of the compressor. Generally speaking, as the turbine inlet guide vanes 50 are moved from a position of open area to a position of closed area, an increase in compressor speed takes place for a constant engine speed. On the other hand, an increase in boost pressure and airflow takes place as the output diffuser is moved from a closed position to an open position at a constant compressor speed.

The right compressor output diffuser 48 is positioned electronically by a right compressor actuator (RCA) 58 while the inlet guide vanes 50 are positioned by a right turbine actuator (RTA) 60. The turbocharger for the left bank is similarly configured with a compressor output diffuser and turbine inlet guide vanes which are controlled by left compressor actuator (LCA) 64 and left turbine actuator (LTA) 62, respectively. Associated with each actuator 58, 60, 62, and 64 is a linear variable differential transformer (LVDT) 57, 59, 61, 63, which generates a signal Xa(RC), Xa(RT), Xa(LT), and Xa(LA), respectively, indicative of the actual position of the associated actuator. By positioning each of the four actuators in response to operating conditions of the engine, the turbocharger control of the electronic control unit can regulate the output power of the engine to provide the most efficient operation point for each bank of cylinders and hence the engine.

To sense the operating conditions necessary to determine the best positioning of the variable geometry of the turbochargers, the control system includes a number of sensors that provide indications of the instantaneous operating point of the engine. Mounted in the intake manifold of each respective cylinder bank is a pressure sensor 70, 72 that produces an electrical signal MPL, MPR, respectively, which is an indication of the actual manifold pressure of each bank of cylinders. Additionally, each turbocharger section has a temperature sensor 66 and 68, respectively, for measuring the actual exhaust gas temperature input to the inlet guide vanes of the turbine housing. Another operating parameter of the engine that is measured is actual engine speed by an engine speed signal RPM. The RPM signal is generated with a reluctance-type speed sensor 74 forming a pulse train by measuring the change in reluctance of the rotating notches of a toothed wheel 76 run synchronously with the engine.

Operator inputs to the electronic control 10 include a twist grip 55 which is rotatable to provide an angular indication of an operator-desired engine power. This angular indication is measured by a rotary variable differential transformer (RVDT) 53 to provide an angular signal theta which is indicative of the amount of rotation.

Additionally, the operator may signal the electronic control unit 10 through a number of input switches 65, 67, 69, 71, 73, and 75. The closure of switch 75 generates an SRT signal indicative of desire by the operator to start the engine, while the closure of switch 73 generates a SHD signal indicating the engine should be shutdown. The closure of switch 71 generates a signal FHT which indicates the flame heaters 92 should be operated in a normal manner. The closure of switch 69 generates a signal AMS which indicates whether the flame heaters 92 should be operated automatically or manually. The closure of switch 67 generates a signal FRS which indicates that any system actuator faults that are present should be reset. Switch 65 is closed to provide a signal TAC indicating that a tactical idle mode of operation is desired of the engine.

The electronic control unit 10 generates four main functions including controlling the injection pump 14 with an injection pump control 78, controlling the variable area turbocharger 22 with a turbocharger control 80, providing a fault monitor 82, and providing a sequencing control 84 for the startup and shutdown functions of the engine 12.

The injection pump control 78 generally receives the position signal theta from the twist grip 55 and RVDT 53 and combines it with the RPM signal and the tactical idle signal TAC to produce the injection pump driver signal Id(IP). The turbocharger control 80 basically receives the RPM signal, T7L, T7R, temperature signals, and the left and right pressure signals MPL, MPR along with the actual positions of the actuators 58, 60, 62, and 64 as sensed by LVDTs 57, 59, 61, and 63, to form driver currents Id(RT), (LT), (LC), (RC) which regulate the position of the actuators.

The fault monitor 82 receives the fault reset signal FRS and monitors the temperature T7R, T7L, the pressure MPL, MPR, and RPM signals to verify they are valid information. The monitor additionally provides fail-soft capability for the turbocharger control and operator readable indications of various faults in the system. The fault monitor 82 generates four logic level signals VAF, VSF, OTF, and OPF which are used to energize operator readable devices such as lights in a display 86. The VAF signal is indicative of a turbocharger fault where one or more of the geometry actuators are not functioning properly. The VSF signal is indicative of a turbocharger sensor fault where even if the variable geometry actuators are operating properly, the control will not be able to accurately position the variable geometry. The OTF signal functions as an indication of an over-temperature condition where the exhaust gas temperature of at least one of the cylinder banks is becoming great enough to cause engine and/or turbine damage. The OPF signal is indicative of an over-pressure condition of at least one of the intake manifolds where the boost from the compressor has become too great and engine and/or compressor damage may result.

The sequencing control 84 receives the start signal SRT, the shutdown signal SHD, the flame heater signal FHT, and the automatic/manual signal AMS, to provide an advantageously timed sequence of control outputs for starting the engine 12 and shutting it down. Outputs from the sequencing control include logic level signals OPP, RTM, ARR, RFP, FHD, SHS, COS, and LVM. The OPP signal is used to turn on oil-priming pump 87 on or off depending on the logic level of the signal. The oil-priming pump 87 is used to provide oil pressure for the engine for starting purposes until it has reached an operating speed. The RTM signal is used to turn on or off a runtime meter 88 which accumulates the time of operation for the engine. The ARR signal is used to turn on and off an accessory relay 90 which provides power to the electrical accessories of the vehicle which the engine powers by means of an alternator or generator. The RFP signal is used to latch on the rear fuel pump 98 which is used as a boost to provide an initial pressurization of the injection pump 14 before the engine reaches operational speed. The COS signal is used to unlatch the rear fuel pump 98 by holding the signal in a high level logic state for a predetermined period of time. The FHD signal is used to turn on and off the flame heaters 92 which are used to heat the fuel from the fuel supply and provide an easier starting characteristic for the engine 12. The SHS signal from the sequencing control is used to energize and deenergize the fuel shutoff solenoid 94 whose armature is a valve cutting off the fuel flow through conduit 18 depending upon the state of the solenoid. The LVM signal is used to activate and deactivate the low voltage monitor 77 used in cranking the starter motor of the engine.

Figure 2:
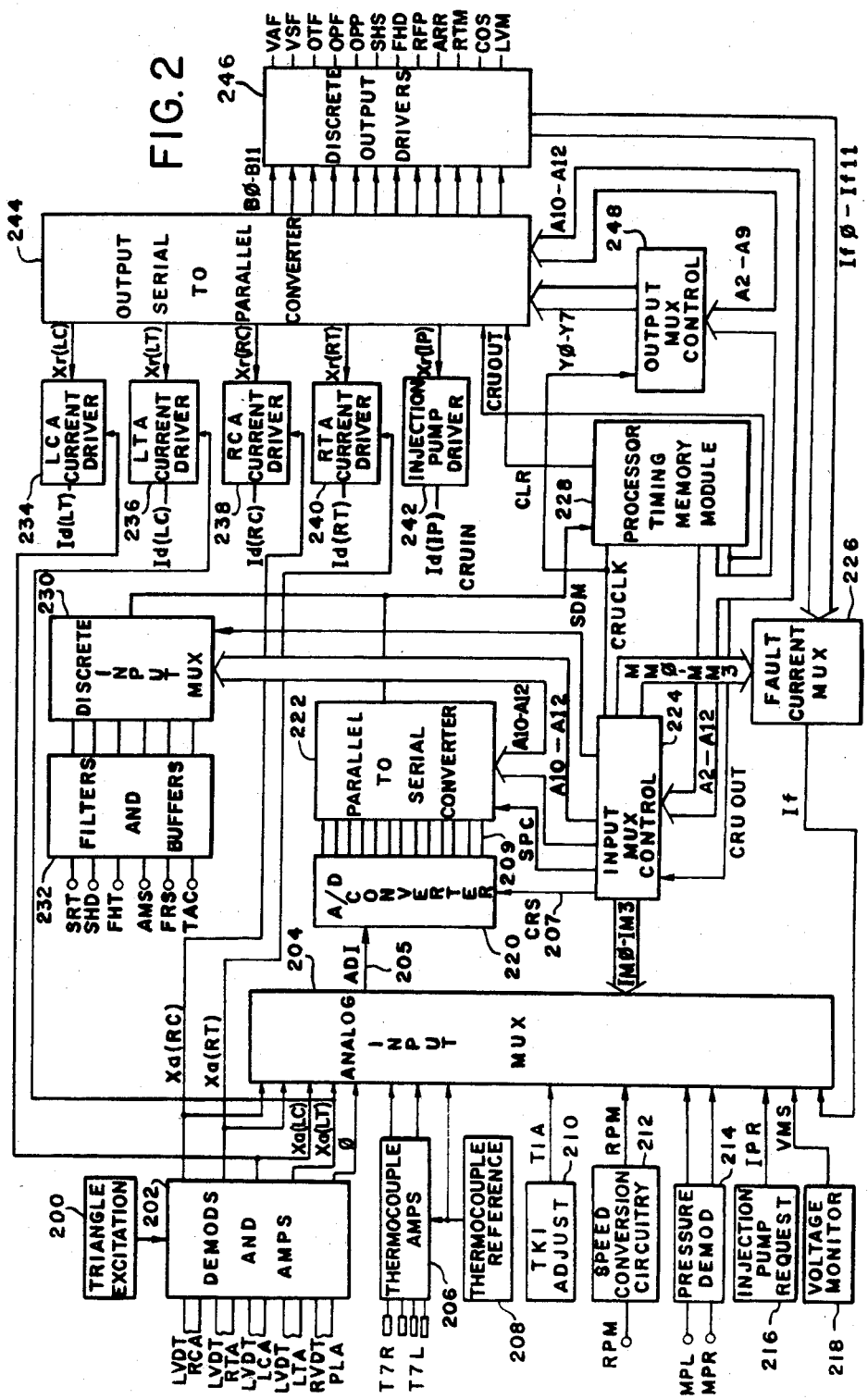
FIG. 2 is a detailed electrical schematic diagram view of the electronic control unit illustrated in FIG. 1.

A detailed electrical schematic block diagram of the electronic control unit 10 is illustrated in FIG. 2. The electronic control unit 10 is configured to efficiently input the discrete and analog signals to a processor, timing, and memory module 228 and thereafter to process that information into control, diagnostic, and fault signals for output as a number analog and discrete outputs. The processor of the module 228 is preferably a microprocessor chip as will be more fully described hereinafter. The signals from the switches form the discrete inputs to the system while the signals from the sensors, LVDTs, RVDT, and other inputs form the analog inputs to the system. The analog outputs of the system are the driver currents for the actuators while the discrete output are the fault indications and logic control signals.

The control unit 10 is divided into an input section and an output section. The input section communicates with the processor, timing, and memory module 228 (hereinafter, the processor module) by means of a serial input data line CRUIN and decodes which bits are brought into the processor module on that line via signals from address bus lines A2–A13 and the system I/O clock CRUCLK. Address line A13 is identified for the output section as CRUOUT. Similarly, the output section is under the control of the address bus lines A2–A12 and a serial output data line CRUOUT. Serial data is provided from the processor module 228 via the CRUOUT line and timing is provided by the system I/O clock CRUCLK. The input and output sections of the control unit are configured to appear as a plurality of single bit memory addresses that can be read from or written into with the serial data lines and the I/O clock. Many modern microprocessor chips have such a serial data capability and utilize special I/O instructions for facilitating data transfer in a real time environment.

This system configuration of performing the input and output functions serially for the processor module 228 is advantageous in that the data bus of the microprocessor remains internal to the processor module. This simplifies the addressing of the input and output destinations and the circuitry necessary to control them. Only the address bus lines A2–A12, the two serial data lines CRUIN, CRUOUT, and the I/O clock control line, CRUCLK need to connect externally to the different input and output circuitry. The multiple connections of all control and data lines of the microprocessor to each printed circuit board having a senior or actuator is thereby avoided.

The input section is generally divided into an analog part including an analog input multiplexer 204, an analog-to-digital (A/D) converter 220, a parallel-to-serial converter 222, and a fault current multiplexer 226 and a digital part including a discrete input multiplexer 230. The analog and digital parts of the input section are controlled from the processor module 228 by means of an input multiplexer control 224. The input multiplexer control 224 provides a channel address IM0–IM3 to the analog input multiplexer 204 to determine the particular analog input ADI to be transmitted via signal line 205 to the A/D converter 220. The input multiplexer control 224, after selection of the analog input channel, provides a conversion signal CRS to the A/D converter 220 to convert the chosed input into a 12-bit digital number. The A/D converter 220 signals the processor module 228 via the CRUIN input data line that the conversion is complete and thereafter the input multiplexer control provides a parallel-to-serial conversion of the data. The serial bits are then read into the processor module 228, one at a time, via the CRUIN data line in synchronism with the I/O clock CRUCLK.

Some of the analog inputs that are received by the processor module 228 are signals representative of the actual position of the various actuators in the system. For example the LVDT signals associated with the right and left compressor actuators, the right and left turbine actuators, and the RVDT signals associated with the twist grip are input to a series of demodulation and amplification circuits 202. The circuitry 202 utilizes a triangular excitation signal to form circuit 200 to demodulate and convert these signals into analog voltages. After being converted to analog voltages representative of the positions of these actuators, each signal is input to a separate port of the analog input multiplexer 204, Xa(RC) is representative of the actual position of the right compressor actuator, Xa(RT) is representative of the actual position of the right turbine actuator, Xa(LC) is representative of the actual position of the left compressor actuator, and Xa(LT) is representative of the actual position of the left turbine actuator.

The variable theta is representative of the actual position of the twist grip.

Additional analog voltage signals are input to the channels of the input multiplexer 204 as the temperature signals T7R, T7L from thermocouple amplifiers 206. The thermocouple amplifiers 206 convert the output voltages from the turbine inlet sensors to temperatures indicative of the left and right cylinder bank exhaust gases. Input to the thermocouple amplifiers 206 is a thermocouple reference voltage 208 which as also input to another port of the multiplexer 204. Additionally, the pulses from the reluctance sensor are input to a speed conversion circuit 212 for conversion into the signal RPM indicative of the actual speed of the engine. Similarly, the pressure sensors communicate with a pressure conversion module 214 to produce the voltage signals MPL, MPR indicative of the actual manifold pressure in the left bank and right bank of cylinders, respectively.

Another analog input to the multiplexer 204 is from a voltage monitor circuit 218 which provides voltage signal VMS indicative of the common power supply voltage for the integrated circuits of the control. Moreover a fault current multiplexer 226 provides a fault current signal If to another input channel of the input multiplexer 204. The fault current signal If is chosen as one of twelve channel inputs If0–11 to the multiplexer 226 by the input multiplexer control selecting a channel. The correct channel is selected by the select signals MM0–MM3.

The discrete input multiplexer 230 receives high and low logic level signals from a plurality of input switches which may be manually set as described previously. Signal SRT indicative of a start signal, signal SHD indicative of a shutdown signal, signal FHT indicative of the enablement of the flame heaters, signal AMS indicative of either of the manual or automatic mode for the flame heaters, signal FRS indicative of the desire to reset a fault indication, and signal TAC indicative of a tactical idle operational mode are received in this manner. These descrete inputs are received by a plurality of separate filter buffering circuits 32 which provide noise, immunity, and impedance matching between the switch inputs and the input ports of the discrete multiplexer 230. The discrete inputs are read into the multiplexer 230 as a single digital word. The output of the multiplexer is made operable by an enabling select signal SDM. The digital work is then converted to serial bits and read into the processor module under the control of the system I/O clock CRUCLK and the channel selection lines A10–A12.

The output section of the electronic control is under the regulation of an output multiplexer control 248 and includes a serial-to-parallel converter 244. The converter 244 is under the control of select lines Y0–Y7 and address lines A10–A12. The output multiplexer control 248 steers the serial data via the CRUOUT data line to bits positions in a register. This register provides for a parallel discrete output word of bits B0–B11 and a digital-to-analog conversion for readout of position requests for the turbocharger actuators and the injection pump. The discrete output word bits B0–B11 control separate discrete output drivers 246 to provide the fault logic for the display lights or logic signals to the auxiliary equipment as indicated by the signal names. The analog signals output are currents representative of the position requests which include Xr(LC) indicative of a position request for the left compressor actuator, Xr(LT) indicative of a position request for the left turbine actuator, Xr(RC) indicative of a position request for the right compressor actuator, Xr(RT) indicative of a position request for the right turbine actuator, and Xr(IP) indicative of position request for the injection pump.

Each of the actuator position requests Xr for the turbocharger is differenced in a corresponding current driver 234, 236, 238, 240 with the actual actuator position Xa and forms an error signal. The error signal is of such polarity that it can be used to null the difference between the two in a proportional control loop outputting the driver currents Id. In this manner, current driver 234 forms a proportional loop for the left compressor actuator, current driver 236 forms a proportional loop for the left turbine actuator, current driver 238 forms a proportional loop for the right compressor actuator and current driver 240 forms a proportional loop for the right turbine actuator. The injection pump driver 242 is driven by the position request Xr(IP) in an open loop manner to position the injection pump actuator by means of the driver current Id(IP). The proportional control loops for the turbocharger actuators are closed by analog feedback voltages Xa but responsive to digitally calculated position requests Xr. This configuration removes the processor delay from the loop such that the actuators may respond rapidly to changes in the position requests Xr.

Figure 3:
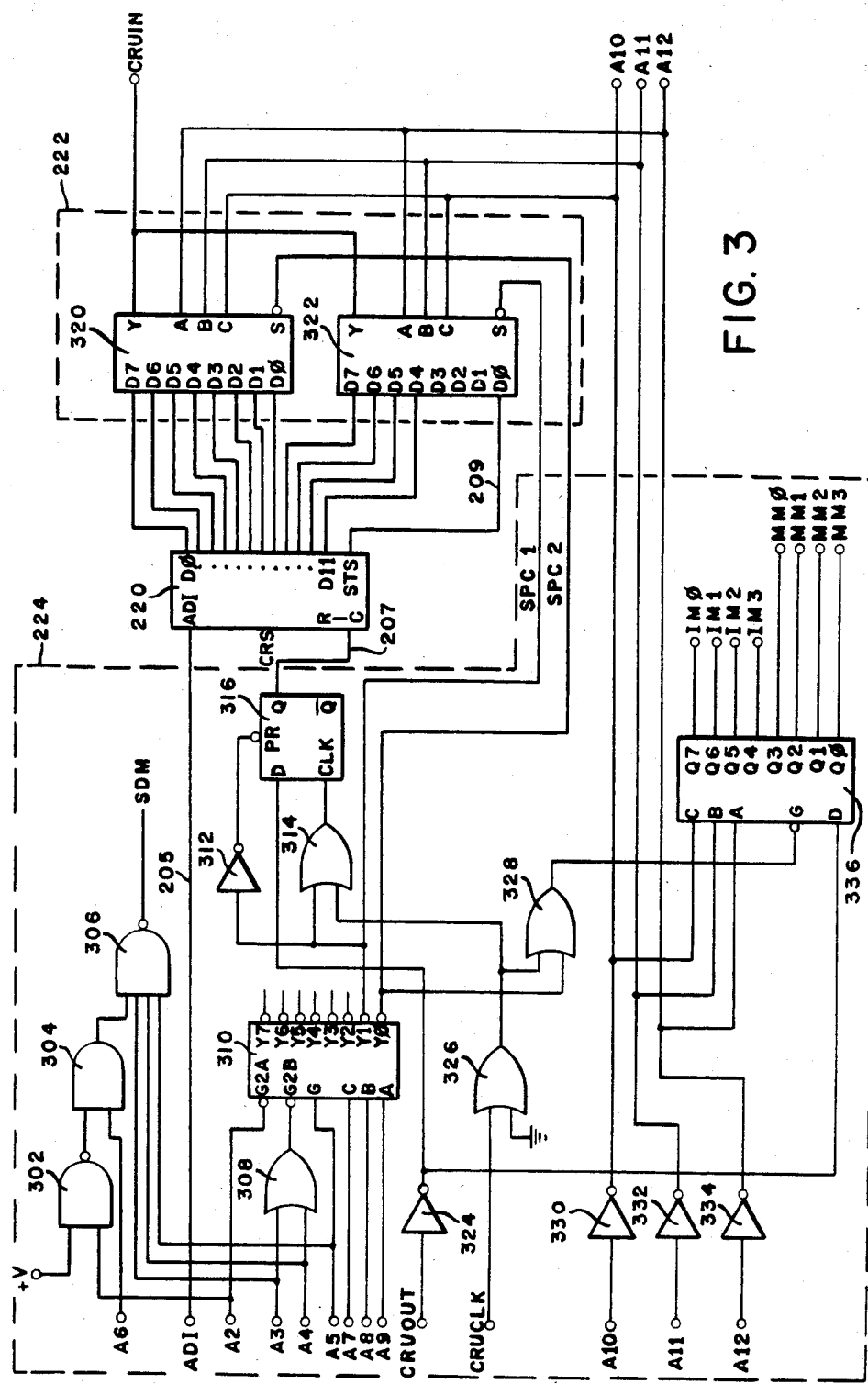
FIG. 3 is a detailed electrical schematic view of the input section including the input multiplexer control, the A/D converter, and the parallel-to-serial converter illustrated in FIG. 2.

In FIG. 3 there is illustrated a detailed electrical schematic diagram for the analog portion of the input section including the A/D converter 220, the input multiplexer control 224, and the parallel-to-serial converter 222. The input multiplexer control 224 comprises means for controlling the analog input multiplexer 204, the discrete input multiplexer 230, the fault current multiplexer 226, and the analog-to-digital (A/D) converter 220 and the parallel-to-serial converter 222. The input multiplexer control 224 accomplishes these tasks by providing a state selection multiplexer device 310 and a channel address multiplexer device 336. The state selection multiplexer 310 has its address selection inputs A, B, and C connected to address lines A7, A8, and A9, respectively of the microprocessor. Depending upon the logic levels input to the G, G2A, and G2B inputs of the device, the Y0–Y7 outputs will be set to either a zero or a one logic level. A zero logic level is an enabling signal and a one logic level is a disabling signal from the outputs Y0–Y7 for selecting the state of the input circuitry.

The G input is connected to address line A5, the G2A input is connected to address line A2, and the G2B input is connected to address lines A3 and A4 via there combination by OR gate 308. If the G input is low, all the outputs Y0–Y7 are high and if either of the G2 inputs are low, all outputs Y0–Y7 produce high level outputs. Conversely, when the G input is a high logic level (one) and both G2 inputs are low, a single outpt Y0–Y7 (selected by the three bits of the address selection inputs A, B, and C) is set to a low enabling level.

The channel selection multiplexer 336 acts to transfer a data bit, received at its D input, to one of the outputs Q0–Q7 selected by the input address lines A, B, and C, only when the select input G is true (logical zero). The address selection inputs A, B, C for the channel address multiplexer 336 are connected to the processor address lines A10, A11, and A12 via inverters 330, 332 and 334, respectively. The D input for the multiplexer 336 receives data via the output data line CRUOUT after buffering and inversion by inverter 324. The enablement of the multiplexer 336 for transferral of the CRUOUT data bits to the Q0–Q7 outputs is caused by a negative true output of an OR gate 328. The OR GATE 328 receives as one an input from OR gate buffer 326 the CRUCLK signal and as the other an enabling logic level from the Y0 output of the selection multiplexer 310.

The outputs of the channel address multiplexer 336 are signals MM0–3 corresponding to outputs Q0–3 of the device which form the channel addresses for the fault current multiplexer 226. The second set of signals developed by the channel address multiplexer 336 are IM0–3 corresponding to outputs Q4–7 of the device which are the channel selection addresses for the analog input multiplexer 204. The output of the analog input multiplexer 204 is a single channel voltage signal ADI AOI which is transmitted to the analog-to-digital converter 220 via connecting line 205.

The input multiplexer control starts the conversion of converter 220 by generating a conversion request signal CRS via line 207. The conversion request signal CRS is the Q output of a D-type bistable device 316. The bistable 316 has its D input connected to the data output line CRUOUT via the output of the inverter 324. The clock input CLK of the bistable 316 is from the output of an OR gate 314 which receives as one input signal the output of OR gate 326 and as the other input signal the Y1 output of the state selection multiplexer 310.

The outputs of the analog-to-digital converter D0–D11 are connected to the inputs D4–D7 and D0–7 of 8:1 multiplexers 322 and 320, respectively. The two multiplexers 320, 322, together form the parallel to serial converter 222. Each multiplexer 320, 322 has a select input S which is connected to the Y0, Y1 outputs, respectively, of the state selection multiplexer 310. The selection lines A, B, and C of each multiplexer 320, 322, are commonly connected to the address bus lines A10, A11, and A12. The Y outputs of each multiplexer are connected together for forming the input data signal CRUIN to the processor module.

The address lines A10, A11, and A12 from the inverters 330, 332, and 334 are further transmitted to the discrete input multiplexer 230. The value of these lines select the discrete bit to be transferred by the input data line CRUIN. A device selection signal SDM for the discrete multiplexer 230 is generated by NAND gate 302, AND gate 304, and a NAND gate 306. The input to NAND gate 306 is from three address selection lines A3, A4, and A5 in addition to the output from AND gate 304. The AND gate 304 combines two inputs from the address line A6 and the output of NAND gate 302. NAND gate 302 combines the positive input (logical one) from a source of voltage +V and the address line A2.

Accordingly, the fixed discrete input signals are read in by the discrete input multiplexer by first setting the address lines to provide a low level signal SDM from the output of NAND gate 306. This will enable the multiplexer device 230 such that the channel address lines A10, A11, and A12 may be varied to read in the six bits placed serially on the input data line CRUIN as the address lines are changed. This discrete input multiplexer selection signal SDM is the combination of the presence of address bits A3, A4, A5, and A6. The address bit A2 is provided as an enabling signal which, if low, will enable the generation of the selection signal SDM.

The process for converting one of the analog inputs to a serial bit string will now be more fully explained by reference to FIG. 2 and FIG. 3. For an analog input, the channel selection of the particular sensor or variable desired must first be set in the channel selection multiplexer 336. Therefore, the processor module will output an eight bit address via the output data line CRUOUT which is received by the D input of the channel selection multiplexer. These eight bits are synchronously sent in accordance with the timing of the low logic levels of CRUCLK which in combination with a low logic level for the Y0 output of device 310 enables the channel selection multiplexer via the OR gate 326 and OR gate 328. The data bits, therefore, are transmitted synchronously by the output data line CRUOUT as the address lines A10, A11, and A12, are changed after each CRUCLK pulse. This steers the serial eight bit address word into the Q0–Q7 output of the channel selection multiplexer 336. This eight bit word represents the channel selection for the fault current multiplexer 226 and the analog input multiplexer 204.

Once the channel has been selected the ADI line will have an analog voltage present which it is desired to convert to a digital number. At this point the multiplexer 310 will be provided with another address from the processor such that multiplexer 310 will provide a low level output or state select level from Y1 of the device. This output level via OR gate 314 and its synchronism with the clock signal CRUCLK will clock the input signal applied to the D input of bistable 316 to its Q output. The signal input to the bistable 316 is from the CRUOUT data output and is the conversion request signal CRS. The digital-to-analog converter 220 will thereafter begin converting the analog signal on the AD1 line. When the converter is finished it provides a high level from its STS output via line 209.

The digital number now stored on the outputs D0 through D11 of analog-to-digital converter 222 can now be read into the processor timing and memory module via the input data line CRUIN. The Y1 output of the multiplexer 310 is still low and therefore the output multiplexer 322 is selected. The STS signal will appear on the Y output of this multiplexer and therefore, the input data line CRUIN because of the address lines A10–A12 selecting the D0 input of that device.

Once the STS signal has been read into the processor timing and memory module via CRUIN, the digital word on the other inputs of the multiplexer 320 and 322 can be converted to serial form by varying the address on selection lines A10–A12 sequentially until input D4–D7 are read and then by changing the address lines for the multiplexer 310 such that Y0 outputs a low level logic signal. A low level logic signal on Y0 selects the other multiplexer 320 in the parallel-to-serial converter.

Thereafter, address lines A10–12 are varied sequentially to read the bits D0–D7 of the multiplexer 320 into memory in a serial fashion.

Figure 4:
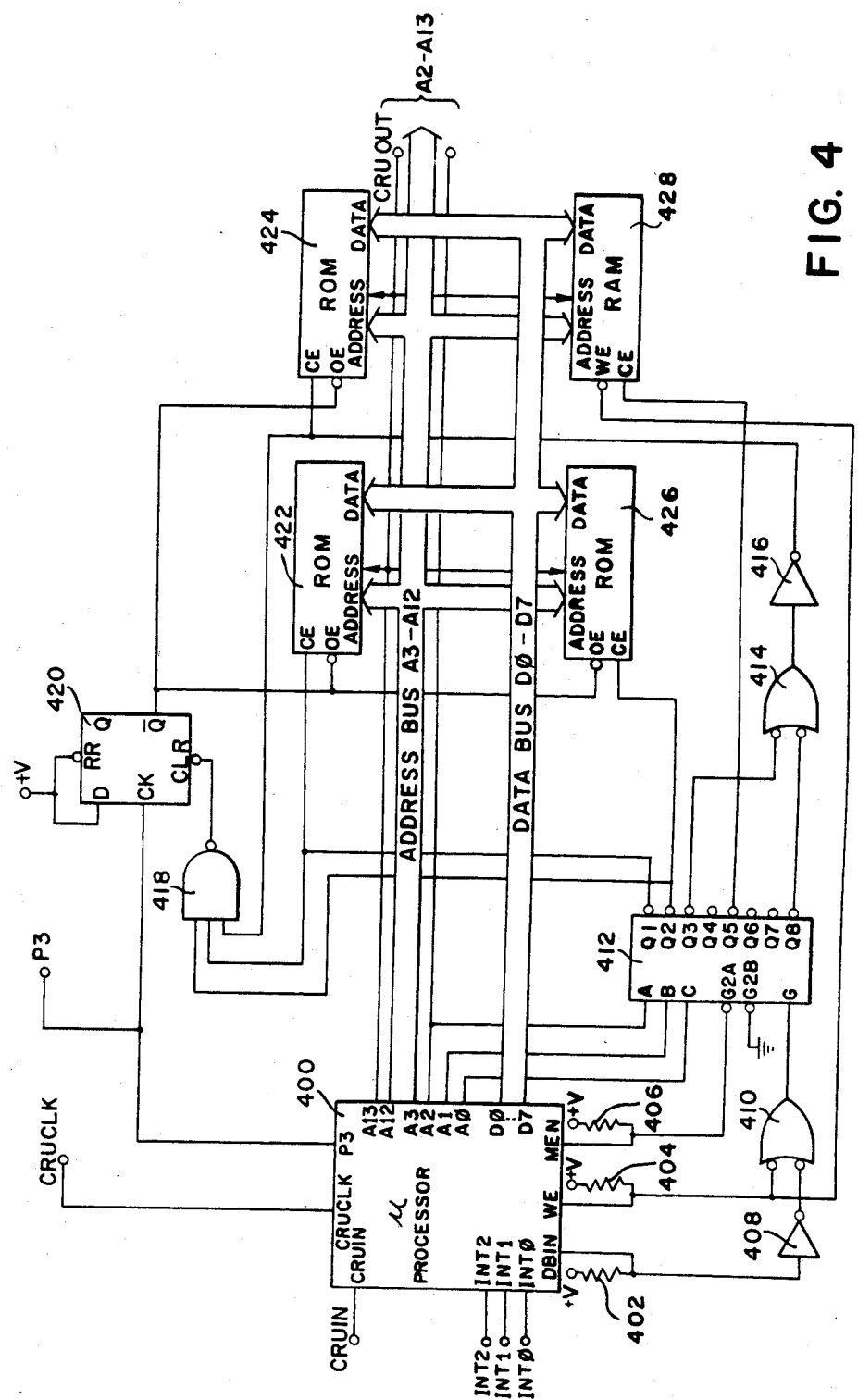
FIG. 4 is a detailed electrical schematic view of the processor and memory portions of the processor, timing, and memory module illustrated in FIG. 2.

Attention should now be directed to FIG. 4 where the processor and memory portion of the processor timing and memory module will be more fully explained. The electronic control unit, as previously indicated, is under the control of a microprocessor 400 which receives data via the input data line CRUIN and outputs data over the output data line CRUOUT. The output data line CRUOUT is actually address line A13 of the microprocessor. The microprocessor synchronizes the input and output of data via the signal CRUCLK. The communication of the processor with the input and output of the circuitry is by the method of serial data transmission alone. The data lens outputs DØ-7 of microprocessor 400 communicate only with the data inputs and outputs of the memory modules 422, 424, 426, and 428.

The system has four memory modules of which three are read-only memory (ROM) for the storage of the control program and of which the fourth is a random access memory (RAM) for calculations and intermediate data storage. The memory modules 422, 424, and 426 are the read-only memory, while the random access memory is the memory module 428. The address bus lines A2-13 of the microprocessor are connected to and communicate with the address inputs of the memory modules 422, 424, 426, and 428 in addition to connecting to the input and output sections of the system.

Under the microprocessor control, the reading and writing of data into and from the memory modules is by means of the address lines AØ-13, the data lines DØ-7, and the control lines DBIN, WE, and MEN. The data bus in line DBIN is pulled up by a resistor 402 which has one terminal connected to the input of an inverter 408 and the other input connected to a source of positive voltage +V. The data bus in signal DBIN is to control the direction of data between the microprocessor 400 and the memory modules 422, 424, 426, and 438. A high level DBIN signal indicates that data is to flow from the microprocessor to the memory modules and a low DBIN signal indicates that data is to flow from the memory modules to the microprocessor. The write enable line WE is pulled up by a resistor 404 which has one terminal connected to the input of a negative true OR gate 410 and the other terminal connected to a source of positive voltage +V. The write enable signal WE determines whether data will be read from or written into the random access memory module 428. If the WE signal is high, the data is to be read from the module 428, and if it is low, data is to be written in to the module. The memory enable line MEN is pulled up by the resistor 406 which has one terminal connected to the G2A input of a memory module selection multiplexer 412 and the other terminal connected to a source of positive voltage +V. The memory enable signal MEN determines whether the memory modules may have data read from or written into them. If the memory enable signal MEN is high, this disables all memory modules 422, 424, 426, and 428, and if low, enables the particular memory module selected for the operation at hand.

A particular module is selected for data transfer by the memory module selection multiplexer 412. The multiplexer 412 produces a selection signal from its outputs Q1-Q8 when provided with an address selection word from its inputs A, B, and C. This selection is made when its G input is high and the two other select inputs G2A and G2B are low. The inputs A, B, and C of the multiplexer 412 are connected to the address lines A0, A1, and A2, respectively, while the G2A input is connected to the memory enable line MEN of the microprocessor 400. The G2B input of the multiplexer 412 is connected to ground while the G input is connected to the output of the negative-true OR gate 410. The negative-true OR gate 410 also has its other input connected to the output of the inverter 408.

The memory module 422 is enabled by a low level signal from the Q1 output of the multiplexer 412 being applied to its chip enable input CE. The memory module 426 is enabled by a low level signal from the Q2 output of multiplexer 412 being applied to its chip enable input CE. The memory module 424 is enabled by a low level signal output from the inverter 416 being applied to its chip enable input CE. The inverter 416 receives as an input, the output of OR gate 414 which is a combination of the negative-true outputs Q3, Q8 of the multiplexer 412. The memory device 428 is enabled by a low level signal from the Q5 output of the multiplexer 412 being applied to its chip enable input CE. The write enable input WE for the random access memory module 428 is enabled by the write enable signal WE from the microprocessor 400.

Additionally, the output enable inputs OE of memory modules 422, 424, and 426, are enabled by a low level signal output from the Q-not output of a D bistable 420. The D bistable 420 is clocked by a phased signal P3 applied to its clock input CK from the output P3 of the microprocessor 400. The D bistable 420 is cleared by the output of a NAND gate 418 producing a low level signal. The inputs to the NAND gate 418 are from the outputs Q1, Q2, of the multiplexer 412 and the output of the inverter 416.

Operationally, the data transfers between the microprocessor and the memory modules 422, 424, 426, and 428 occur in the following manner. If the memory enable signal MEN is a high level, all outputs Q1-Q8 of the multiplexer 412 are high. Therefore, a high level memory enable signal MEN will disable all the memory module units at 422, 424, 426, and 428. However, when the memory enable signal MEN becomes a low level, the data line in signal DBIN or the write enable signal WE will provide a high level output from the OR gate 410 to the G input of the multiplexer 412. This signal will produce a low level enabling signal from the Q1, 2, Q3, Q5, or Q8 in outputs depending on the address selected according to address lines A0, A1, and A2.

Upon enablement by the data bus in signal DBIN the read-only memory modules will find the data located at the address selected by address bus A3-A13 and wait for an output enable signal to load the data bus with the particular contents of that address. The phased clock P3 will clock the D bistable 420 to produce a low level output on its Qnot terminal enabling the particular read-only memory selected. The random access memory 428 is read in a similar manner by enabling its chip enable input CE with the Q5 output of the multiplexer 412 and thereafter reading the data placed on the data bus from the address requested on the address bus lines A3-A13. For a write operation into the random access memory module 428 the write enable WE is brought to a low level and the data placed on the data bus from the microprocessor 400 is loaded into the RAM location as selected by the address bus A3-A13. The NAND gate 418 will disable the D bistable 420 whenever the ROM modules are not selected so that data to be written in the RAM is not placed inadvertently in these devices.

Figure 5:
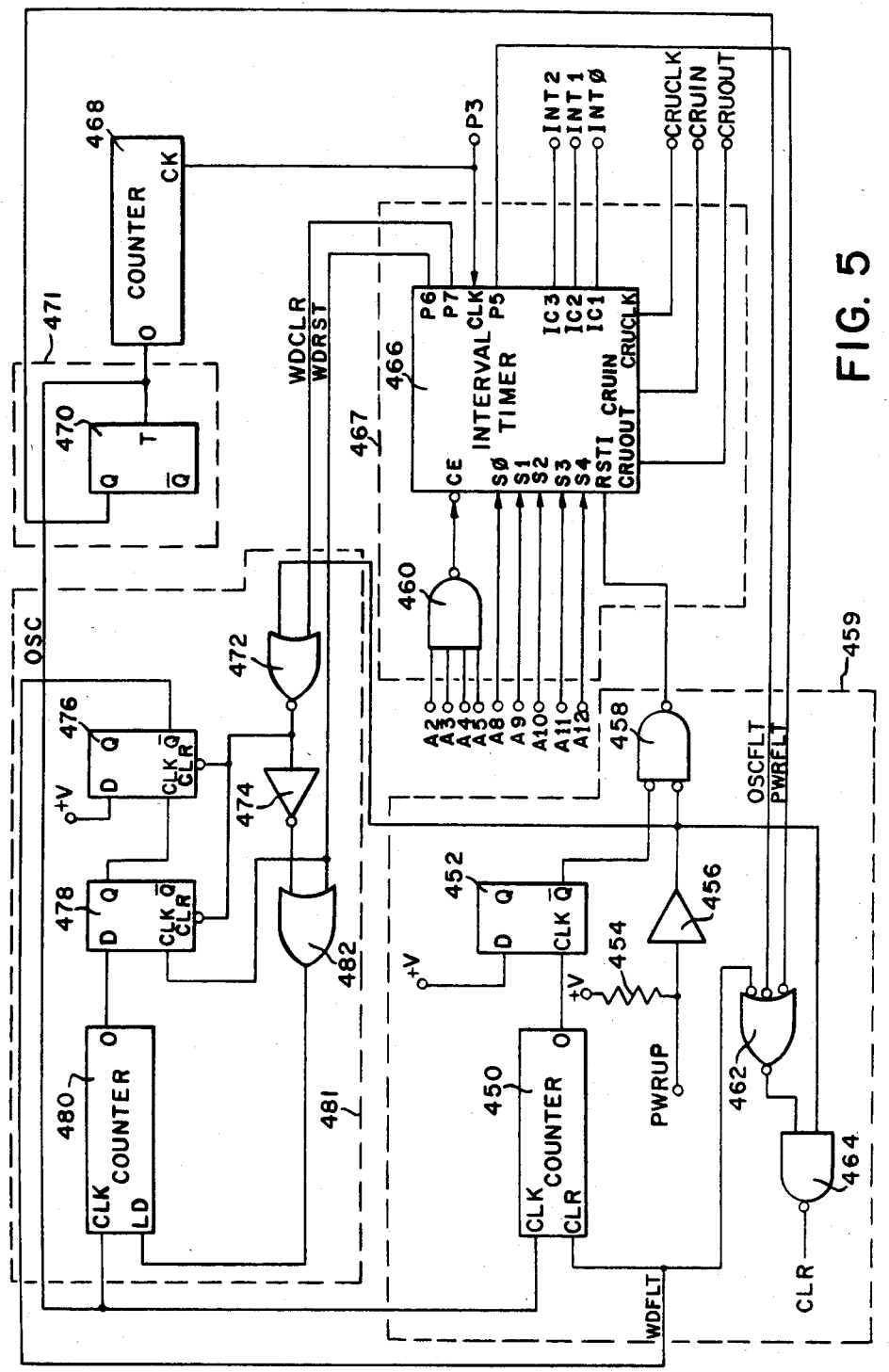
FIG. 5 is a detailed electrical schematic view of the timing portion of the processor, timing, and memory module illustrated in FIG. 2.

In FIG. 5 the timing portion of the processor, timing, and memory module is more fully detailed. The timing portion includes an interval timer 467 and an oscillator 468, an oscillator fault detector 471, a watch dog timer 481, and a restart control 459. The interval timer circuitry 467 contains an interval timer chip 466 of the Texas Instruments 9900 series of timer chips. Preferably, the interval timer chip is the device designated the TMS 9902 commercially available from that corporation.

The interval timer as is known is driven by a chip enable input CE which receives the output of NAND gate 460. The NAND gate 460 combines the output levels of address bus lines A2-A5 from the microprocessor 400. When all of the address lines are at a high logic level, the output of the NAND gate 460 will be low and the chip 466 enabled. Address lines A8-A12 for communication of data, are provided to status inputs S0-S4 on the interval timer chip 466. Interrupt outputs on the chip IC1, IC2, and IC3 are connected to the interrupt inputs INT0, INT1, and INT2 of the microprocessor. The input P3 receives the phased clock P3 from the microprocessor. Moreover, the input and output serial data buses CRUIN, CRUOUT, are connected to similarly labeled inputs on the interval timer 466. Additionally, the I/O clock is received by the interval timer at the input labeled CRUCLK. The interval timer chip further has outputs P5, P5, and P7 which produce control signals PWRFLT, WDCLR, WDRST.

The basic task of the interval timer chip 466 is to provide an interrupt on line INT0 every 27 miliseconds to provide a real time iteration base for the main program of the microprocessor. The iteration rate may be changed by loading the correct a data word address on address lines A8-A12. The second major task of the internal timer 466 is to provide a watch dog reset WDRST at the same time that the interrupt INT0 is given to the microprocessor to indicate a new programming cycle has begun.

The oscillator 468 is preferably a counter which has its clock input CK connected to the phased clock P3 of microprocessor. The counter 468 divided down the high speed internal clock of the microprocessor to produce a slower oscillator signal OSC. The oscillator signal OSC drives two additional counters 480 and 450. The oscillator fault detector 471 is an astable device 470 which has its T input connected to the oscillator signal OSC. Its Q output is connected to one input of the NOR gate 462. A high level logic signal from the Q output of the device 470 indicates that an oscillator fault signal OSCFLT has been given to the NOR gate 462. This happens when the device which is triggered into a reset condition by the oscillator is not reset prior to its time constant being exceeded.

The watch dog timer 481 includes the counter 480, a D flip-flop 478, a D flip-flop 476, and gating circuitry. The gating circuitry includes a NOR gate 472, whose output is inverted by inverter 474, before being input to an OR gate 482. The other input for the OR gate 482 is the watch dog reset signal WDRST provided by the P6 output of the interval timer. The inputs to the OR gate 472 are from the output of amplifier 456 and the signal watch dog clear WDCLR from the P7 output of the interval timer 466. The output of the OR gate 482 is connected to the load input LD of the counter 480.

The D flip flop 478 has its D input connected to the output O of the counter 480 and its clock input CLK connected to the PO output of the counter 468. The Q output of flip flop 478 is connected to the clock input CLK of the D flip flop 476. The D flip flop 476 has its D input tied to a positive voltage +V and its Q not output connected to the clear input of the counter 450 and another of the inputs of NOR gate 462. The Q not output of the D flip flop 476 produces the watch dog fault signal WDFLT. Both D flip flops are cleared by having their clear inputs CLR tied commonly to the output of NOR gate 472.

Operationally, the watch dog timer acts to determine if the major programming cycle between the successive INT0 signals exceeds a predetermined time period. The time period is set by loading the counter 480 with a predetermined digital number which is then counted down by the oscillator signal OSC until the output O produces a high level logic signal. The signal is an overflow signal which indicates the number has been counted to zero and the time period has expired.

The overflow signal is clocked from the D input to the Q output of the flip flop 478 by the watch dog reset signal WDRST. Since the flip flop 476 has its D input tied to a positive voltage, its Q-not output will go low upon the clocking of a logical one into the opposite output by the signal from flip flop 478. The logic level on the Q-not output of flip flop 476 will become the watch dog fault signal WDFLT. However, if a watch dog reset signal WDRST occurs prior to the counter 480 overflowing and setting the D input of flip flop 478, then OR gate 482 will reload the counter and the clocking signal to flip flop 476 will not be generated. This is the normal operation of the watch dog timer 481 and assures that if the watch dog reset signal WDRST occurs prior to the time period in the counter being exceeded that the watch dog fault signal WDFLT will not be generated. This portion of the control maintains the processor on a real time base that can be relied upon.

If, for some reason, the watch dog fault signal WDFLT is generated and the condition causing the signal has cleared itself, or was in error, the interval timer 466 may give a watch dog clear signal WDCLR. This signal is generated from the P7 output of the interval timer to NOR gate 472 and will clear the Q outputs of flip flops 478 and 476, simultaneously. The watch dog clear signal WDCLR is also transmitted through the inverter 474 and OR gate 482 to reload the counter 480.

The restart control 459 includes the counter 450, a D flip flop 452, an amplifier 456, NAND gate 458, NOR gate 462, and NAND gate 464. The counter 450 whose output is connected to the clock input CLK of the D flip flop 452 receives the watch dog fault signal at its clear input CLR. The D flip flop 452, which has its D input tied to a positive voltage +V, outputs a reset signal via its Q output to a negative true input terminal of the NAND gate 458. This signal, when it is a logical zero, will provide a reset to the interval timer chip 466 when applied to the reset input RSTRI. Similarly, a powerup signal PWRUP applied to the terminal of resistor 452 and input through amplifier 456 will additionally provide a reset signal through NAND gate 458.

Normally, the counter 450 counts the oscillator pulses from the oscillator 468 and overflows at a predetermined interval to provide a reset signal through NAND gate 458. However, when the watch dog fault signal WDFLT is at a low level or true, the clear input CLR is held low and counter 450 does not provide the interval timer 466 with a reset. By this means the interval timer chip realizes that a watch dog fault has occurred and it may signal the microprocessor of this fault via one of the interrupt lines IC1-IC3. The reset signal may also be given during a powerup condition when the powerup signal PWRUP pulls the base of resistor 454 low, causing the output of amplifier 466 to go low and provide a reset output to the interval timer chip 466.

NOR gate 462 and AND gate 464 are used to provide a clear signal CLR to the serial to parallel converter 244 whenever any of the signals WDFLT, OSCPLT, PWRFLT, or PWRUP are present. These gates provide a signal to the registers to completely clear the converter. In this manner during faults, or powerup conditions, the actuator position request signals and the logic level signals to the auxiliary devices will be 0.

Figure 6:
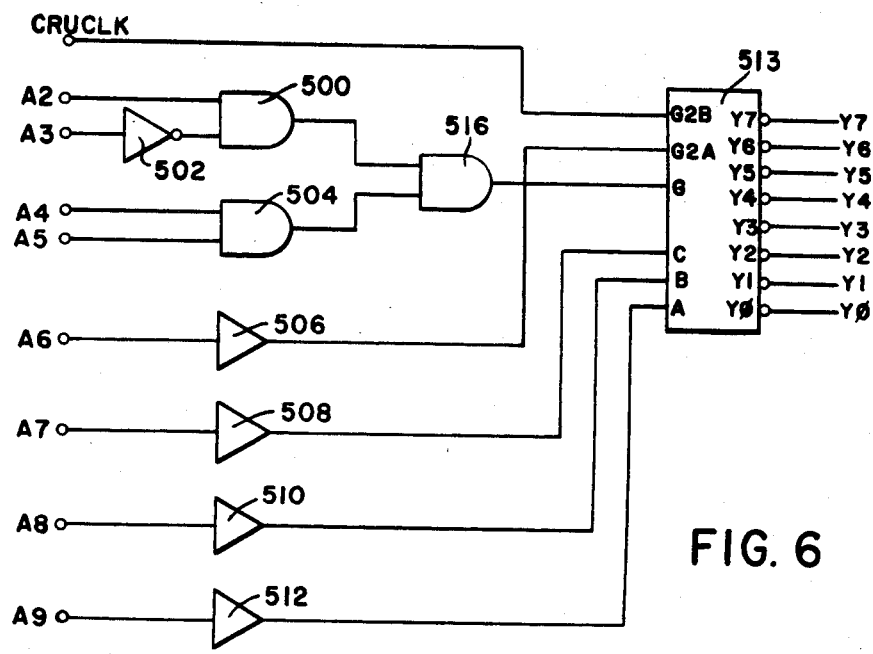
FIG. 6 is a detailed electrical schematic view of the output multiplexer control illustrated in FIG. 2.

In FIG. 6 there is shown the output multiplexer control 248 in more detail. The output multiplexer control comprises a multiplexer 513 that enables its output selection lines Y0-Y7 according to the logic levels on its inputs. The multiplexer has address selection inputs A, B, and C connected to address lines A7, A8, and A9 through amplifiers 508, 510 and 512, respectively. Address line A6 is connected to the G2A input of the multiplexer via amplifier 506. The I/O clock signal CRUCLK is connected to the G2B input and the G input is the logical combination of the inputs to AND gate 500, 504, and 516. The inputs to the AND gate 500 are the address line A2 and the inversion of the address line A3 through an inverter 502 while the inputs to the AND gate 504 are the address lines A4 and A5.

Selection is made by holding address lines A6 and A3 at a low logic level and holding address lines A2, A4, and A5 at a high logic level. This produces a low logic level on the G2A input and a high logic level on the G input. Thereafter, the particular address Y0-Y7 that is desired to be enabled may be chosen by the 3 bit digital word on address lines A7, A8, and A9 when the CRUCLK line makes a transition to a low logic level.

The detailed schematic of the output serial to parellel converter 244 will now be more fully discussed with reference to FIG. 7. The serial to parallel converter comprises a latching register which is segmented into eight (1:8) multiplexers 702, 710, 714, 718, 724, 726, 732, and 738. Each multiplexer, for example, 702 includes a select input G which enables the device. When selected, the logic level at the D input to the device is transferred to the latched outputs Q0-Q7 depending upon the 3 bit digital word input to the selection inputs A, B, and C. The device 702 is also provided with a clear input CLR which, upon the receipt of a negative true input signal will reset the outputs Q0-Q7 of the device.

Serial data is read into the latching register by connecting the output data line CRUOUT to all the D inputs of the multiplexers 702, 710, 714, 718, 724, 726, 732, and 738 via conductor 725. A common clear line 723 is further provided to all clear inputs CLR of the aforementioned multiplexers. The line receives the CLR signal from the processor module 228 and sets all 64 bits to zero upon the occurrence of the signal. Each individual multiplexer has an associated select line Y0-Y7 which is connected to the G input of each device, respectively, and for which a negative true input will cause enablement of the device.

Figure 7:
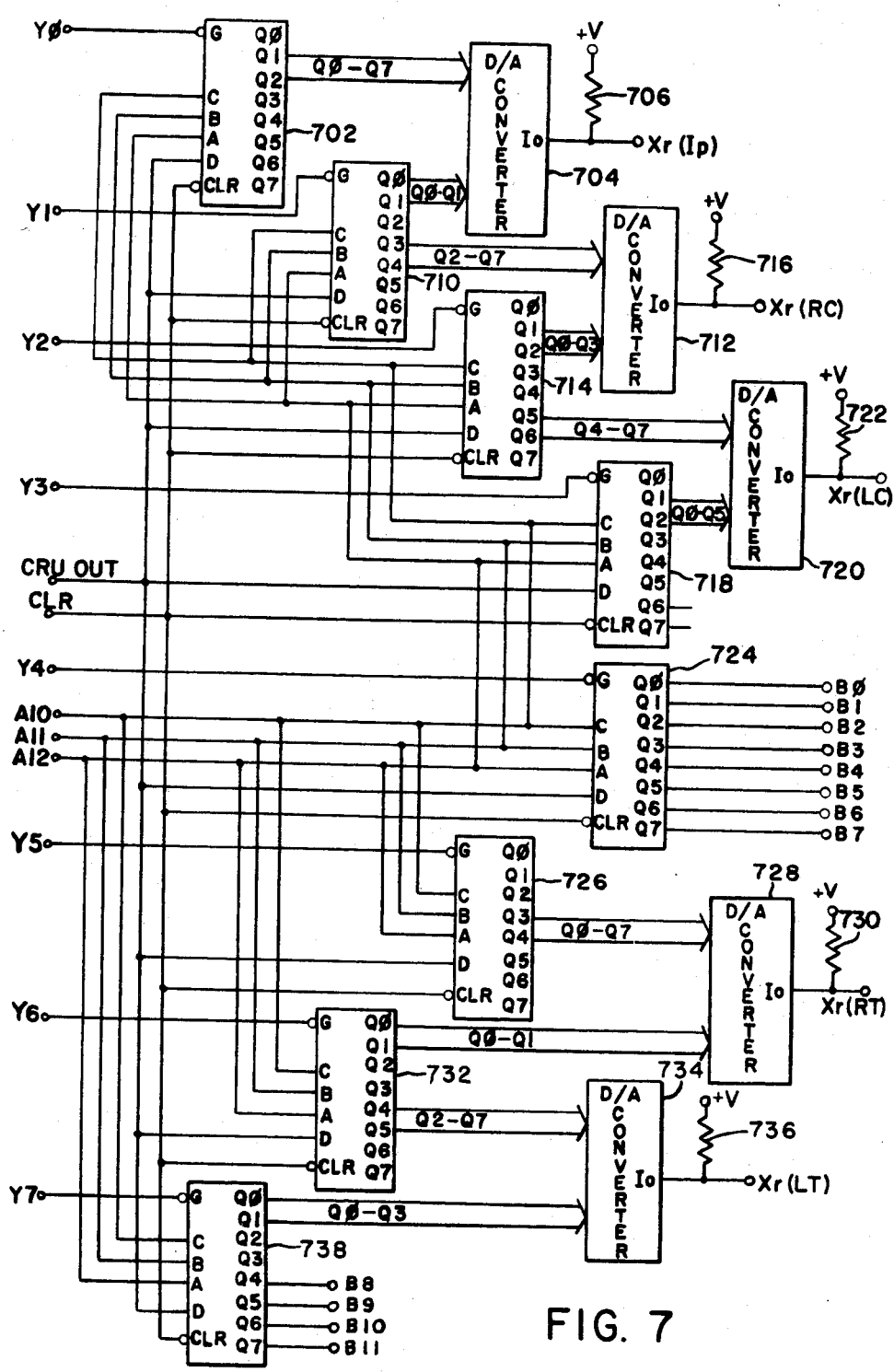
FIG. 7 is a detailed electrical schematic view of the serial-to-parallel converter illustrated in FIG. 2.

Operationally, the circuits illustrated in FIGS. 6 and 7 act to guide the serial data output on the CRUOUT data line to individual output bits of the multiplexers. The particular output location selected is accomplished by a combination of selecting one of the select lines Y0-Y7 and a three-bit address on address lines A10-A12. This produces a serial-to-parallel output system whereby any bit of a serial output data stream may be distributed or steered to any of the 64 outputs in synchronism of the I/O clock signal CRUCLK.

The Q0-Q7 outputs of multiplexer 702 and the Q0-Q1 outputs of multiplexer 712 provides a 10-bit digital word for input to a D/A converter 704. The converter 740 decodes the 10-bit digital word and provides an analog signal from its output Io which is indicative of the requested position of the injection pump Xr(IP). A pullup resister 806 is connected between the Io output and a source of positive voltage +V to provide current driving capability for the output signal.

Similarly, the Q2-Q7 outputs of multiplexer 710 and the Q0-Q3 outputs of multiplexer 714 provide a 10-digital word for a D/A converter 712. The output of the D/A converter 712 is produced via an output Io to generate the analog position request signal Xr(RC) which is indicative of the position request for the right compressor actuator. As was the case previously, a pullup resister 716 is provided between the output Io of the multiplexer 712 and a source of positive voltage +V to provide current driving capability.

The other analog signals Xr(LC, Xr(RT), Xr(LT) are provided by the other multiplexers in an identical manner. Outputs Q4-Q7 of multiplexer 714 and outputs Q0-Q5 of multiplexer 718 provide a 10-bit digital word for conversion by D/A converter 720, outputs Q0-Q7 of multiplexer 726 and outputs Q0-Q1 of multiplexer 732 provide a 10-bit digital word for conversion by D/A converter 728, and outputs Q2-Q7 of multiplexer 732 and outputs Q0-Q3 of multiplexer 738 provide a 10-bit digital word for conversion by D/A converter 734. Pullup resisters 722, 730, 736 are connected between the outputs Io of the converters 720, 728, and 734, respectively, and a source of positive voltage +V. The D/A converters 720, 728, and 734 provide position request signals Xr(LC), Xr(RT), Xr(LT) indicative of the position request for the left compressor, right turbine, and left turbine actuators, respectively.

The outputs Q0-Q7 of the multiplexer 724 and the outputs Q4-Q7 of the multiplexer 738 are fed to the output drivers of the controlled auxiliary devices as discrete control bits B0-B11. Each bit is a logic level signal that controls the activation of its associated driver by its state.

Figure 8A:
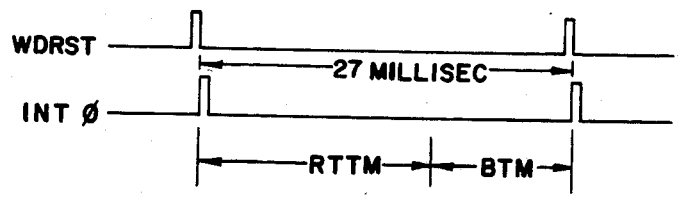
FIG. 8a is a detailed timing diagram of the major iteration cycle for the processor, timing, and memory module illustrated in FIGS. 2, 4, and 5.

In FIG. 8a there is shown the major control cycle for the program stored in the microprocessor memory. From the end of the pulse indicating the interrupt INT0, there is 27 milliseconds to the next interrupt pulse. This interrupt period is set by a constant loaded into the interval timer 466 as previously described. In this time period, the processor must generate the watchdog reset WDRST or the next interrupt cycle will not begin. During the 27 milliseconds, or frame time, the processor has two major tasks to complete. One is the completion of all tasks in the real time task monitor, RTTM, and if enough time is present, the second is the execution of tasks in the background task monitor, BTM. The background task monitor, for example, may perform the current fault tests on the output drivers, a program to make sure that the real time task monitor is being executed at a sufficient iteration rate, and other tasks. The real time task monitor is variable in length because of the different amount of programming instructions that are stepped through depending upon the branches and paths taken through the routines. The background task monitor will utilize the remaining portion of the 27 millisecond frame to accomplish its tasks.

Figure 8B:
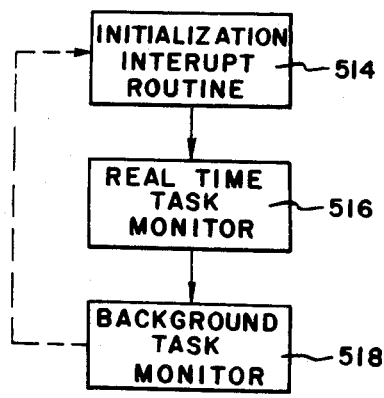
FIG. 8b is a functional system flow chart of the major monitors of a control program stored in the memory module illustrated in FIG. 4.

In FIG. 8b this sequence of major monitor routines is indicated by illustrating an initialization and interrupt routine 514 completing the tasks of initialization the programming constants, and handling the interrupt pulse INT0. The program sequence is then transferred to the real time task monitor RTTM 516 which generates the control, diagnostic, and fault signals needed to run the engine system. Finally, the background task monitor 518 completes the frame, generates the watchdog reset WDRST, and then transfers program control back to the interrupt routine 514 to await the start of the next frame.

The method of providing a real time and background task monitor for control systems is conventional in the art and produces many advantages. Therefore, since the present invention is concerned with routines present in the real time task monitor 516, the initialization routine 514 and background task monitor 516 will not be further described as they do not constitute elements necessary for understanding the invention. What is important to note is that the real time task monitor is executed once every frame and the frame period is 27 milliseconds long.

Figure 9A:
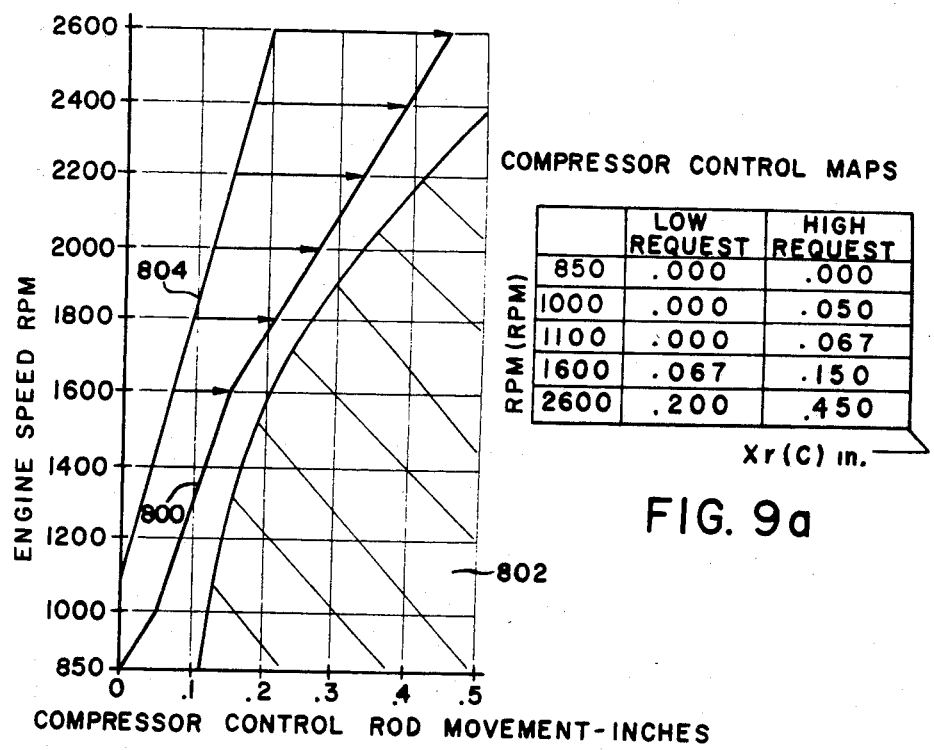
FIG. 9a is a graphical and tabular view of the compressor control rod position request as a function of RPM for the compressors illustrated in FIG. 1.

The turbine control map and compressor control map will now be more fully explained with reference to FIGS. 9a, b. These maps will be used to discuss the control philosophy of the turbocharger control. The first FIG. 9a, illustrates a compressor control map both graphically and in tabular or schedule form. The first curve 800 of the graphic illustration shows a nonlinear relationship of control rod movement as a function of engine speed RPM. The nonlinear relationship is represented in piecewise linear fashion by three straight line segments. Curve 800 is termed the high request schedule and is the compressor output diffuser position at which the compressor will operate most efficiently for a given engine speed. The compressor map is generated for a particular engine by empirical measurements and thermodynamic calculations. When operating efficiently according to this schedule, the compressor is close to its surge area 802 in which the turbocharger can not operate without detrimental effects. By maintaining some slight distance (a surge margin) away from the surge area 802, the compressor may not only be operated safely, but also efficiently at steady state conditions.

However, the surge area 802 changes and expands to the left past the high request schedule upon rapid accelerations of the engine. Therefore, the surge margin for a steady state condition will be exceeded and the compressor may surge if the high request schedule configuration is used during transient conditions. To accommodate this transient surge characteristic of the compressor, a second compressor control curve 804 is provided. This curve is such that a positioning of the compressor output diffuser according to this schedule, will not cause surge at any engine acceleration. The curve 804 marks the outer boundary of expansion of the surge area 802 that will be encountered. This curve is termed the low request schedule and provides an expanded surge margin for the compressor during transients.

Since the low request schedule is not as efficient as the high request schedule, the compressor part of the turbocharger control will accelerate on the low request schedule and then move to the high request schedule when the transient is completed. However, the compressor portion of the turbocharger control still cannot make up the difference between the high and low request instantaneously or the compressor will surge. The compressor control therefore senses the termination of an acceleration in excess of a reference and then moves from the low schedule to the high schedule at a fixed rate.

It is seen that the two curves are essentially parallel until approximately 1600 RPM and then begin to diverge from that point with increases in engine speed. This indicates, at high RPMs, the system while moving at a predetermined rate will delay longer in its transitions from the low schedule to the high schedule. Further, below the 1600 RPM reference there needs to be no delay in making the transition from the low schedule to the high schedules as the surge area does not extend into this region.

If the output diffuser position is already in excess of the low schedule, the position should be held until either the low schedule position exceeds it or the transient ceases. In the first case, the control can thereafter follow the low schedule or in the second case move to the high request schedule.

Figure 9B:
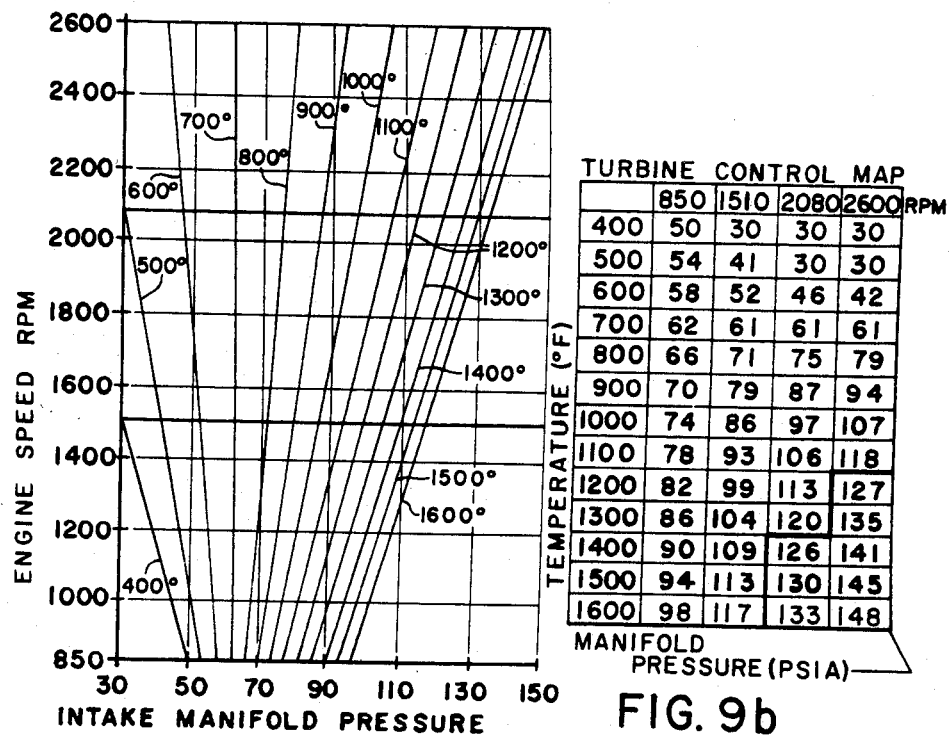
FIG. 9b is a graphical and tabular illustration of the turbine control schedule illustrating intake manifold pressure as a function of RPM and exhaust gast temperature for the turbine sections illustrated in FIG. 1.

The second FIG. 9b illustrates the turbine control map both graphically and in tabular or schedule form. The graphical illustration in a series of curves illustrating an optimum manifold pressure for the engine and turbocharger as a function of RPM at a constant exhaust gas temperature. The intake manifold pressures are calculated as the most efficient manifold pressure for that engine and turbocharger at a particular operating speed and temperature. Generally, at a constant temperature, manifold pressure is a substantially linear increasing function of RPM above 800° F. and a substantially linear decreasing function of RPM below 800° F. The turbine map is generated for a particular machine by empirical measurements and thermodynamic calculations. The turbine portion of the turbocharger control regulates the position of the inlet guide vanes to the turbine to increase or decrease actual manifold pressure to match the scheduled optimum from the map.

For both the turbine and compressor maps the tabular schedules are used for the present system as they are easily stored in a memory as a look-up table. Values of any particular parameter needed between two stored values can be calculated by conventional linear interpolation.

FIG. 11a is representation of a functional block diagram for the injection pump controller in which the injection pump position request signal Xr(IP) is generated to the injection pump driver 242. As previously described the injection pump driver 242 generates the injection pump driver signal Id(IP) from the position signal to control the fuel metering valve of the injection pump. The position request signal Xr(IP) is developed by choosing the higher (more positive) of two position request signals input to a select high gate 830. One of the inputs is generated by an injection pump position request schedule 826 from the input parameter theta. The function of theta which is preferably used is that illustrated in FIG. 10c. This function which is representative of the preferred relationship, describes a position request Xr(IP) which is a substantially linear schedule with respect to rotation of the twist grip but with a 4° zero effect. Because the fuel supply is relatively proportional to engine speed the operator thereby has a throttle that is responsive to his request.

The other position request input from which the select high gate 830 chooses is the output of a proportional plus integral controller 828. The controller has a proportional constant multiplier Kp and an integral constant multiplier Ki with an integral plus proportional term (Ts+1). The integral plus proportional constants act on an error derived from the output of a summing junction 822. The error signal generated from summing junction 822 is derived from the engine speed value RPM and a tactical idle adjustment value TIA. The tactical idle adjustment value TIA is a reference value to which the RPM value is compared and the error difference generated by subtraction. The error is limited by a limiter 824 to produce a bounded error for the controller 826 and then acted on by the controller 828 to produce a second position request signal Xr(IP).

The output of the summing junction 822 is also dependent upon the positioning of a switch 820. The switch 820 is opened when the tactical idle signal TAC from the discrete input is a logical zero and is closed when the signal TAC is a logical one. In this manner when the signal TAC is present, switch 20 is closed and the output of the summing junction 822 is the difference between the TIA value and the RPM value. When the switch is open the output of the summing junction 822 is only the −RPM value.

Therefor, the operator has a choice of controlling the engine speed and output power by a combination of the tactical idle switch and the twist grip or only the twist grip. If he prefers to control the engine system with the tactical idle switch, it is closed producing a high level and subsequently causing the closure of switch 820. Thereafter, the error difference between the tactical idle adjustment value TIA and the actual speed of the engine RPM are used to provide an error signal to the proportional plus integral control 828. The proportional plus integral control regulates the speed of the engine through the position signal Xr(IP) to provide the tactical idle reference value TIA.

If, however, the operator desires a higher engine speed, the twist grip is rotated such that its position request output from schedule 826, is higher than the output of the proportional plus integral controller 828. At that point the twist grip command takes precedence over the output of the tactical idle controller 828 and produces a speed from the engine as a function of the angle theta. When the tactical idle signal TAC is not present, indicating the switch is off, the −RPM value produces a negative signal which is refused by the select high gate 830. Thus, the twist grip command theta will provide the position signal Xr(IP) according to the rotation of the grip and schedule 826.

This engine system may then be operated at the tactical idle speed during periods when heavy auxiliary power demands are made on the engine. However, even when the vehicle is in the tactical idle mode, it can still accelerate by means of the twist grip signal overriding the controller 828. Additionally, the option of switching off the tactical idle mode provided for fuel conservation.

Figure 11B:
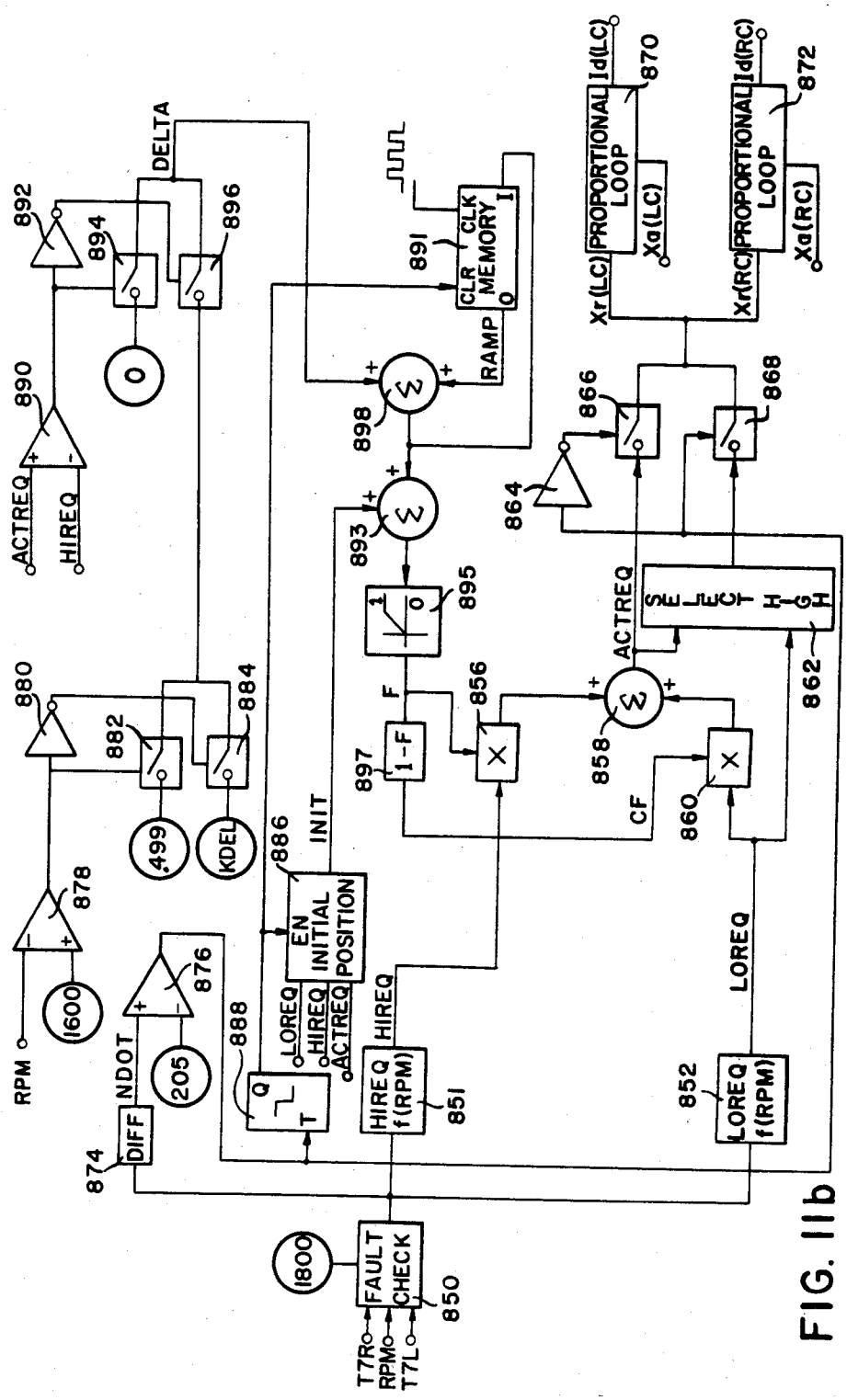
FIG. 11b is a detailed system block diagram of the compressor portion of the turbocharger control illustrated in FIG. 1.

FIG. 11b illustrates a detailed system block diagram of the compressor section of the turbocharger control. Functionally, the compressor section of the control acts to take the RPM signal and from its value generate the position requests Xr(LC), Xr(RC) for proportional control loops 870 and 872, respectively. As was pointed out before, these proportional control loops are implemented by the analog driver circuits 234 and 236 as pictured in FIG. 2.

The value that becomes a position request Xr is generated by a variable which is either the output of switch 866 or the output of switch 868. The inputs to these switches 866, 868 are from the output of a summing junction 858 and the output of a select high gate 862, respectively. Depending upon the logic level input to the control inputs of the switches from the output of comparator 876 and inverter 864, either switch 866 will be open and switch 868 will be closed or vice versa. The output of the summing junction 858 is a variable ACTREQ which is a calculated actuator request value from the combination of two request schedules 851 and 852. The output of the select high gate 862 is the higher (more positive) of the actuator request signal ACTREQ and the output of the schedule 852 which is a low request value LOREQ. Therefore, a logical one from the comparator 876 will close switch 868 to provide the higher of the actuator request ACTREQ and the low request value LOREQ for the position request Xr and a low level logic signal from the comparator 876 will close switch 866 to generate the actuator request ACTREQ for the position request Xr.

The output of the comparator 876 is determined by the value of the acceleration parameter NDOT received at the noninverting input of the device. This value is compared to a reference value for acceleration, 205 rpm/sec, which is input to the inverting input of the device. The acceleration parameter NDOT is generated from the output of a differentiator 874 which receives the RPM signal from the output of a fault checking circuit 850. The comparator 876 will output a logical one value when the parameter NDOT is greater than the acceleration value 205 rpm/sec., and will output a logical zero level when NDOT is less than the reference.

The scheduled request value HIREQ, LOREQ are generated from schedules 851, 852, respectively which receive the value for the engine speed RPM from the fault-checking circuit 850. The particular schedules stored are those illustrated in the graphical representation or the tabular form in FIG. 9a for the compressor control maps. The high request values HIREQ correspond to positions associated with curve 800 and the low request values LOREQ correspond to positions associated with curve 804. The high request value HIREQ is input as one term of the product of a multiplier 856, while the low request value LOREQ is input as one term of the product of a multiplier 860. The high request HIREQ is multiplied by a factor F input as the other term of the multiplier 856 and the low request LOREQ is multiplied by a cofactor CF input as the other term of the multiplier 860. The products of the two multipliers are then combined in the summing junction 858 to become the actuator request ACTREQ. The multiplication cofactor CF is generated from functional block 897 by subtracting the multiplication factor F from one. The factor F is limited by limiter block 895 between the values of zero and one and is generated as the output of summing junction 893.

Because the multiplication factor F takes on the values from zero to one, it is seen that the actuator request value ACTREQ will be limited to values between the low request LOREQ and the high request HIREQ. For example, when the multiplication factor F is zero, and the cofactor CF one, the actuator request ACTREQ will be equal to the low request LOREQ and when the multiplication factor F is one, and the cofactor CF zero, then actuator request ACTREQ will be equal to the high request value HIREQ. As the factor F moves between zero and one, the actuator request ACTREQ will additionally be constrained to move between the two values of the low request LOREQ and the high request HIREQ for any engine speed. This constrains the value of the actuator request ACTREQ between the graphical representations 800, 804 as seen in FIG. 9a.

The multiplication factor F is a summation of an initial value INIT input to summing junction 893, an incremental value DELTA input to summing junction 898, and a historic value RAMP input to summing junction 898. The two summing junctions 893 and 898, therefore, combine these values such that the multiplication factor F is equal to the summation of the values INIT, RAMP, and DELTA. The historic value RAMP is the output of a integrator or memory 891 which is clocked by an oscillator signal applied to its input CLK. The input of the memory is the output of the summation gate 898 which on every clock pulse, transfers that parameter to the memory to be output one clock pulse later as the new value of RAMP.

Therefore, the multiplication factor F begins at the initial value INIT and is increased by an increment DELTA for every clock period that its value is between zero and one. The initial position INIT is calculated by an initial position circuit 886 having as inputs the low request LOREQ, the high request HIREQ, and the actuator request ACTREQ. The initial position from this circuit 886 is calculated as the ratio of a first and second difference. The first difference is the value LOREQ minus ACTREQ and the second difference is HIREQ minus ACTREQ. This ratio is representative of the distance ACTREQ is between the values LOREQ and HIREQ expressed as a percentage. Therefore, the initial position INIT is zero if the actuator request ACTREQ equals the low request LOREQ and one if the actuator request ACTREQ equals the high request HIREQ.

The incremental change value DELTA is calculated as one of three values depending upon the operational state of four switches 882, 884, 894, and 896. Switches 894 and 896 are closed and opened alternately by the output of comparator 890 by means of their control inputs and inverter 892. If the comparator 890 has a high logic output, switch 894 will be closed and DELTA will be the referece value zero connected to the input of that switch. If the output level of the comparator 890 is a low logic signal, inverter 892 will apply a high level signal to close switch 896 and, therefore, generate DELTA as either the output of switch 882 or the output of switch 884. Switch 882 has an input reference value of 0.499 and switch 884 has an input reference value of a constant KDEL. Depending on the the output logic level of the comparator 878, one of these reference values will be applied to the input of switch 896 and become the value DELTA. Comparator 878 controls the switches 882 and 884 via their control terminals and inverter 888 to close switch 882 when its output level is a high logic value and to close switch 884 when its output level is a low logic signal. The comparator 878 compares the value of the RPM signal to a reference value of 1600 RPM and generates a high level logic signal when the engine speed is less than 1600 and a low level logic signal when the engine speed is greater than 1600 RPM.

The operation of the compressor portion of the turbocharger control will be more fully described with reference to FIG. 9a and the block diagram in FIG. 11b. Initially, the RPM value is checked against the temperature values T7R, T7L in the fault checking circuit 850. If the fault check is passed, then the RPM value is differentiated and compared to the acceleration value 205 rpm/sec. If the engine is accelerating faster than this value, the select high gate 862 will choose the higher of the values from the actuator request ACTREQ or the lower request LOREQ. Thus, when the engine is under a major acceleration, the compressor actuator will remain stationary if the actuator request ACTREQ is larger than the low request LOREQ and thereafter move up the low request schedule until the acceleration is less than reference value.

When the acceleration value becomes less than the reference value, the flip flop 888 will generate a pulse to circuits 886, 891, and an initial position value INIT will be generated from circuit 886 and the RAMP value cleared to zero. Thereafter, the system will move the actuator position ACTREQ from the initial position INIT toward the high request HIREQ. The speed at which the system moves the request is based upon the change value DELTA and the frequency of the iteration or clock rate. If the engine speed is below 1600 RPM the reference value 0.499 is used for DELTA and the system makes the step to the high request schedule in two time periods. However, if the RPM value of engine speed is in excess of 1600, then the reference value KDEL is provided through switch 896 and 884. The constant DELTA added every time period to the sum in memory 891 provides an increasing RAMP signal with a constant slope producing a predetermined delay between transferring the system from the low schedule value LOREQ to the high schedule value HIREQ.

Returning now to FIG. 9a, it is seen that since the DELTA value is constant when the engine speed is in excess of 1600, the delay will be proportional to the distance that the two schedules are separated from each other. In the Figure, it is shown that the least amount of delay is encountered at the lowest of the transition speeds, 1600 RPM, and the longest delay is encountered at the highest speed value 2600 RPM.

Figure 11C:
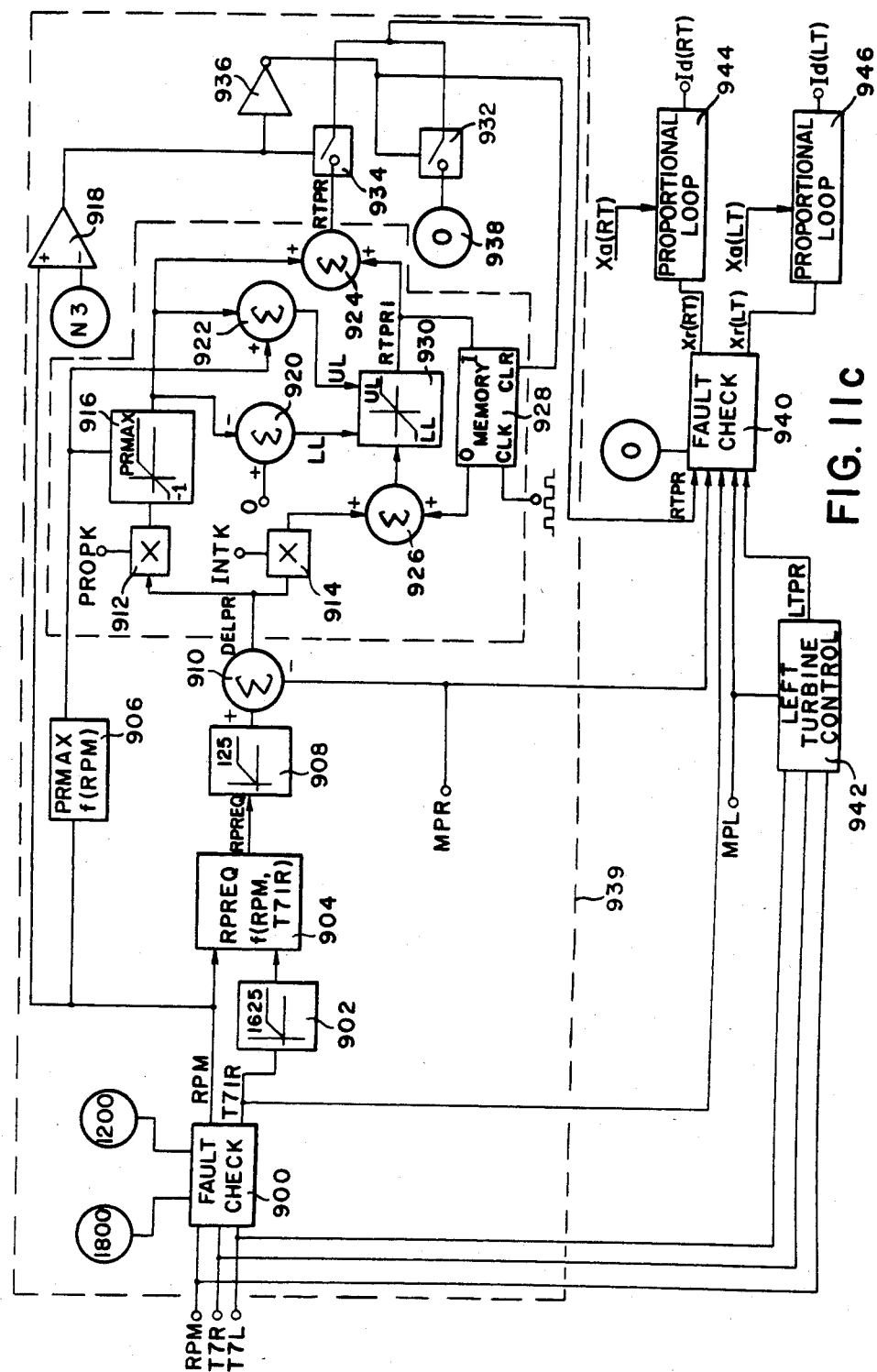
FIG. 11c is a system block diagram of the turbine portion of the turbocharger control illustrated in FIG. 1.

The system block diagram for the turbine portion of the turbocharger control will now be more fully explained by reference to the FIG. 11c. Functionally, the turbine portion of the turbocharger control comprises two controllers 939 (the only one shown in detail), and 942 which produce a right turbine position signal RTPR and a left turbine position signal LTPR, respectively, from the engine speed signal RPM, the temperature signals T7R, T7L and the manifold pressure signals MPR, MPL. Each controller 939, 942, is identical except that they use the temperature and manifold pressure parameters associated with the cylinder bank which is being controlled. Therefore, only the explanation of the right turbine controller is needed in detail to understand the invention.

After they are generated, the position signals LTPR, RTPR are checked for accuracy by testing the pressure signals MPL and MPR, upon which they are based, in the fault checking circuit 940. If the fault check finds that a particular pressure measurement, for example, MPL is valid, then the position signal LTPR will be taken to become the position request signal for the left turbine $X_r(LT)$. Otherwise, the fault checking circuit 940 will replace the position signal LTPR with the position signal RTPR after checking to determine whether the manifold pressure signal MPR is valid. In a similar manner, the manifold pressure for the right bank MPR is checked and the position signal RTPR validated to become the position request for the right turbine $X_r(RT)$. The position request signals $X_r$ are received by the proportional loops 944, 946 where they are differenced with the actual position signals $X_a$ to provide the driving currents $I_d$ as previously described. The proportional loops 944 and 946 are implemented by the current driver circuits 236 and 240, respectively, in FIG. 2.

With respect now to the right turbine control portion of the system 939, the RPM value and the temperature value for the right turbine T7R are brought into a fault checking block 900 to determine the validity of their values. If the RPM value passes the fault test, it is transmitted to a first schedule 904, a second schedule 906, and the noninverting input of comparator 918. If the temperature value T7R passes the fault checking, then it becomes the value T7IR which is input to the first schedule 904 through a limiter 902. The limiter 902 limits the value of T7IR to less than or equal to 1625° F.

The fault checking circuit 900, if it finds that the T7R value is invalid will additionally check the T7L value to determine if it is valid. If the checking circuit finds that the left bank temperature value T7L is correct and the right incorrect, it will then replace the T7R value with the T7L value. If it finds both temperature values invalid, then it will replace the T7R value with a constant 1200° F. The faultchecking circuit also determines if the RPM value is valid for the particular operating condition of the engine. If it finds that the RPM value is invalid, then it will replace the RPM value with a constant value of 1800 RPM.

The first scheduler 904 receives the value RPM and the temperature T7IR value to produce a right pressure request value RPREQ from its output. The schedule stored in the device 904 is that which is more clearly illustrated in FIG. 9b in graphic and tabular form and is the optimum manifold pressure desired for the engine at the particular operational speed and exhaust gas temperature. The pressure request RPREQ is limited to less than or equal to 125 PSI before being input to summing junction 910. The actual manifold pressure for the right bank of the engine MPR is input to the other terminal of the summing junction and is subtracted from the pressure request value RPREQ to form an error value output from junction 910.

The magnitude of the error output from summing junction 910, therefore, is an indication of the difference between an optimum desired manifold pressure and the actual manifold pressure of the right cylinder bank of the engine at this particular engine operating point. This error value is acted on by an integral plus proportional control (illu-within the dotted block as element 911) to produce the position signal RTPR input to a switch 934. When switch 934 is closed, the RTPR signal is input to the fault checking circuit 940 as previously described and thereafter differenced in proportional loop 944 to direct the turbine actuator in a manner to null the manifold pressure error.

The error signal output from the summing junction 910 is acted on by the proportional plus integral control 911 through a proportional loop comprising a multiplier 912 and a limiter 916. The multiplier 912 multiplies the error times a proportional constant PROPK and the limiter 916 limits the product output from multiplier 912 between the limits of a variable PRMAX and −1. PRMAX is developed from the second scheduling circuit 906 which develops the variable as a function of RPM. The schedule stored in the scheduling circuit 906 is that which is more fully illustrated in FIG. 10b. The proportional plus integral control 911 further includes an integral path including multiplier 914, summing junction 926, limiter 930, and integrator or memory 928. In the integral path the error signal which is the output of summing junction 910 is multiplied within multiplier 940 by the integral constant INTK. The output of the multiplier 914 is one input to summing junction 926 whose output is limited by the limiter 930. The output of the limiter is fed back to the other input of the summing junction 926 via the memory 928 which delays the variable RTPRI one time period. The time periods are formed by an oscillator signal input to the clock input CLK of the memory.

The integral path integrates the limited error signal RTPRI to provide a integrator with resettable error limits UL and LL. The upper limit UL of the integrator error signal is generated as the output of summing junction 922. This output is the difference between the variable PRMAX and the proportional output from limiter 916. The lower limit LL is the output of summing junction 920 which is the difference of a reference value zero and the output of the limiter 916. The outputs from the proportional path and the integral path are combined in summing junction 924 to become the position signal RTPR.

In operation, the turbine section of the turbocharger control acts to position in a closed loop manner the turbine actuator in a direction to null the difference between the pressure request value RPREQ and the actual pressure value MPR. The movement of the actuator causes more or less exhaust pressure to be applied to the turbines, thereby changing the speed of the compressor and thereby manifold pressure.

The proportional-integral controller 911 acts to limit the pressure request RTPR between values of zero and PRMAX which is a function of RPM. The controller 911 further acts to accurately position the actuator in the steady state by utilizing the integrator to null the error signal without proportional droop while providing a responsive control with the proportional path.

The switches 932, 936 in combination with the comparator 918 disable the turbine actuator positioning control until the engine speed RPM exceeds the reference value N3. The reference value N3 is generally that speed which is used to determine whether the engine has started and is operational as will be more fully described in the start and shutdown sequence control hereinafter.

To facilitate the transfer of data and the particular state of tne system in any point in time, the processor module under program control of the real time task monitor uses four memory locations which have specific bits set or cleared to indicate particular states or operational conditions of the system. The four words are shown pictorially in FIG. 12 with their bit positons containing the names of the data and state conditions on which the system will operate. By testing these bit positions in certain routines subsequently to setting the same in other routines, software tests for logical conditions, the recognition faults, and program flow are greatly facilitated.

The first memory word in this group is termed the input word and has the memory label DISIN. The input word which is sixteen bits in length uses bits 2–7 to indicate the condition of the input switches 65, 67, 69, 71, 73, and 75 of FIG. 1. The input word uses positive true logic in which the presence of the bit will indicate the closure of a switch and in which the absence of a bit will indicate the switch is open. Bit 2 indicates that the tactical idle switch 65 is closed, bit 3 indicates that the fault reset switch 67 is closed, bit 4 indicates that the automatic/manual switch 69 is closed, bit 5 indicates that the flame heater switch 71 is closed, bit 6 indicates that the shutdown switch 73 is closed, and bit 7 indicates that the start switch 75 is closed.

Similarly, an output word is provided which has the memory label DISOUT and has a plurality of bit positions for indicating which of the discrete output drivers are enabled. The output word DISOUT is 16 bits in length where bits 0–7 and bits 12–15 are used for indicating the enablement of particular output drivers. The output word DISOUT uses positive true logic where the presence of a bit indicates the enablement of an output driver and the absence of a bit indicates the disablement of the driver.

Bit 0 is used to enable the flame heaters driver to produce the signal FHD, bit 1 is used to enable the rear fuel pump driver to generate the signal RFP, bit 2 is used to enable the cutoff driver to generate the signal COS, bit 3 is used to enable the accessory relay driver to generate the signal ARR, bit 4 is used to enable the runtime meter driver to generate the signal RTM, bit 5 is used to enable the turbocompressor fault driver to generate the signal VAF, bit 6 is used to enable the low voltage monitor driver to generate the signal LVM, bit 7 is used to enable the overpressure lamp driver to generate the signal OPF, bit 12 is used to enable the VAT sensor fault driver to generate the signal VSF, bit 13 is used to enable the overtemperature driver to generate the signal OTF, bit 14 is used to enable the oil-priming pump driver to generate the signal OPP, and bit 15 is used to enable the fuel shutoff driver to generate the signal SHS.

The other two memory words are used as flag words where bits are set to determine states for the engine system at particular points in time. The first flag word has the memory lavel FRWDL is a 16-bit word where bits 0–10, and 12 are used to provide an indication of status. The first five bits, bits 0 through 4, are used to indicate the status of timers A–E, respectively. The presence of a bit in the word indicates that the respective timer is active and that the absence of the bit in these positions indicates that the timer is inactive. Bits 6 and 7 are used in the start and shutdown functions where the presence of the bit indicates that the associated function is in a latched operation and the absence of a bit indicates the function is unlatched. Bits 8–10 are speed flags which indicate that the present value of the engine speed, RPM, is less than, equal to, or greater than certain reference values N1, N2, and N3. Bit 8 is set or present when the RPM value is less than or equal to a reference speed N1 while bit 9 is set if the present speed value RPM is less than or equal to the reference speed N2. Bit 10 is set when the speed value RPM becomes greater than the reference speed N3. The presence of bit 12 indicates that the flame heater function should be latched while its absence indicates a nonlatched condition.

The second flag word which has the memory label FWRDL2 is a 16-bit word in which bits 0–6 and 11–15 are again used to indicate the status of functions in the system. Bits 0 and 1 are used in the start and shutdown functions to indicate that the start timer or the stop timer is active. Bit 2 records a fault for the temperature sensor value T7L, while bit 3 records a fault for the temperature sensor value T7R. The presence of bits 4 and 6 record faults for the right and left pressure sensor values PRR and PRL, respectively. The presence of bit 5 indicates that the engine is sustaining an acceleration in excess of 205 rpm/sec. Bit 11, when set, indicates that the speed sensor has been determined to have generated a faulty value RPM. Bits 12–15 indicate, when they are faulty. Bit 12 is indicative of a left compressor actuator fault, bit 13 is indicative of the right compressor actuator fault, Bit 14 is indicative of a left turbine actuator fault, and bit 15 is indicative of a right turbine actuator fault.

Figure 13:
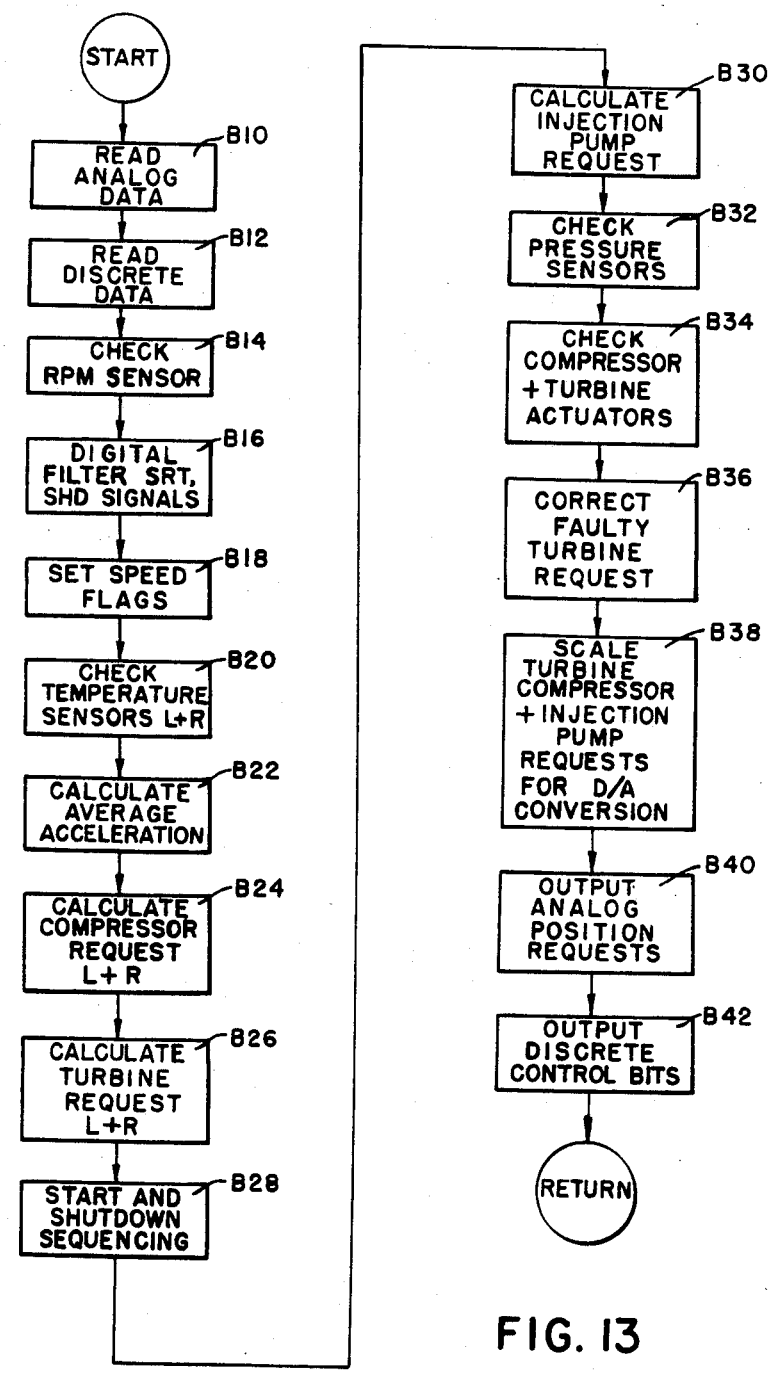

The real time task monitor will now be more fully described with respect to FIG. 13. In the Figure there is shown that the real time tasks or routines that the monitor is required to complete during every major cycle time of the program. Included in these tasks are reading and storing the analog data in Block B10 and reading and storing the discrete data in Block B12. An RPM sensor check is completed in Block B14 and a digital filtering of the start and shutdown signals is performed in Block B16. The speed value RPM is compared against certain reference values and speed flags set in Block B18 while the temperature sensors for the left and right cylinder banks undergo a checking routine in Block B20.

The average acceleration of the engine is calculated in Block B22 and the compressor actuator position requests for the left and right compressors are calculated in Block B24. The turbine actuator position requests are calculated in Block B26 and the start and shutdown sequence is performed in Block B28. The injection pump actuator position request is calculated in Block B13 while the pressure sensors are checked in Block B32. The turbine and compressor actuators are checked in Block B34 and a correction of the turbine actuator position requests made in Block B36. The position requests for the turbines, compressors, and injection pump are scaled for D/A conversion in Block B38 and thereafter, output in Block B40. The discrete control bits are output to the driver circuits in Block B42.

The routines corresponding to Blocks B10, B12, B40, and B42 are used to input data to and output data from the four major portions of the electronic control. The injection pump control 78 in FIG. 1 uses the routines implementing Blocks B14, B30, and B38 to produce an injection pump position request Xr(IP). The turbocharger control 80 in FIG. 1 uses the routines implementing Blocks B14, B20, B22, B24, B26, B24, B26, B32, B34, B36, and B38 to produce the position requests Xr(LC, RC, LT, RT). The sequencing control 84 in FIG. 1 uses the routines implementing Blocks B16, B18, and B28 to provide the startup and shutdown sequencing for the engine system. The fault monitor 82 utilizes, in common with other controllers, the routines implementing Blocks B14, B20, B32, B34, and B36 to provide fault indications and failsoft capability for the engine system.

Figure 14:
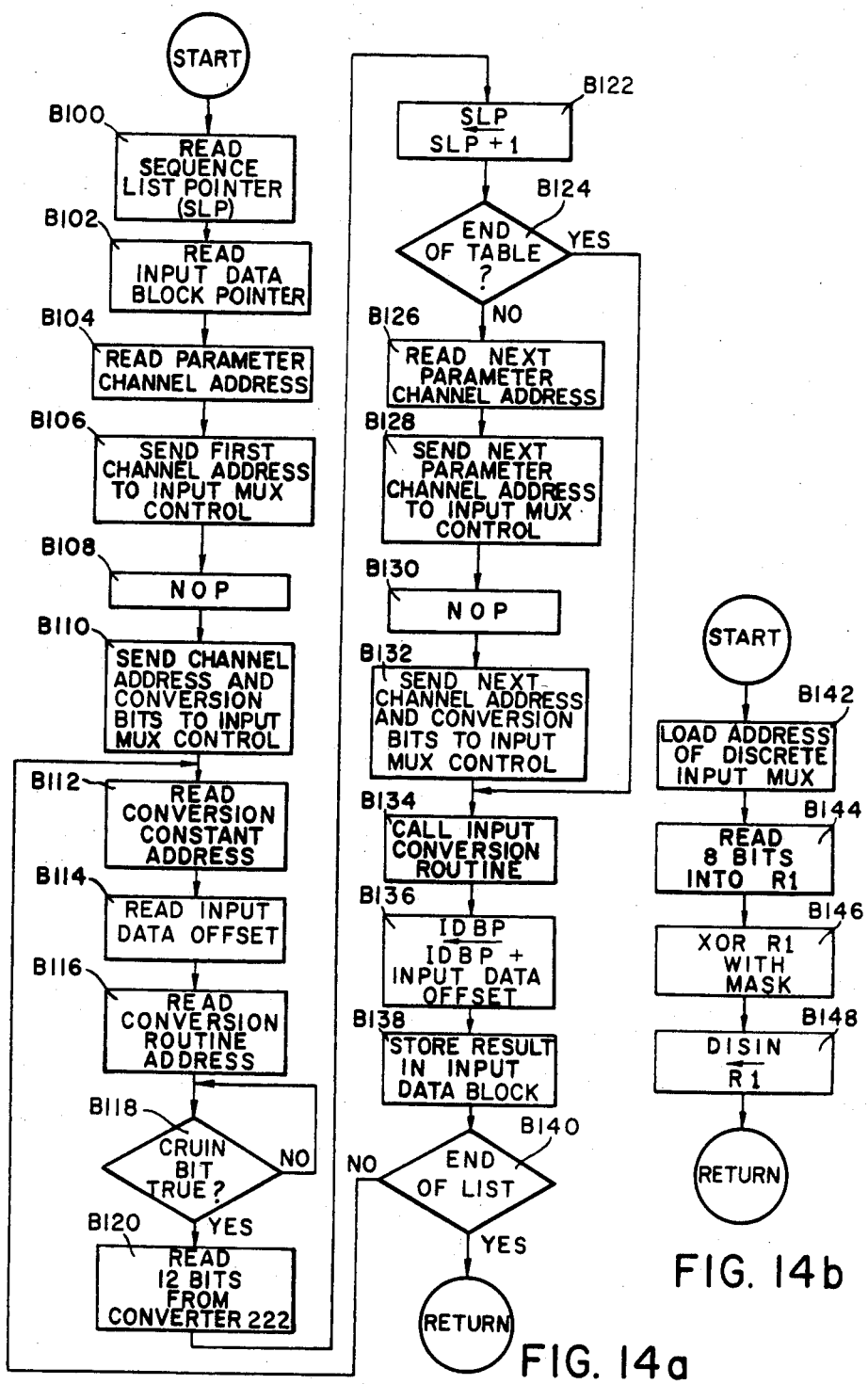
FIG. 14a is a detailed system flow chart for the analog data input routine illustrated in FIG. 13.
FIG. 14b is a detailed system flow chart of the discrete input data routine illustrated in FIG. 13.

The software routines that read the analog data and discrete data into memory as indicated by Blocks B10 and B12 in FIG. 13 are more fully illustrated in the detailed flow charts of FIGS. 14a and 14b. The routine of FIG. 14a is used to read the analog signals into the processor memory and the routine of FIG. 14b is used to read the discrete bit signals into the processor memory.

The analog signals are read into a reserved place in memory by storing them in an input parameter list more fully illustrated in FIG. 10a. The input parameter list as shown has a memory position, which can be more than one word in length for all analog data inputs. The start of the memory locations forming the input parameter list are pointed to by a pointer which is the input data block pointer IDBP. Associated with each of the input parameters in the list is a four-part entry in an input parameter table also shown in FIG. 10a. The input parameter table has as many four-part entries as there are parameters in the input parameter list and is terminated by an end-of-table indicator EOT. An additional list, termed the input table list, is used to store the addresses AD1, AD2 . . . ADN which locate the table entries. This list has an address corresponding to each entry in the table and is headed by a sequence list pointer SLP and terminated by an end of list indicator EOL.

Each entry in the table is associated with a corresponding data parameter and is four words in length indicating first, the random access memory offset which should be added to the IDBP pointer address to determine the next entry in the table. The second word in the table entry is a parameter channel address which indicates the address needed by the input multiplexer control to determine which multiplexer channel with which the particular input parameter is associated. The third word in the entry of the input parameter table is a conversion constant address which indicates the location of a constant associated with the particular input parameter. This conversion constant is used in an input conversion routine with respect to the parameter chosen to convert it to a scale that can be used by the particular controller or fault monitor receiving that parameter. The last word in the list is a conversion routine address used to call special subroutines into the input conversion routine for the particular parameter.

With this memory structure in mind, the formation of the input parameter list will now be more fully explained by reference to FIG. 14a which reads in the analog parameters into memory. In Block B100 the sequence list pointer, SLP, is read to determine the address of the first entry of the input parameter table. Next, in Block B102 the input data block pointer, IDBP, is read to determine the location in the input parameter list associated with the first entry of the input parameter table. Next, in Block B104 the channel address of the particular parameter is read from the second word of the entry in the input parameter table to determine the channel address of the input multiplexer that needs to be enabled for the data.

The channel address is then sent up to the input multiplexer control to enable the associated analog input multiplexer channel and thereafter a NOP instruction is executed in Block B108 to allow the input input multiplexer to settle. After executing the NOP instruction, the address of the A/D converter is sent to the input multiplexer control along with address bits indicating that a conversion should begin in Block B110. begin. This action initiates the conversion of the particular analog parameter chosen by the channel address into a digital word that can be read into memory. While the A/D converter is converting the first analog input to a digital number, the input data offset, the conversion constant address, and the conversion routine address, are read into memory in Blocks B112, B114, and B116. Next in Block B118, the CRUIN bit is tested for its presence. If the bit is present, this indicates that the A/D converter has completed its task and the digital word representing the parameter can now be read into memory. Thus, an affirmative answer will transfer control to Block B120 where the 12 bits from the A/D converter are read into a register. If the CRUIN bit is not present in Block B118, the processor cycles in a loop until the bit becomes true and the conversion is finished.

After the first digital word has been read into memory the sequence list pointer SLP is incremented by one in Block B122 to point to the address of the next entry in the input parameter table. In Block B124 the contents of that address are tested to determine if the end of table indicator EOT is present. If the answer is affirmative, the control of the program branches to Block B134, while, if negative, the next parameter channel address is read into memory by Block B126. If this path is taken, Block B128 thereafter sends the next parameter channel address to the input multiplexer control to enable that channel. In Block B130 a NOP instruction is executed to again allow the input multiplexer to settle. After settling, the processor sends the A/D converter address and conversion bits to the input multiplexer control to begin another conversion of the next parameter.

Thereafter, both paths from the end-of-table Block B124 and from Block B132 converge at Block B134 where the input conversion routine is called. The input conversion routine uses the value of the parameter in the input register, the conversion constant address, and the conversion routine address, to convert the parameter to a correct scale for the controllers. Next, this result is stored by Block B136 into the input parameter list depending upon the address pointed to by the input data block pointer IDBP in addition to the input data offset. After the data has been stored, the input table list is checked to determine whether the pointer SLP now indicates an end-of-list indicator EOL in Block B140. If the end-of-list indicator EOL is present, the routine is finished and returns to the next task in the real time task monitor. If all the parameters have not yet been stored in memory, the program sequence is back to the start of Block B112 where the input data offset, the conversion constant address, and the conversion routine address for the next parameter are read by Blocks B112, B114, and B116.

The routine, therefore, accomplishes an efficient conversion of the analog parameters and permits each analog signal to be converted to a digital number and thereafter stored in memory in an orderly and facile manner. It should be noted that Blocks B126–B132 permit the start of an analog-to-digital conversion prior to calling the input conversion routine. This method of operation saves processor time as the input conversion routine and the storing of the digital number into the input parameter list may be done simultaneously with the analog-to-digital conversion of the next parameter. Because of the long list of analog parameters to be converted and read into memory, this time-saving step of simultaneously converting one parameter while scaling another saves significant processor time.

FIG. 14b indicates the conversion routine used to read in the discrete input bits. In Block B142 the address of the discrete input multiplexer is loaded into the CRU register. From that address and the next eight addresses the bits of the multiplexer are read into a storage register R1 in Block B144. Next, the register R1 is exclusively ORed with a mask to provide an inversion from negative true logic to positive true logic for the input switches. Thereafter, in Block B148 the input word DISIN is loaded with the contents of the register R1 in Block B148. The program thereafter returns to the real task monitor for the next routine in the sequence.

Figure 15:
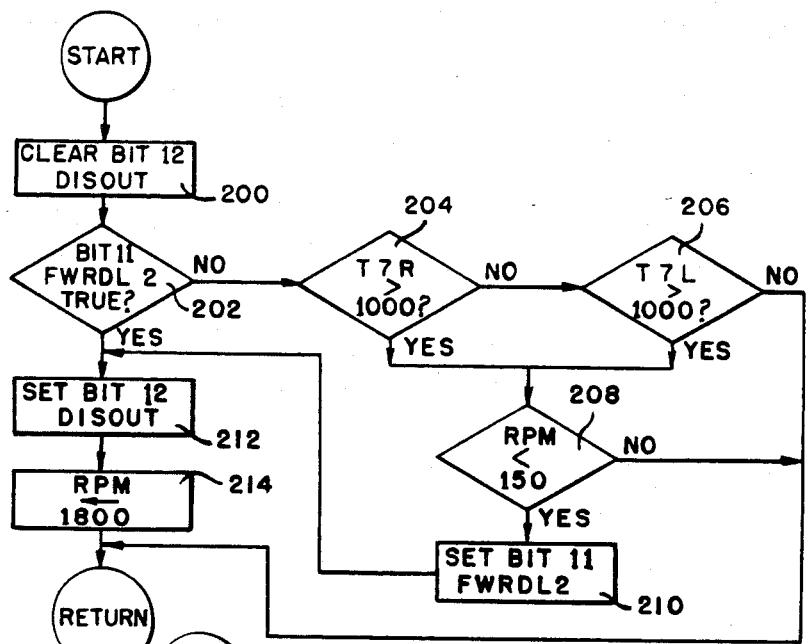
FIG. 15 is a detailed system flow chart of a RPM sensor check routine illustrated in FIG. 13.

In FIG. 15 there is more fully set forth the sequence of operations used to test the RPM sensor for operability and to allow the system to fail soft in the event of such failure. The routine illustrated in FIG. 15 implements the functional block labelled B14 in FIG. 13. In Block B200 bit 12 of the output word DISOUT is cleared. This bit in the output word indicates whether a turbocharger sensor fault has been recorded. The program continues to Block B202 where bit 11 of the second flag word FWRDL2 is tested. Bit 11 in this memory word is the location for the flag indicating that RPM sensor fault has been logged. If the sensor is not faulty the flag will not be set and the test will be failed moving program flow to Block B204. In that block the right turbine inlet temperature T7R is tested to see whether it is greater than 1,000° F. If the result of that test is negative, the program flows to block B206 where the left turbine inlet temperature T7L is tested for the same condition, that is whether it is greater than 1000° F. If both temperature sensors indicate readings below this threshold temperature, then the program cannot make the RPM test and the program returns to the real time test monitor to perform the next sequential task.

However, if either of the temperature sensors passes the test in Blocks B204, 206, the routine flow reverts to Block 208 where the RPM value is tested to see whether it is greater than 150 rpm. The test envisions that if either of the temperature sensors read in excess of 1000° F., then the RPM reading must be greater than 150 rpm to be valid. If the RPM value is greater than the 150 rpm in this situation, the program flow returns to the next sequential task in the real task monitor as the sensor value is taken as valid. However, if the RPM value is less than 150 rpm, it can be assumed that this value is in error and the system should take remedial action. Therefore, program flow is transferred to Block B210 where the RPM fault flag is set. The RPM fault flag, as mentioned before, is bit 11 of the second flag word FWRDL2. Program flow then proceeds to Block 212 where the system will record the turbocharger sensor fault by setting bit 12 of the output word DISOUT. The program then flows to Block B214 where the RPM value is replaced by a constant value 1800 RPM. After the program has found an RPM sensor fault, on the next passage through the routine starting at Block 200, bit 11 of FWRDL2 will be true when the test in Block 202 is completed. The program path upon finding the RPM sensor fault flag set is to transfer program control to Block B212 and thereafter Block B214.

This action allows the system to test the RPM sensor for a fault if either of the temperature sensors is working and to supply a failsoft value when the sensor is found to be nonoperable. Further, the routine provides an operator indication through the output word DISOUT that one of the turbocharger sensors is faulty.

Figure 16:
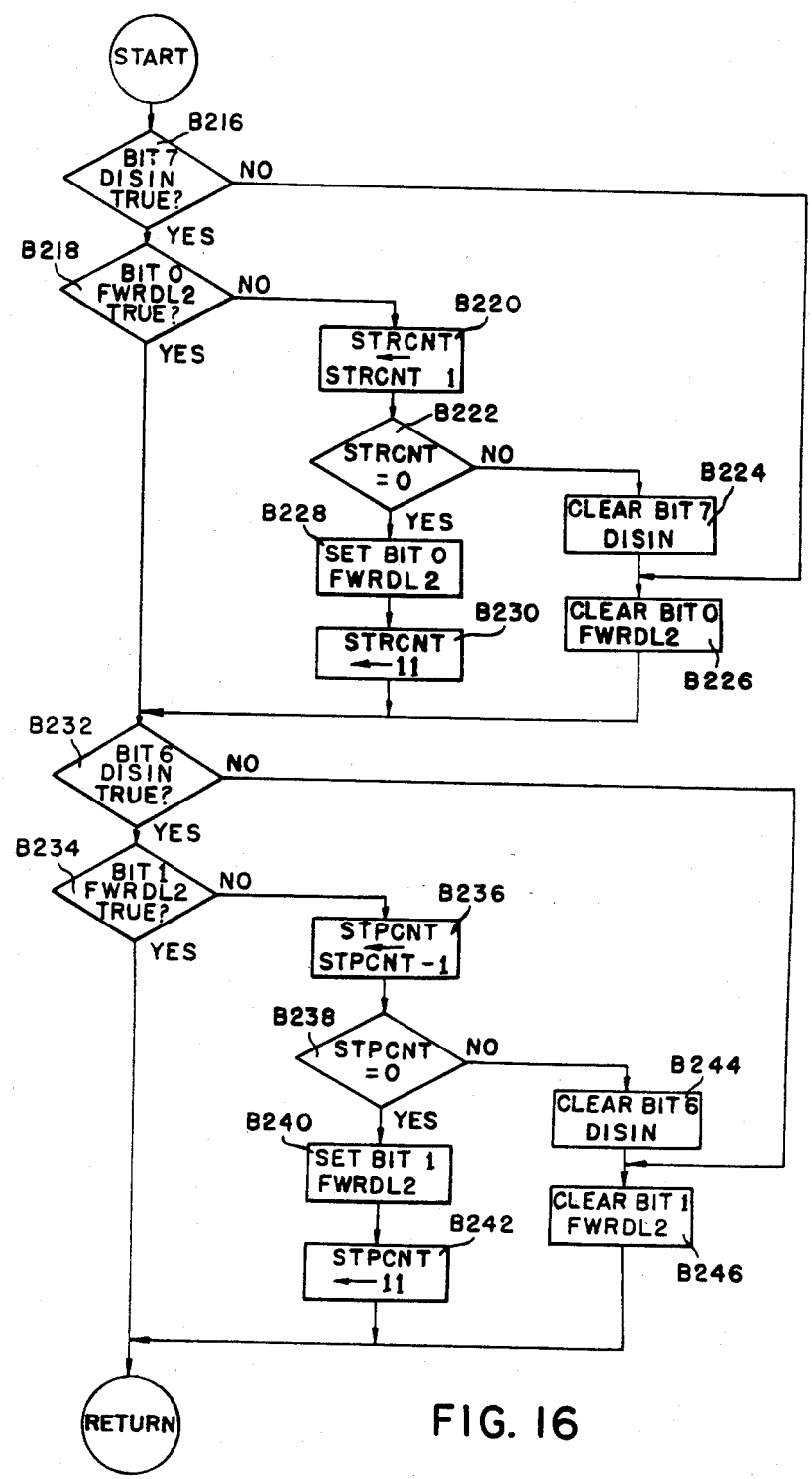
FIG. 16 is a detailed system flow chart of the digital filter routine illustrated in FIG. 13.

FIG. 16 shows the routine which performs the digital filtering of the start signal SRT and the shutdown signal SHD. This routine is an implementation of the function illustrated as Block B16 in FIG. 13. The sequence begins by testing in Block 216 whether bit 7 of the input word DISIN is true. The presence of bit 7 indicates that the start switch has been closed for this particular processor time period. If the inquiry finds that the bit 7 has not been set, the program flows to Block B226 where bit 0 of the second flag word FWRDL2 is cleared deactivating the start timer flag. The program then continues to Block B232 where bit 6 of the input word DISIN is tested. If this bit is not true then the shutdown switch has not been closed and the program flows to Block B246 where bit 1 of the second flag FWLDRL2 is cleared. Clearing bit 1 deactivates the stop timer flag after which the program returns to the next sequential task of the real time monitor. In this manner if neither the start nor the shutdown switches have been operated, the two bits 6 and 7 in the input word DISIN will not be true and the program takes the path from Block B216 to Blocks B226, B232, and B246, and then exits.

However, if bit 7 is true, then the program will branch to Block B218 where bit 0 of the second flag word FWRDL2 is tested. If bit 0 is not true then the program flows to Block B220 where a previous constant the start count STRCNT is decremented by one. The start count STRCNT is then tested for a time out in Block B222. If the start count STRCNT is not 0, then the program flows to Block B224 where bit 7 of the input word DISIN is cleared. Thereafter, bit 0 of the second flag word FWRDL2 is cleared. This operation begins a counting loop where the start bit, bit 7 of DISIN is tested each frame time through the loos B216, B218, B220, B222, B224, and B226. Every time that the start bit appears, it is cleared in Block B224 so that the switch must remain set to produce an eventual time out. However, if the start bit remains set throughout the test (Block B222 test positive), the program flows to Block B228 where bit 0 of the second flag word FWRDL2 is set. This operation indicates that the program has found the start bit to be set for the requisite amount of time. The program thereafter initializes the start count value STRCNT by replacing it with a finite number of iterations in Block B230. Thereafter, when the test accomplished in Block B218 finds the bit 0 of the second flag word FWRDL2 true, the program will flow through to Block B232 instead of decrementing the counter which will occur as long as the start bit remains set.

The shutdown filter acts in a similar manner with a test by Block B232 to determine whether the shutdown switch has set bit 6 in the input word DISIN. If it has, the program flows to Block B234 where bit 1 of the second flag word FWRDL2 is tested to determine if it is set. Unless the shutdown timer has timed out, the bit 1 flag will not be set and program flow will progress to Block B236 where the stop count STPCNT is decremented by one. The stop count value STPCNT is then tested in Block B238 to see if it is zero. If it is not zero, the timer has not timed out and the shutdown bit has not been set the requisite amount of time to provide a valid indication of a shutdown signal. Therefore, the program branches to the Block 244 where the bit 6 of the input word DISIN is cleared. This produces a counting loop until the stop count STPCNT equals zero where the program falls through to Block B240 in which bit 1 of the second flag word FWRDL2 is set. Bit 1 of the second flag word FWRDL2 is the stop timer and the presence of the bit indicates that the shutdown signal has been present the requisite amount of time and the timer has timed out. The program then sequences to Block B242 where the stop count STPCNT is re initialized. The program then proceeds to the next routine in the real task monitor.

Figure 17:
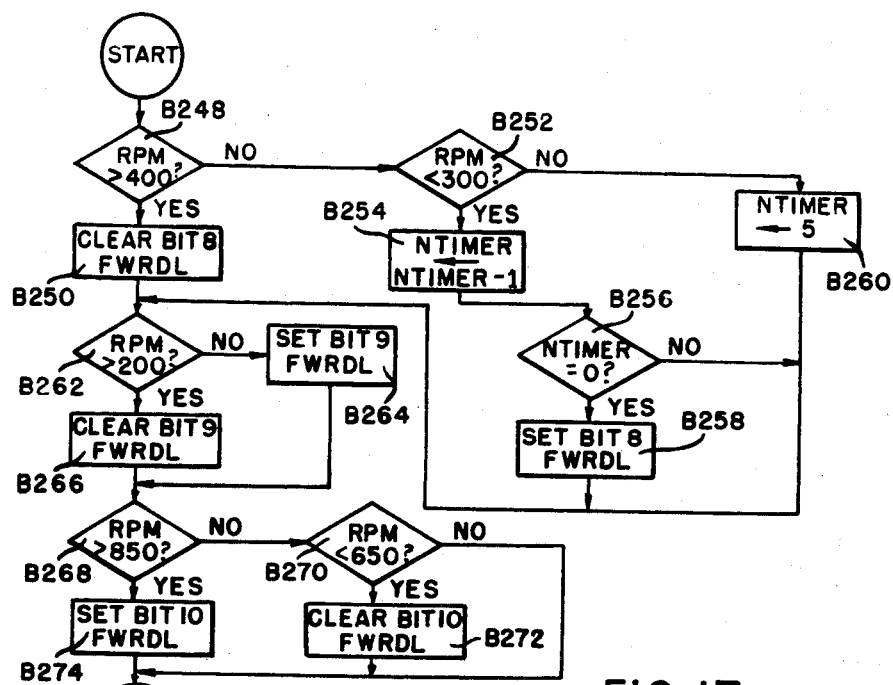
FIG. 17 is a detailed system flow chart of the speed flag setting routine illustrated in FIG. 13.

The next routine illustrated in FIG. 17 in the real task monitor sets and clears a number of speed flags from the value stored as the RPM signal. This routine is an implementation of the functional block B18 in FIG. 8. Bits 8, 9, and 10 in the first flag word FWRDL are the speed flags. If bit 8 in FWRDL is set, it indicates that the present RPM value is less than or equal to a reference speed N1. If bit 9 of FWRDL is set it indicates that the present RPM value is less than or equal to another speed reference value N2. Similarly, if bit 10 is set, that indicates that the RPM value is greater than another speed reference value N3. The three speed flags are used in the start and shutdown sequence to provide adequate spacing between fueling operations before engine starting or in the shutdown sequence.

Block B248 begins the N1 speed flag test and initially inquires whether the RPM value is greater than or equal to 400 rpm. If the RPM value is greater than 400 RPM, then the program clears bit 8 in the first flag word FWRDL. However, if the test is negative the program flow is to Block B252 in which the RPM value is then tested to determine whether it is less than 300 RPM. If the RPM is less than 300, then Block B254 decrements a previously set timer value NTIMER. The next Block B256 determines whether the NTIMER value is zero and if not, ends the test for the first speed flag. The program thereafter flows through the next two sequences to determine the state of the second and third speed flags and then reiteratively enters the first speed flag test. The loop will be continued until the value of NTIMER reaches zero at which time bit 8 of the first flag word FWRDL will be set.

This provides a real time loop where the first speed flag is set only if the RPM value is less than 300 rpm for a predetermined amount of time (NTIMER value). Thereafter, the first speed flag remains set until the engine speed increases beyond 400 rpm. This provides a time delay for setting the first speed flag and a hysteresis speed value for clearing the flag.

The second speed flag routine for the N2 reference is started in Block B262 where the RPM value is tested to see whether it is greater than 200 RPM. If the test is true, the flag is cleared by clearing bit 9 of the first flag word in Block B266 and if the test is not true, by setting bit 9 of the first flag word FWRDL. The test is an absolute one and either sets or clears the second speed flag based upon the present RPM value.

The third speed flag routine for the N3 reference is entered in Block B268 where the RPM value is tested to determine whether it is greater than 850 rpm. If it is, bit 10 of the first flag word is set in Block B274. If not, the program sequences to Block B270 where the RPM value is tested to see whether it is less than 650 rpm. If the answer to this question is yes, then bit 10 of the first flag word is cleared. If the answer is no, then the program will exit to the next task in the real task monitor. This routine provides a third speed flag when the RPM value is greater than 850 rpm and maintains the flag set until the RPM value drops below 650 rpm. Thus, the flag indicates a predetermined speed value, but also has a hysteresis speed value for clearing the flag.

Figure 18:
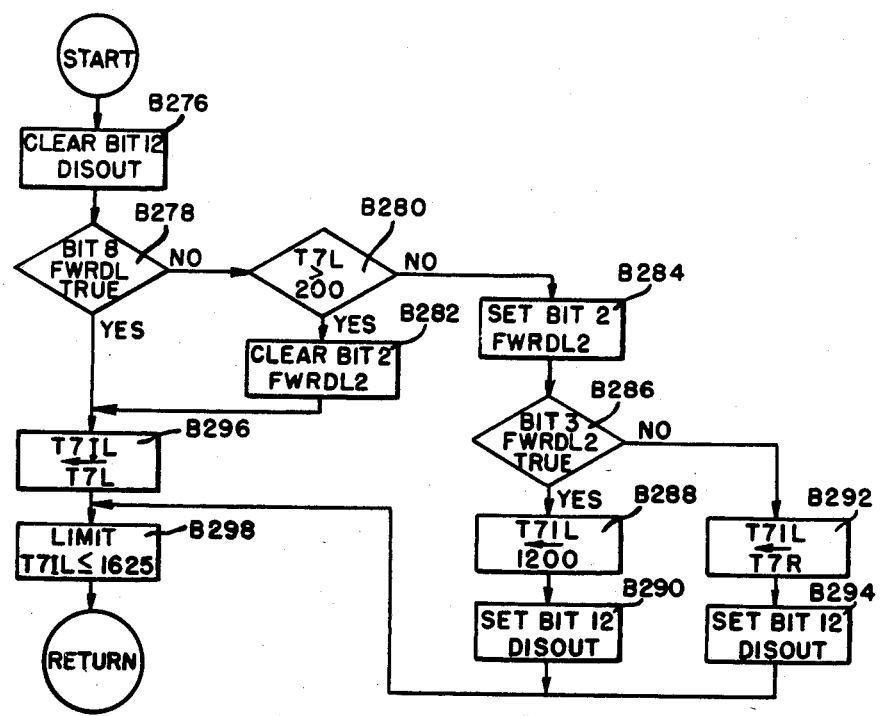
FIGS. 18 and 19 are detailed system flow charts of the temperature sensor checking routines illustrated in FIG. 13.
Figure 19:
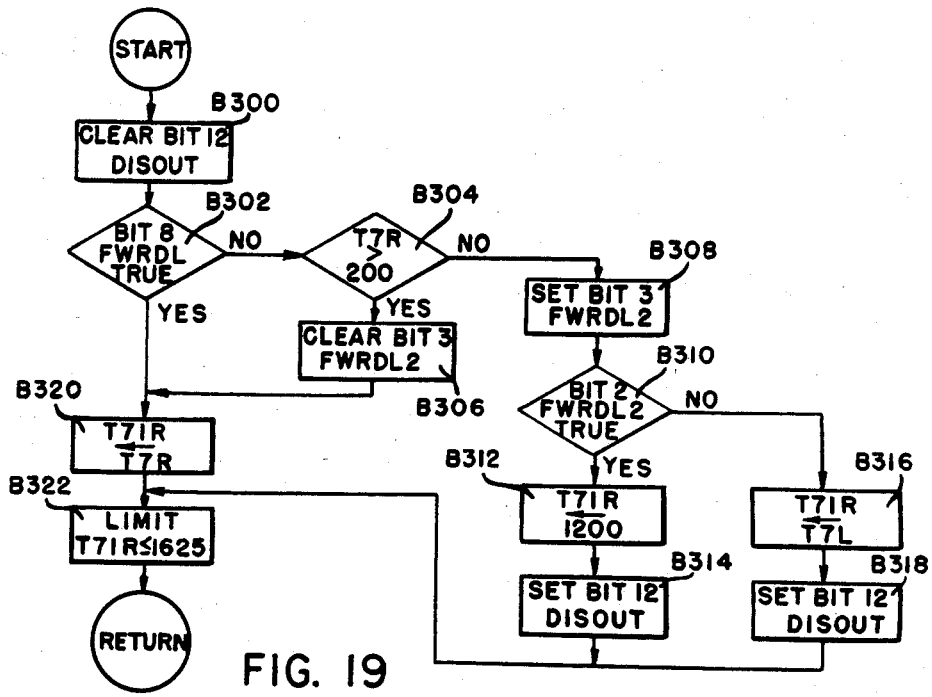

If attention will now be directed to FIGS. 18 and 19, the routines for checking the left and right temperature sensors will now be more fully explained. These routines implement the functional Block B20 in FIG. 13. In FIG. 18, starting at Block B276, the routine for checking the left temperature sensor first clears bit 12 of the output word DISOUT. This bit is the indication of a turbocharger sensor fault and will be reset if the temperature sensor fails the fault test. The program thereafter sequences to Block B278 where bit 8 of the first flag word FWRDL is tested to determine whether it is set. If the flag word has this bit set, the program sequences to Block B296 and no testing of the temperature sensor is accomplished. The tested bit indicates that the engine is not up to starting speed and the temperature sensor test would not provide a valid indication. The Block B296 replaces the intermediate temperature value T7IL with the actual temperature of the left turbine inlet T7L. Thereafter, the intermediate value T7IL is limited to be less than or equal to 1625° F. in Block B298.

If the test fails at Block 278 which indicates that the RPM of the engine is above starting speed or 400 RPM, then block B280 tests the temperature value for the left turbocharger inlet T7L to determine whether it is greater than 200° F. If the RPM value for the engine is above the operational point indicated, then the temperature of the inlet to the turbine should be greater than 200° F. Therefore, if the test is positive, the sensor output value is likely to be valid. The program path thus flows to Block B282 in which bit 2 of the second flag word FWRDL2 is cleared. Bit 2 of the second flag word is indicative of a left temperature sensor fault and is cleared if the sensor passes the test.

However, if the temperature value T7L has not attained 200° F. by the time the RPM reaches the value associated with the first speed flag, the test in Block B280 will fail and Block 284 will set bit 2 of the second flag word FWRDL2 to record the false temperature value.

Bit 3 of the second flag word FWRDL2 is then tested to determine if it is true. If such is the case, this means that neither temperature sensor has produced a valid indication and therefore, the intermediate temperatue value for the left turbocharger T7IL should be replaced by 1200° F. This predetermined constant allows the turbocharger to maintain operation even though neither of the temperature sensors is producing a valid output. Thereafter, in Block B290 bit 12 of the output word DISOUT is set to indicate that one of the turbocharger sensors has developed a fault.

The alternate path from Block B286 is through Block B292 if bit 3 of the second flag word FWRDL2 is not true. If bit 3 is not set, it is assumed that the turbocharger inlet temperature of the right bank T7R is valid and can be used in place of the faulty left bank value. Therefore, the intermediate left bank value T7IL is replaced by T7R in Block B292. The program thereafter flows to Block 294 where bit 12 of the output word DISOUT is set to indicate that one of the turbocharger sensors has developed a fault.

FIG. 19 illustrates a functionally similar routine for determining a fault and providing failsoft capability for the right turbine inlet temperature sensor value T7IR. In Block B300 bit 12 of the output word DISOUT is cleared as was previously described and thereafter the program sequences to Block B302 where bit 8 is again tested to determine whether the RPM of the engine is above a particular point. If such is the case, the test of the value for T7IR is performed in Block B304. If the value passes the test, bit 3 of the second flag word FWRDL2 is cleared in Block B306 and the intermediate temperature value T7IR is replaced by the actual value of T7R in Block B320. The temperature value T7IR is thereafter limited to be less than or equal to 1625° F.

If, as was the case in the previous example for the left cylinder bank, the right temperature value T7R does not pass the validity test, bit 3 of the second flag word FWRDL2 is set in Block 308. The program then sequences to Block B310 where bit 2 of the second flag word FWRDL2 is tested. This bit is an indication of whether the left temperature sensor is still providing a valid output. Under these conditions the intermediate value for the right turbine inlet temperature T7IR can be replaced by the acutal value for the left sensor T7L in Block B316. Afterwards bit 12 of the output word DISOUT is set in block B318 to provide an indication that a turbocharger sensor has produced a fault.

On the other hand if the temperature value for T7R fails the test in Block B304 and further the temperature value T7L fails the test in Block B310, then neither sensor output is valid and Block B312 is used to replace the intermediate right turbine inlet temperature value T7IR with 1200° F. This routine will produce a value that will allow the right turbine section of the turbocharger to operate in the situation of faults on both temperature sensors. It is also noted that the intermediate value of the right turbine inlet temperature T7IR and the left intermediate temperature T7IL are replaced by the same value (1200° F.) when both sensors are faulty so that the two banks will not be unbalanced. After the intermediate value has been determined the program will set bit 12 of the output word DISOUT in Block B314 to indicate that one of the turbocharger sensors has developed a fault.

Figure 20:
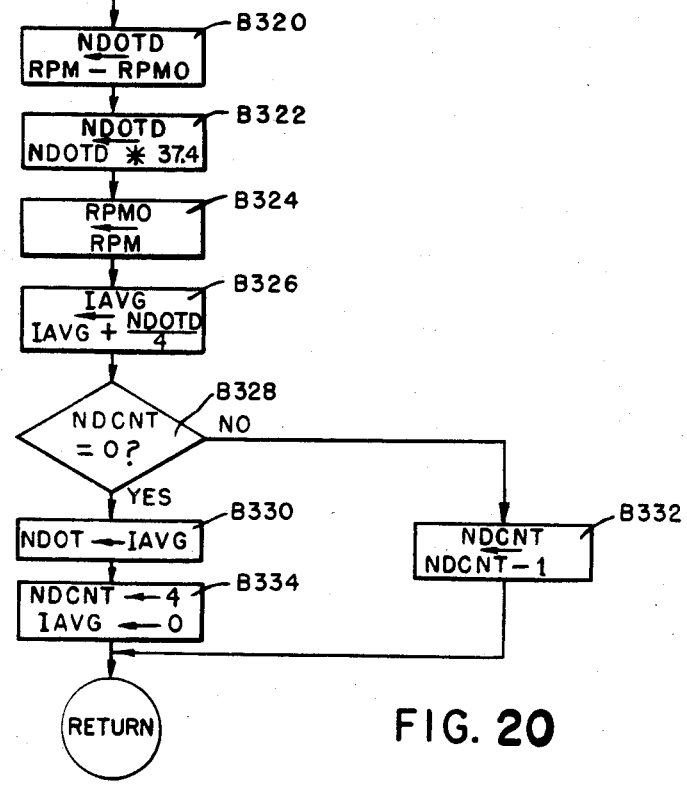
FIG. 20 is a detailed system flow chart of the average acceleration calculation routine illustrated in FIG. 13.

FIG. 20 illustrates the routine used for calculating the average acceleration value NDOT from the engine speed value RPM. This routine implements the functional Block B22 of FIG. 13. In Block B320 an intermediate parameter NDOTD is generated by subtracting the present value of engine speed RPM from a previous value RPMO of the last frame. The intermediate acceleration value NDOTD is then multiplied by a constant (37.4) for scaling purposes in Block B322. Block B324 continues the sequence as the present value of engine speed RPM is stored in the subsequent engine speed value location RPMO. An average is then calculated by adding one quarter of the present value of the error difference NDOTD to an intermediate average IAVG in Block B326.

In the next step, represented by Block B328, a count value NDCNT representative of the number of iterations of the average is tested. If the count is not zero, NDCNT is decremented in Block B332. At this point, the program will return to the real task monitor where the sequence is repeated during the next program frame. When the count value NDCNT is finally zero, the intermediats average IAVG is stored in the location whose label is the acceleration value NDOT. Thereafter, in Block B334, the count value NDCNT and the intermediate average value IAVG are initialized by setting them equal to 4 and 0, respectively.

In operation, the program represented in FIG. 20 calculates the instantaneous acceleration by subtracting an old speed value from a new speed value over a small increment of time. The small increment of time is the major program frame rate for the system (27 milliseconds). The average acceleration is found by dividing each instantaneous acceleration value by four and by adding four of the calculations together to produce an average value for NDOT.

Figure 21:
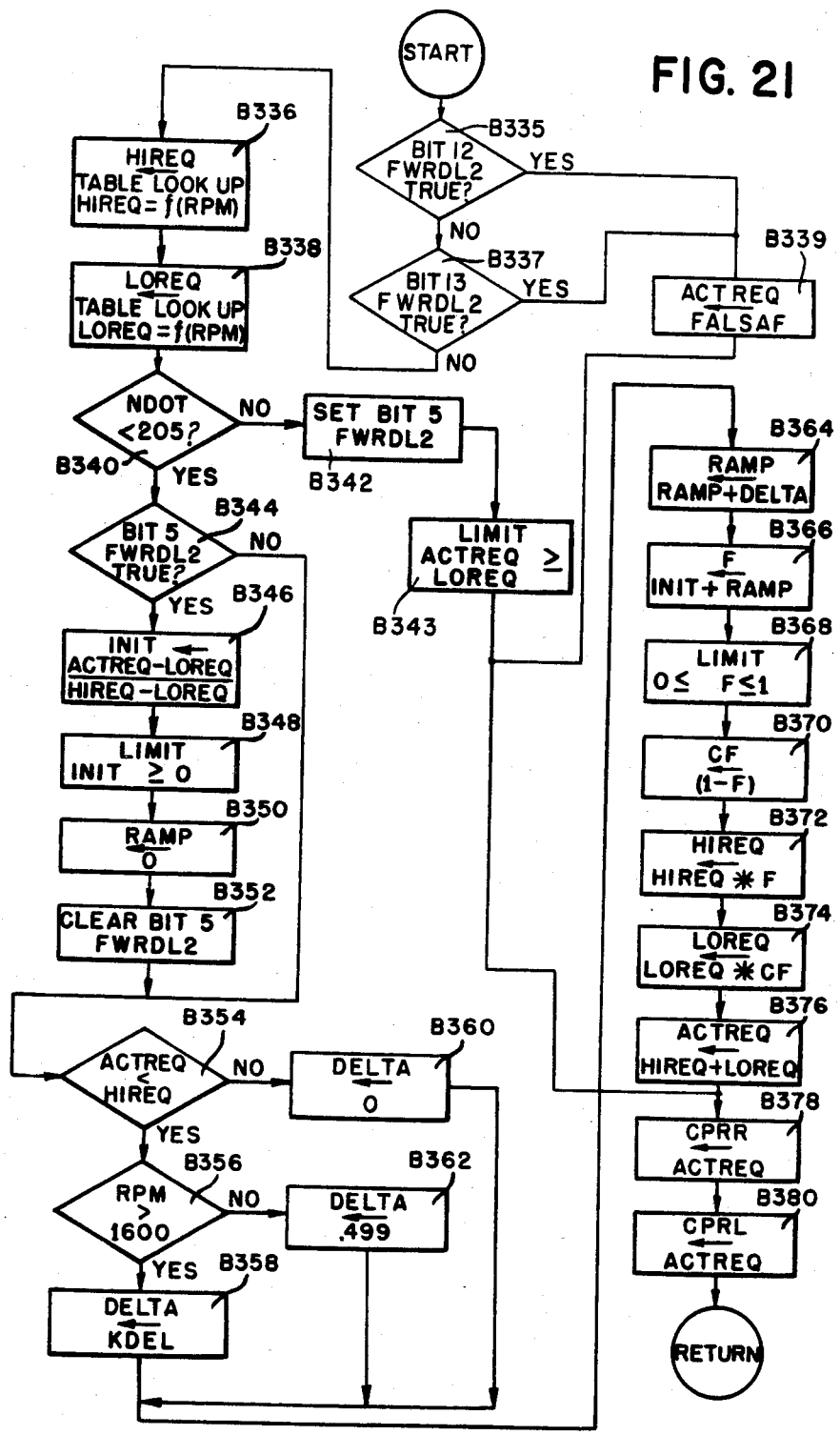
FIG. 21 is a detailed system flow chart of the compressor request calculation routine illustrated in FIG. 13.

In FIG. 21 there is illustrated the routine for calculating the actuator request ACTREQ for the left and right compressor actuators. The routine implements the system block diagram for the compressor section of the turbocharger of FIG. 11b and the functional block labelled B24 in FIG. 13. In matching the process steps of the routine to FIG. 11b it should be understood that the RPM value has been previously fault checked (FIG. 15) and the acceleration value NDOT calculated (FIG. 20).

Beginning with Blocks B335, B337, the program accomplishes a test on bits 12 and 13 of the second flag word FWRDL2. If either of these bits are present, it is an indication that one of the compressor actuators is faulty. Upon finding one of the bits present, the program sequences to Block B339 and conversely, it will continue to Block B336 if neither bit is present. Block B339 replaces the value for the actuator request ACTREQ with a fail safe position value FALSAF. The value of this variable corresponds to a requested position of the compressor output diffuser that will not cause a surge under most operating conditions.

In Block B336 the program does a table lookup to find a value for the high request HIREQ as a function of RPM. The program continues in Block B338 by then calculating a value for the low request schedule LOREQ from a table lookup further based upon a function of RPM. These schedules for these lookup tables have been previously described with respect to FIGS. 9a, 9b, and 11b.

Once these two values are found the sequence checks to determine whether the value of the acceleration variable NDOT in less than 205 rpm/sec. If the answer to this question is negative, the flow of the program is to Block B342 where bit 5 of the second flag word FWRDL2 is set. This path indicates that an acceleration greater than the predetermined amount in Block B340 is being experienced by the engine. Therefore, the actuator request ACTREQ is limited to the greater of its present value or the value calculated for the low request LOREQ in Block B343.

Thereafter, the variables representing the right and left compressor position request CPRL, CPRR, respectively, are replaced with the value of the actuator request ACTREQ in Blocks B378 and Blocks B380. The program then returns to the next sequential task in the real time task nonitor. This path of the routine implements the portion of the block diagram (FIG. 11b where the select high gate 862 chooses between the variables ACTREQ and LOREQ).

The program flow continues in this manner by limiting the actuator request ACTREQ to its present value or the low request value LOREQ until the test in Block B340 becomes affirmative. The passage of the test indicates that the engine is no longer accelerating at a rate greater than the predetermined constant 205 rpm/sec. and the system should be moving to the high request value HIREQ. The program therefore, flows to Block B344 where bit 5 of the second flag word FWRDL2 is tested. If bit 5 is not true, the program will sequence to Block B354 where the delta or the change value will be calculated. The absence of bit 5 at this position of the program has not just come off a fast acceleration, but indicates that the engine has been operating below the acceleration value for at least one frame period.

The presence of bit 5 found as the result of the test in Block B344 indicates that the engine has just started to accelerate at a value lower than the predetermined constant 205 rpm/sec. When in this condition, the compressor actuator has generally been moving along the low request schedule LOREQ to provide the actuator position request ACTREQ. The program should now move the actuator request from the low schedule LOREQ to the high schedule HIREQ depending upon the speed of the engine. However, the actual position of the actuator should be taken into account. Therefore, in block B346 an initial value INIT is calculated as the ratio of the difference of the actuator request and the low request (ACTREQ−LOREQ) to the difference of the high request schedule value and the low request schedule value (HIREQ−LOREQ). If the actuator request ACTREQ equals or is less than the low request LOREQ, as will be the case when the system is proceeding upon the low request schedule, the value of INIT will be zero. However, if the actuator request ACTREQ is between the low request value and the high request value the system should begin with that value and not move backwards to the low request. Therefore, the initial value INIT is calculated as that percentage of the distance that the actuator request ACTREQ has already proceeded toward the high request value HIREQ.

Thereafter, in Block B348 the initial value INIT is limited to be greater than or equal to zero and the historic variable RAMP set equal to zero in Block 350. The next step in the program is to clear bit 5 of the second flag word FWRDL2 in Block B352 so that the program does not sequence through this path unless another acceleration sets the bit 5 flag again. The sequence of Blocks B344–B352 is functionally equivalent to the flip-flop 888 generating the initial value INIT and clearing the memory 891 in FIG. 11b.

Block B354 thereafter tests whether the actuator request ACTREQ is less than the high request value HIREQ. If it is not, the program proceeds to Block B350 where the incremental value DELTA is replaced by zero. If ACTREQ is less than HIREQ, then Block B356 provides another decisional path for determining the value of the increment DELTA. Block B356 tests the RPM value to determine if it is greater than 1600 rpm. An affirmative answer to this test causes DELTA to become a constant KDEL and a negative answer causes DELTA to take on the value 0.499.

The program then proceeds to Block B364 where the historic variable RAMP is replaced by RAMP incremented by DELTA. The sequence continues by replacing the factor F with initial value INIT plus the historic value RAMP in Block B366. The factor F is then limited to be greater than or equal to zero and less than or equal to one in Block B368 and subtracted from one to provide a cofactor CF in Block B370.

The high request value HIREQ is subsequently multiplied by the factor F to become a new value for the high request HIREQ in Block B372 while the low request value LOREQ is multiplied by the cofactor CF to become a new value for the low request in Block B374. Further in the sequence the actuator request ACTREQ is replaced by the sum of the high request HIREQ plus the low request LOREQ in Block B376. Thereafter, the right and left compressor position requests CPRR and CPRL, respectively, are replaced by the calculated value for the actuator request ACTREQ in Blocks B378 and Blocks 380.

This routine then conveniently produces a compressor actuator request ACTREQ which is equivalent to the high request HIREQ when the engine is not accelerating by the path sequence B336, B338, B340, B344, B354, B360, B364, and B380. The routine also decelerates along this path because once the high request schedule is reached the system will not switch to the low request unless a rapid acceleration occurs. The routine also provides an accuator request ACTREQ for the compressor actuators substantially equivalent to the low request LOREQ when the engine is accelerating at a value greater than the predetermined amount via sequence path B336, B338, B340, B342, B343, B378, and B380. The routine additionally provides a method for moving between the low request and high request schedules when the engine stops accelerating at a rate in excess of the predetermined limit. This means is provided by the path sequence B336, B338, B340, B344–B352, B354, B356, B358, B360, B362, B364–B380. Below the predetermined engine speed of 1600 rpm there is essentially no delay in the shift from the low schedule to the high schedule, but if the engine speed is above that predetermined speed the path is similar, except that the Block B362 is replaced by the Block B358 to provide a variable delay in shifting to the higher schedule.

Figure 22:
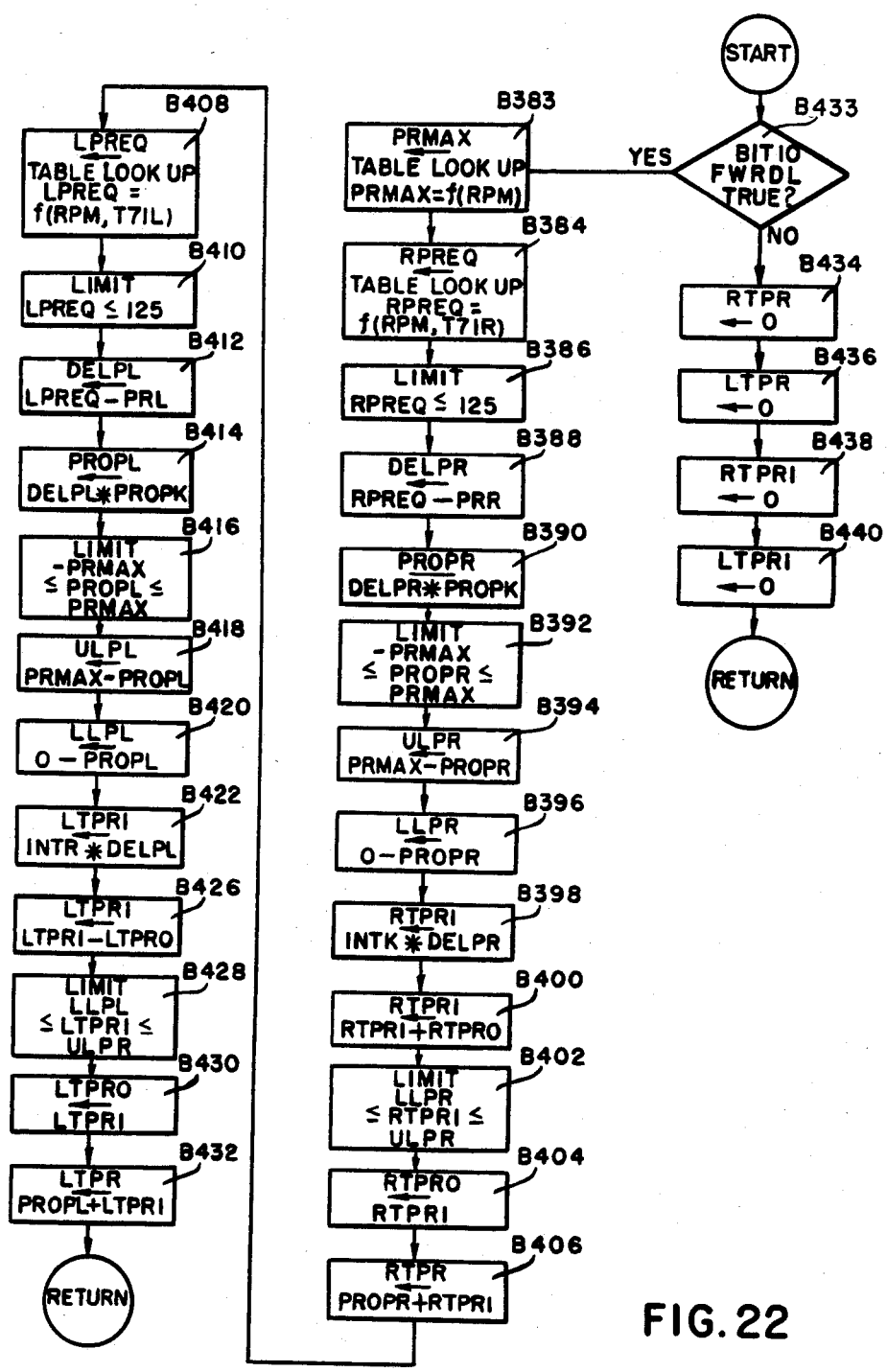
FIG. 22 is a detailed system flow chart of the turbine request calculation routine illustrated in FIG. 13.

With respect now to FIG. 22, there is shown a routine for calculating the actuator position request RTPR, LTPR for the right turbine and left turbine actuators. The routine implements the block labeled B26 in FIG. 13 and the detailed block diagram in FIG. 11c. It should be noted at this part of the program, the temperature value T7IR and the RPM value have already been calculated and checked for validity by the routines in FIGS. 18 and 15, respectively.

The program begins in Block B382 where bit 10 of the first flag word FWRDL is tested. If the bit is not present the program will sequence through Block B434, B436, B438, and B440 setting the right turbine position request RTPR, the left turbine position request LTPR, the right turbine integral position request RTPRI and the left turbine integral position request LTPRI to zero, respectively. The absence of bit 10 from the first flag word FWRDL indicates that the RPM of the engine is not greater than the operational speed N3 and therefore, the turbocharger should not be placed in operation.

When, however, the engine speed RPM is greater than the starting speed N3, bit 10 will be set and the test in Block 382 will be affirmative. Initially, the program calculates a value for the maximum pressure PRMAX as a function of RPM from a table lookup in Block B383. The program will then proceed to Block B384 where a pressure request for the right turbine RPREQ is calculated from a table lookup as a function of RPM and the right turbine inlet temperature T7IR. The schedule stored in the lookup table is that which was previously described for FIG. 9b. In the next block the pressure value obtained from the lookup table is limited to be less than or equal than 125 PSI to protect the engine from overboost.

An error signal value DELPR is formed by subtracting the actual pressure value PRR from the pressure request value RPREQ in Block B388. From this error value, a proportional and integral control loop functionally similar to controller 911 in FIG. 11c is formed to determine the final position request. The proportional loop is initiated by generating a proportional position request PROPR by multiplying the error value DELPR times a proportional constant PROPK. The proportional position request PROPR is limited in Block B392 to be greater than or equal to the maximum pressure PRMAX and less than or equal to the maximum pressure PRMAX.

The sequence of the program flows to Block B394 where an upper limit ULPR for the integral portion of the control loop is provided by subtracting the proportional position request PROPR from the maximum pressure value PRMAX. The lower limit LLPR for the integral portion of control loop is formed in a similar manner by subtracting the proportional position request PROPR from zero in Block B396.

The integral portion of the control loop is calculated by providing a value for the integral position request RTPRI by multiplying the error value DELPR by an integral constant INTK in Block B398. The present value of the integral position request RTPRI is then added to the old value RTTRO integrated from past sequences through the loop to become the new value of RTPRI in Block B400. The integral value RTPRI is then limited in Block B402 to be greater than or equal to the lower limit LLPR or less than or equal to the upper limit ULPR. The integral position request RTPRI is then saved for further integration by replacing the old value of the position request RTTRO with the present value in Block B404. The right turbine position request RTPR is thereafter calculated in Block B406 by adding the proportional position request PROPR to the integral position request RTTRI.

Block B408–B432 is a sequence corresponding to blocks B384–406 for calculating the left turbine position request LTPR. Block B408 calculates the left pressure request LTREQ from the same table lookup table as the right pressure request. The request is subsequently limited in Block B410 and differenced with the actual pressure PRL to form an error value in Block B412. A proportional value PROPL is calculated from the error value DELPL by multiplying by a proportional constant PROPK in Block B414 and an integral value LTPRI is calculated from the error value DELPL by multiplying it by an integral constant INTK in Block B422. Each value is limited, similar to that previously described, with the proportional value limiting being accomplished in Block BB416 and the integral value limiting being accomplished in Block B428. The left turbine position request is then calculated as a summation of the proportional part PROPL and the integral part LTPRI in Block B432.

Figure 23A:
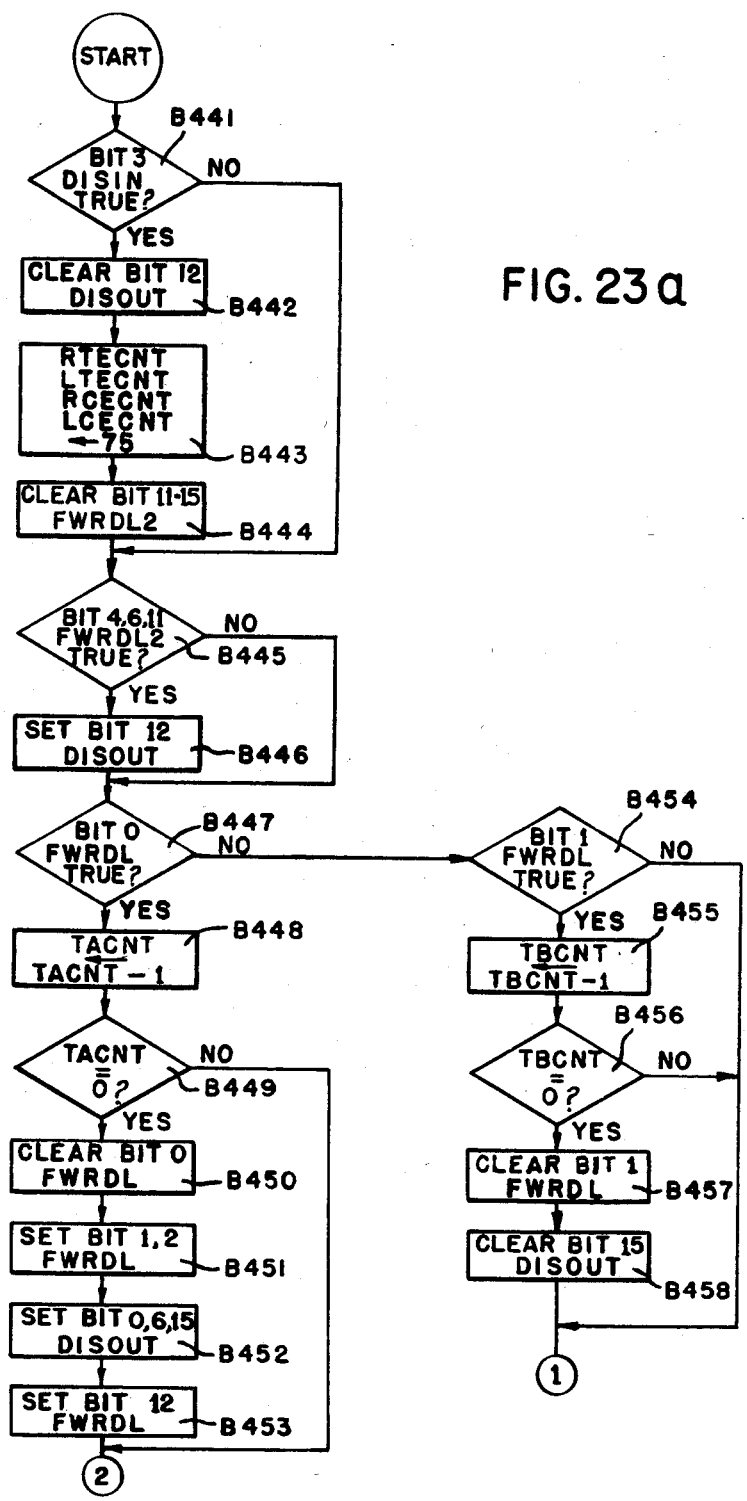
FIGS. 23a, b, c, and d are a detailed system flow chart of the start and shutdown sequencing routine illustrated in FIG. 13.
Figure 23B:
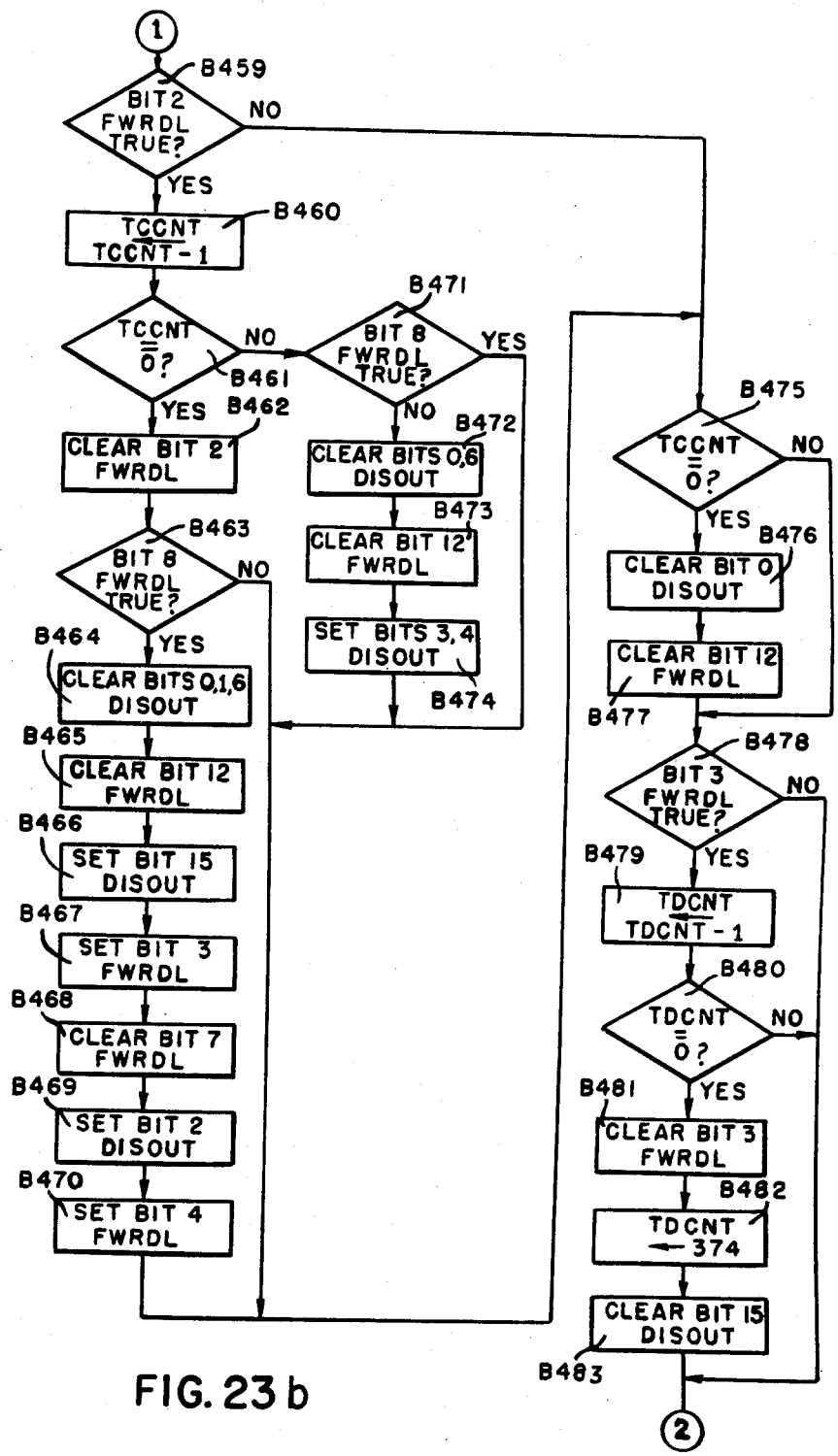
Figure 23C:
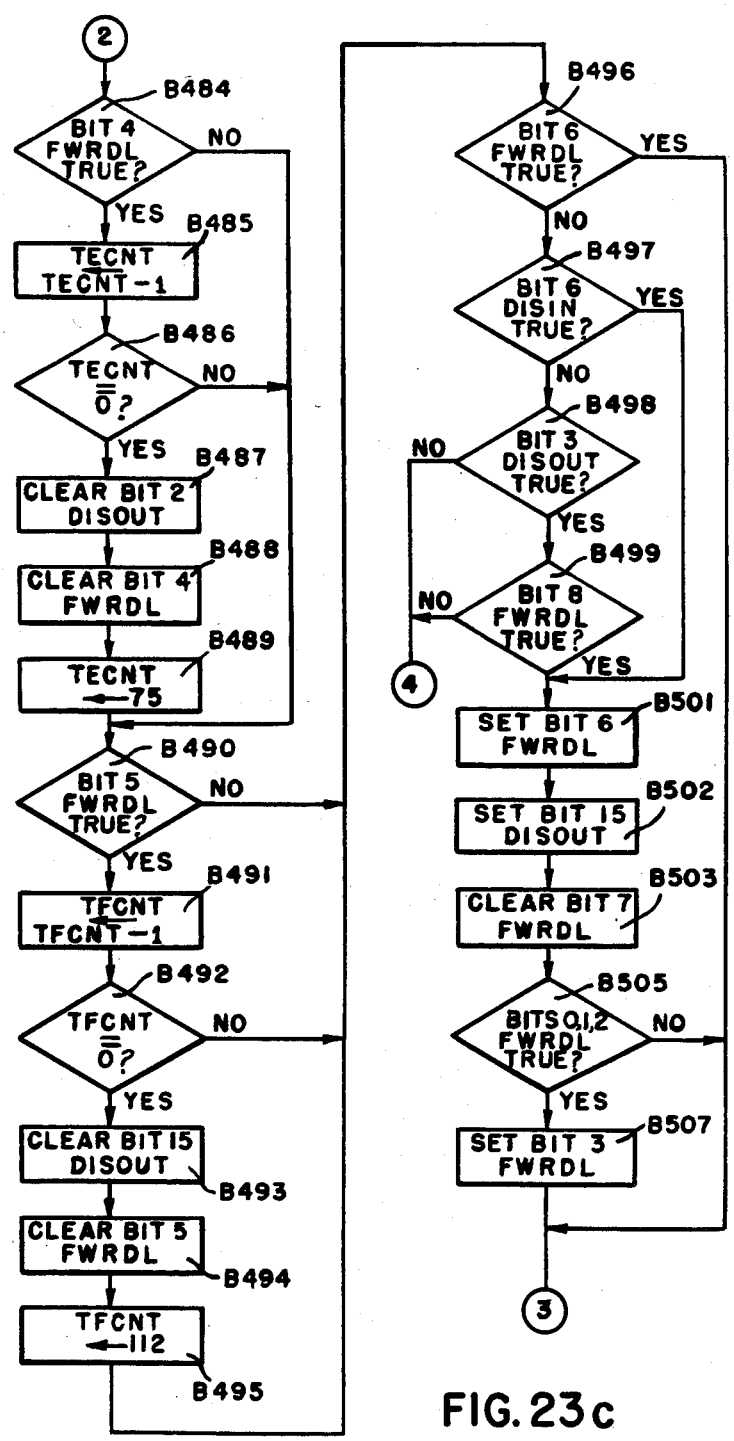
Figure 23D:
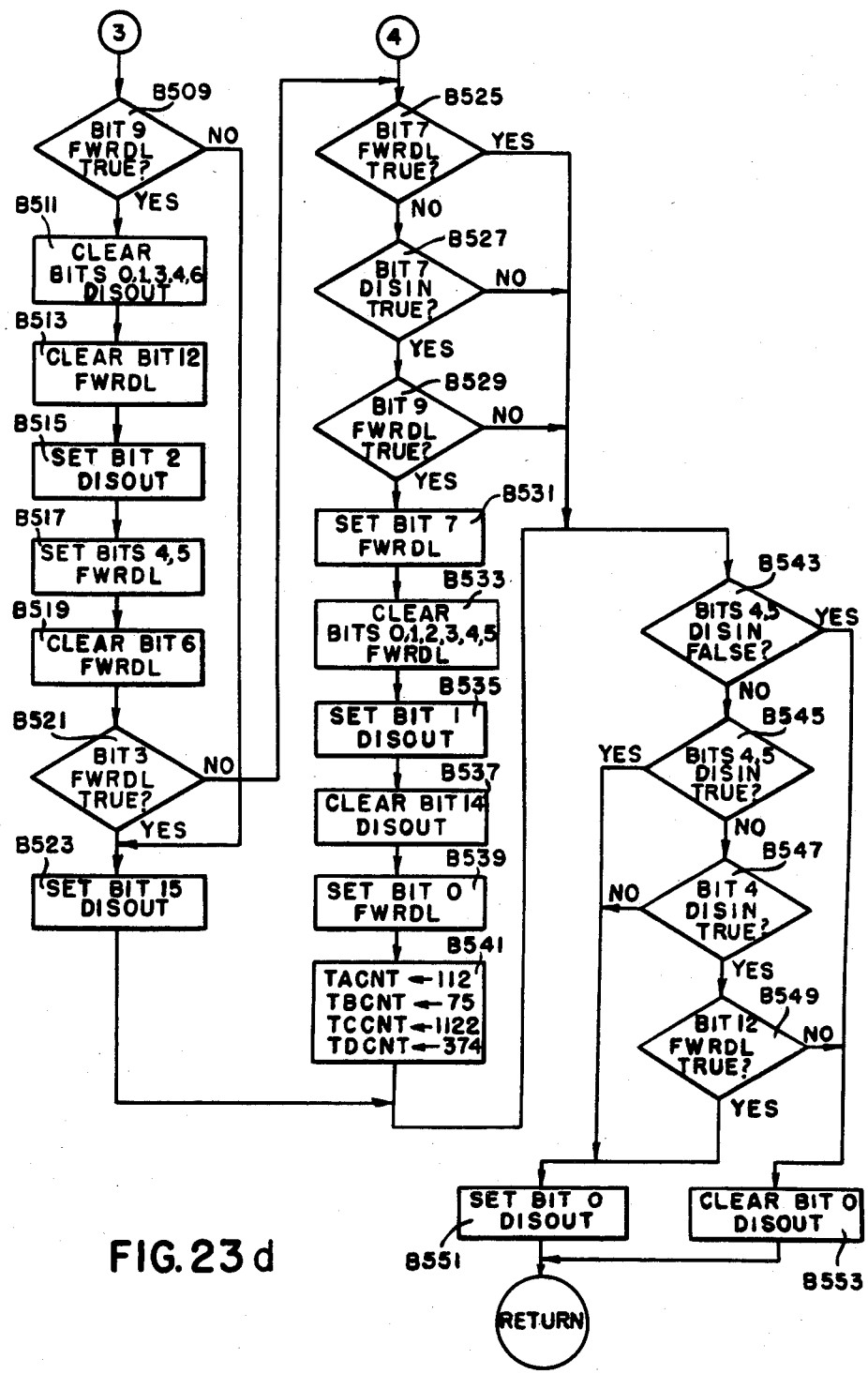

The start and shutdown sequence operation of the engine will now be more fully described by reference to the sequence controller which is detailed in FIGS. 23a, b, c, and d. The sequence controller is a logic and timing routine that utilizes the input word DISIN, the output word DISOUT, and the first and second flag words FWRDL, FWRDL2 to control the starting and shutdown sequence of the engine. As a timing routine it has six timers A–F which are represented by bits 0–5 of the first flag word FWRDL. These timers measure periods in the logic and control sequences which operate the low voltage monitor, the rear fuel pump 98, the flame heaters 92, the shut-off solenoid 94, the accessory relay 90, the run time meter 88, and the oil pumping pump 87.

The first condition that the routine examines is bit 3 of the input word DISIN in Block B441. The presence of this bit indicates that the operator desires to reset the turbocharger fault indication. If the test is positive, bit 5 of the output word DISOUT is cleared in Block B442 to disable the output driver of the turbocharger fault indicator lamp. Thereafter, the error counts for the turbine and compressor actuators (RTECNT, LTECNT, RCECNT, LCECNT) are reset to their original values in Block B443 and the actuator error flags, bits 12–15 of the second flag word FWRDL2, cleared in Block B444. This action permits the turbocharger fault routine another chance to test whether an actuator has failed before shutting down the operation of the turbocharger. Alternatively, if the test in Block B441 is negative, the program flows to Block B445, directly.

Next in the sequence is a test for turbocharger sensor failures in Block B445. This block determines whether any fault flags (bits 4, 6, and 11 of FWRDL2) are set for the pressure sensors or the RPM sensor. If any of the tested bits are present, then the sensor fault indication is generated by setting bit 12 in the output word DISOUT in Block B446. Otherwise, program flow continues to Block B447.

After the fault rest logic, the start and shutdown logic checks to see whether the A timer is active by testing whether bit 0 of the first flag word FWRDL is true in Block B447. If timer A is not active, the next Block B454 is checked to determine whether bit 1 of the first flag word FWRDL is true. This bit is reserved for the B timer and a negative indication indicates that it is not active, either.

If neither of these timers is active, then the C timer is checked in Block B459 by testing bit 2 of the first flag word FWRDL. If the bit is not present, the program then checks the D timer status by evaluating bit 3 of the first flag word FWRDL in Block B478. If this bit is not set, the E timer is subsequently tested for an inactive status by testing bit 4 in block B484. The last timer (timer F) is then checked for active status by testing for bit 5 of the first flag word FWDRL in block B490. In this manner, the program sequences through all of the timer flag bits to determine if any of the timers are active and if they are found inactive, the program moves to the next test. This path is taken to rapidly move through the routine if the engine system is not in the start or shutdown mode.

Subsequent to the timer test, the start-shutdown logic will begin to evaluate the status of the switch inputs which are associated with bits of the input word DISIN. First, the first flag word FWRDL is tested at bit 6 in Block B496 to deterine whether the shutdown sequence has been latched. If this bit is true, then the program will sequence to a series of steps assisting the engine to shut down. However, if in the initial case where the engine is being started, the shutdown latch bit will not be set and the program will perform the next test located in Block B497 by interrogating bit 6 of the input word DISIN. Since we are assuming the present condition is the beginning of a start operation, the test will be negative and Block B498 will be performed next. Bit 3 of the output word DISOUT is tested for its presence and assists in the determination whether the accessory relay has been turned on. If it has not, this is an indication that the system has been started and the program moves to Block B525 where it begins the start sequence of operations for the engine.

Initially, bit 7 of the first flag word FWRDL is tested to determine whether the start switch has been latched. If this is the initial pass, the start latch will not be set and bit 7 of the input word DISIN is tested for its presence in Block B527. After it has been determined that the start switch is set, the progression of the program is to Block B529 where bit 9 of the first flag word FWRDL is tested for its presence. Bit 9 is the second speed flag indicative of an RPM value less than 200 RPM.

This condition indicates that the initial start procedure or sequence for the engine system should be begun by first latching the start condition by setting bit 7 of the first flag word FWRDL in Block B531. Next, the timers A, B, C, D, E, and F are reset by clearing bits 0–5 of the first flag word. The rear fuel pump is turned on by setting bit 1 of the output word DISOUT and the oil priming pump is turned off by clearing bit 14 of the output word DISOUT. Timer A is then started by setting bit 0 of the first flag word FWRDL in Block B539 while timer counts TACNT, TBCNT, TCCNT, and TDCNT are initialized in Block B541.

At this point, the program has responded to the start switch being switched to an active state, has latched the start function, and turned the oil priming pump off. Further the routine has reset and initialized all of the timers A–E and has turned on the rear fuel pump. The start sequence now is initialized and timer A is switched on to begin timing the first period in this sequence.

The program on its next iteration will flow to Block B447 where bit 0 of the first flag word FWRDL is tested. The test will now be affirmative since the timer A is now active. Therefore, the A timer count, TACNT, will be decremented in Block B448. The A timer count is then tested to see if it is zero in Block B449. If it has not yet timed out, the program flow to Block B484 and the other timer tests. The sequence of events is then as hereinbefore described until the A counter times out.

At the time that the A counter times out as sensed by Block B449, the program path will divert to Block B450 and the A timer is made inactive by clearing bit 0 of the first flag word FWRDL. The B and C timers are then started by setting bits 1 and 2 of the first flag word FWRDL in Block B451. Next, the flame heaters are turned on, the low voltage monitor is turned on, and the fuel shutoff solenoid is energized by setting bits 0, 6, and 15 in the output word DISOUT in Block B452. Additionally, in this sequence the flame heater flag is latched by setting bit 12 of the first flag word FWRDL in Block B453.

Thus, when the A timer times out the low voltage monitor is turned on to start cranking the engine, the flame heaters are turned on during this time to begin warming the fuel, and the next timers, B and C, in the sequence are activated.

The program continues the start sequence by cycling to the test indicated in Block B447 and when the A timer is found inactive, then sequencing the to Block B454 where the B timer is tested for active status. Since the B and C timers are presently active, the path will divert to Block B455 where the B timer count TBCNT is decremented and then tested in Block B456. Simultaneously, with the B counter down count, the C counter is counted down by the test in Block B459 finding that bit 2 of the first flag word FWRDL is true, and then decrementing the C timer count TCCNT in Block B460. This progression of events continues by counting down the B and C counters together until the B counter times out and the test in Block B456 is affirmative. At this point the B timer is reset by clearing bit 1 of the first flag word FWRDL in Block B457 and thereafter, the fuel shutoff solenoid is deenergized by clearing bit 15 of the output word DISOUT in Block B458.

The fuel should be warm and pressurized enough now to start the engine and therefore, the fuel is supplied to the engine while it is cranked by turning off the shut-off solenoid. However, a start in this sequence must be accomplished prior to the C timer timing out. The method for testing whether the engine has started is to test the first speed flag (bit 8 of FWRDL) in Block B471 to determine whether the speed is greater than the starting speed 400 rpm. The program cycles through the inactive A and B timer test B447, B454, and through the active C timer test B459, B461 and the speed flag test B471 until either the speed flag is cleared or the C timer times out. If the engine has not reached the start speed by the time the C timer has timed out, an abort sequence embodied as Blocks B464–B470 is started. The abort sequence will be more fully described hereinafter.

When, however, the first speed flag is cleared during the active period of the C counter, the system recognizes this is an engine start and program flows normally. This test is accomplished by having a negative answer to the question in Block B471. Block B472 is then executed and the flame heaters and the low voltage monitor turned off by clearing bits 0 and 6 from the output word DISOUT. Additionally, the flame heater latch is reset by clearing bit 12 of the first flag word FWRDL and thereafter, the accessory relay and the run time meter are turned on by setting bits 3 and 4 of the output word DISOUT in Blocks B473 and B474.

This is a normal start and the accessory relay provides power to the accessories of the vehicle after the starting sequence has been accomplished and the run time meter keeps a diagnostic record of the actual running period for the engine. The flame heaters are no longer needed and are turned off along with the starting motor. During a normal start, when the C timer finally times out and the flow of the program progresses from Block B461 to Block B462, the C timer is rest by clearing bit 2 of the first flag word FWRDL and by then executing the NO branch of the Block B463 to produce the end of the sequence.

The abort procedure takes the opposite path of Block B463 when timer C has timed out and the engine speed has not reached the start speed. Block B464 begins the abort sequence by clearing bits 0, 1, and 6 of the output word DISOUT. This action turns off the flame heaters, the rear fuel pump, and the low voltage monitor to stop cranking of the engine. Additionally, the flame heater latch is reset by clearing bit 12 of the first flag word FWDRL in block B456. The fuel shutoff solenoid is energized by setting bit 15 in the output word DISOUT in Block B466 and the D timer activated by setting bit 3 of the first flag word FWRDL in Block B467. Thereafter, the start latch is reset by clearing bit 7 in the first flag word FWRDL and a cutoff sequence for the fuel pump initiated by setting bit 2 of the output word DISOUT in Block B469. The final task of the abort sequence is to start timer E by setting bit 4 of the first flag word FWRDL in Block B470.

The timer D allows the system a period of time in which to stabilize after a start attempt. Therefore, during this time the fuel is cut off to the engine by energizing the fuel shutoff solenoid. When the D timer is active, bit 3 in the first flag word FWRDL will be present and the test performed in Block B478 will be affirmative. The program cycles through Blocks B478, B479, B480 decrementing the timer count TDCNT and waiting for the timer period to end. When the D timer times out as indicated by the program executing the YES path of Block B480, the timer will be deactivated by clearing bit 3 of the first flag word FWRDL in Block B481 and its starting count initialized in Block B482. Thereafter, in Block B483 the fuel shutoff solenoid will be deenergized by clearing bit 15 of the output word DISOUT.

The E timer works in a similar manner but for a much shorter period and provides a period of time that allows the rear fuel pump to unlatch before the cutoff bit is reset. Therefore, in Block B484 when the timer is active the path of the program flows to Block B485. In this sequence, the E timer count TECNT is decremented and tested for equivalence to zero in Block B486. When the timer does time out as indicated by execution of the YES path in Block B486, the timer is reset by clearing bit 2 of the output word DISOUT in Block B487. The cutoff bit is reset thereafter by clearing bit 4 of the first flag word FWRDL in Block B488 and the E timer count TECNT is initialized in Block B489.

The F timer is similar to the D timer in that its purpose is to deenergize the fuel shutoff solenoid after it has been on a predetermined period of time. The only difference is that the F timer count TFCNT is different than the D timer count TDCNT and therefore, the timers are set for different periods. The F timer is tested in Block B490 by testing bit 5 of the first flag word FWRDL. If the timer F is active the F timer count TFCNT is decremented in Block B491 and a timeout condition is tested in Block B492. When the timer period has expired the program sequences to Block B493 where the fuel shutoff solenoid is deenergized by clearing bit 15 of the output word DISOUT. Thereafter, the counter is reinitialized by resetting the timer bit 5 in the first flag word FWRDL in Block B494 and initializing the F timer count TFCNT in Block B495.

The shutdown sequence of the routine will now be fully discussed with respect to its starting point in Block B496. The shutdown sequence begins at this block by testing bit 6 of the first flag word FWRDL to determine whether it is present. If bit 6 is true the shutdown has been latched and the engine should begin decelerating and finally end in a fully stop condition. Therefore, if the bit 6 is true, the program sequence is to Block B509 where bit 9 of the first flag word FWRDL is tested. Bit 9 determines whether the engine speed is less than the shutdown speed of 200 RPM. If the engine has not decelerated beyond this point, the test will be negative and the program will flow to Block B523 where the fuel shutoff solenoid is energized by setting bit 15 of the output word DISOUT. The shutting off of the fuel by the shutoff solenoid will slow the engine to where the test in Block B509 will finally become true and the shutdown sequence can begin.

The shutdown sequence begins by turning off the flame heaters, the rear fuel pump, the accessory relay, the run time meter, and the low voltage monitor by clearing bits 0, 1, 3, 4, 6, respectively, of the output word DISOUT in Block B511. The latch bit for the flame heater is also reset by clearing bit 12 of the first flag word FWRDL in Block B513. The program sequence is then to Block B515 where bit 2 of the output word DISOUT is set to provide a cutoff signal for the latched fuel pump. Since the cutoff bit must be generated a set period of time before the fuel pump is unlatched, the system sets bits 4 and 5 of the first flag word FWRDL to activate the E and F timers. Thereafter in Block B519 bit 6 of the first flag word is cleared to reset the shutdown latch.

The next test in Block B521 is an indication whether bit 3 of the first flag word FWRDL is true which determines the active status of the D timer period. If the D timer is active, the program flow is through Block B523 and to Block B543 as indicated previously. However, if the D timer is not active, the program flow will be to Block B525. Thereafter, the program continues in the manner hereinafter described for setting and resetting bit 0 in the output word DISOUT for the flame heaters.

There are two switches providing the signals for bits 4 and 5 of the input word DISIN which produce an indication of conditions where the flame heaters may be operated manually for conditions not specified for in the program. In connection with this logic, bit 4 of the input word DISIN is the automatic/manual indication where if the bit is absent in the input word of the program will operate the flame heaters as previously described. However, if bit 4 is present indicating that a manual operation of the flame heaters is to be undertaken, the second bit, bit 5, is tested to see whether the normal operation is desired. A normal operational condition is indicated by the presence of bit 5.

Block B543 tests bits 4 and 5 of the input word DISIN to determine if they are both absent. Both bits absent will produce a sequence to the Block B553 where the flame heaters are turned off by clearing bit 0 of the output word DISOUT. Both bits absent indicates that the system is in the automatic mode control but no flame heaters are desired. The next test in Block B545, if both bits are not absent, is to determine whether they are both present. If both bits are present this indicates that the system is in a manual mode of operation and the flame heaters are desired. Therefore, the affirmative branch of the Block B545 is taken to the Block B551 where the flame heaters are turned on by setting bit 0 of the output word DISOUT.

The third test in the sequence, in Block B547 after it is found that the bits are neither both true or both false, is whether bit 4 alone is true. A negative answer to this inquiry means that bit 4 is absent and bit 5 is present because of the previous two tests. Therefore, a negative answer will indicate that the system is in an automatic mode and flame heaters are normal operation is desired.

The fourth test after it has been determined that bit 5 is true is Block B549 where bit 12 of the flag word FWRDL is tested. Bit 5 being true indicates that the system is in an automatic operational mode with normal operation of the flame heaters desired. The flame heater latch bit is then tested for its presence in block B549 and the flame heaters energized by setting bit 0 in the output word DISOUT in Block B551.

Figures 24, 26A:
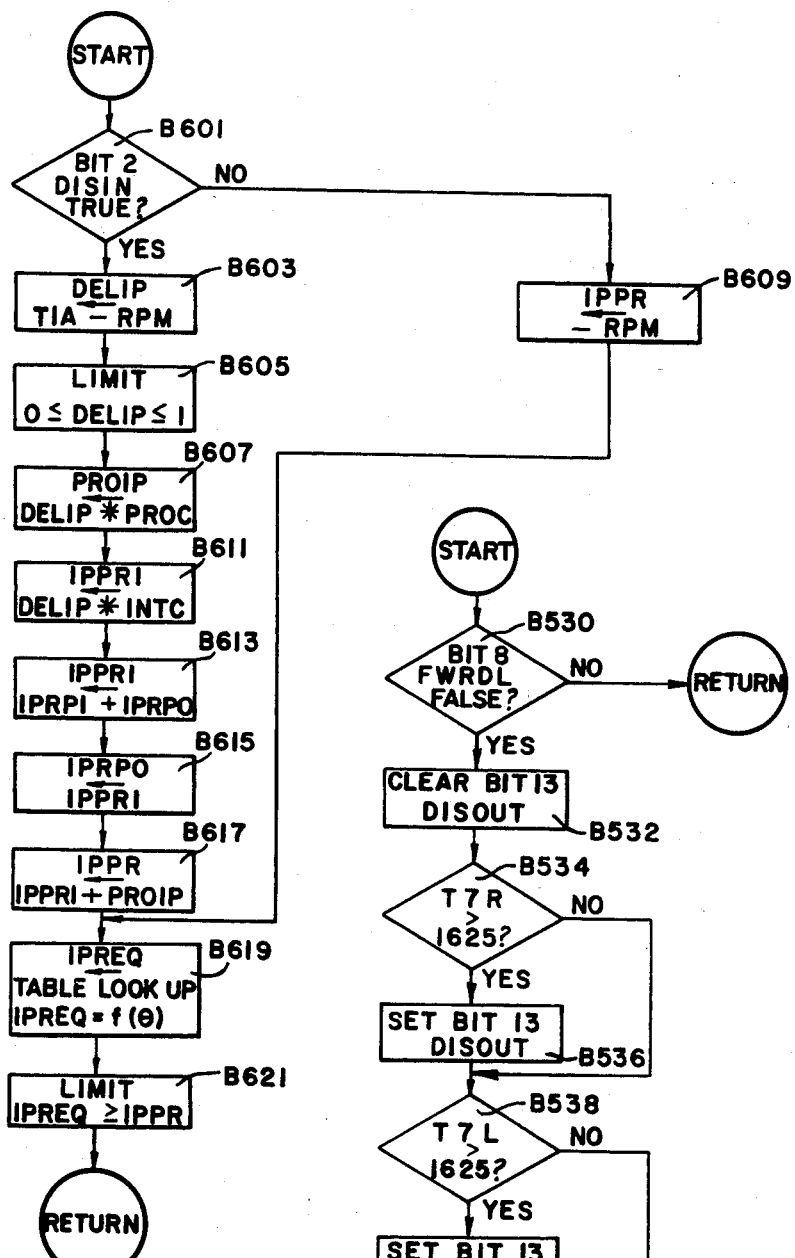
FIG. 24 is a detailed system flow chart of the injection pump request calculation routine illustrated in FIG. 13.
FIGS. 26a, b, c are a detailed system flow chart of the compressor and turbine actuator checking routine illustrated in FIG. 13.
Figure 26B:
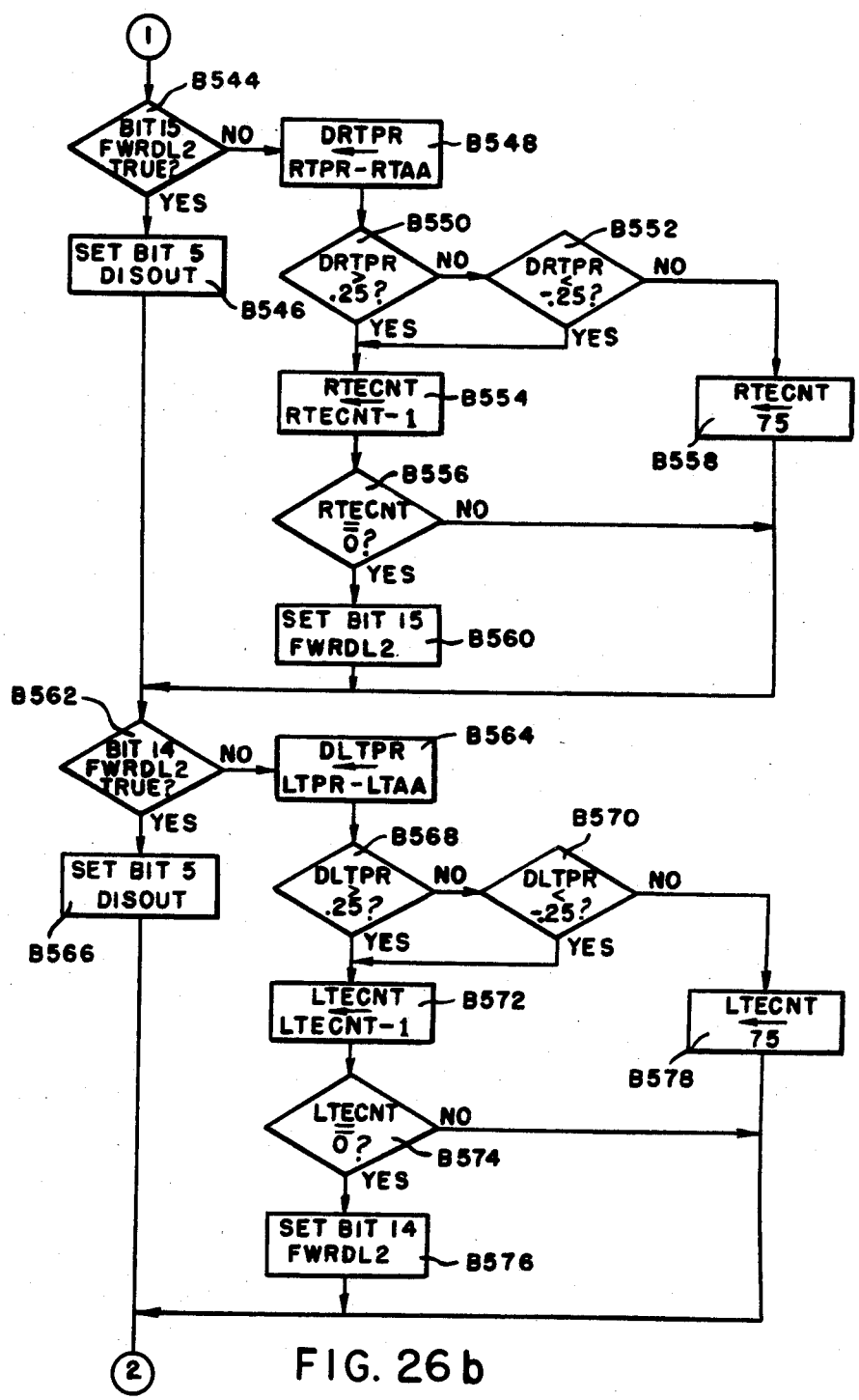
Figure 26C:
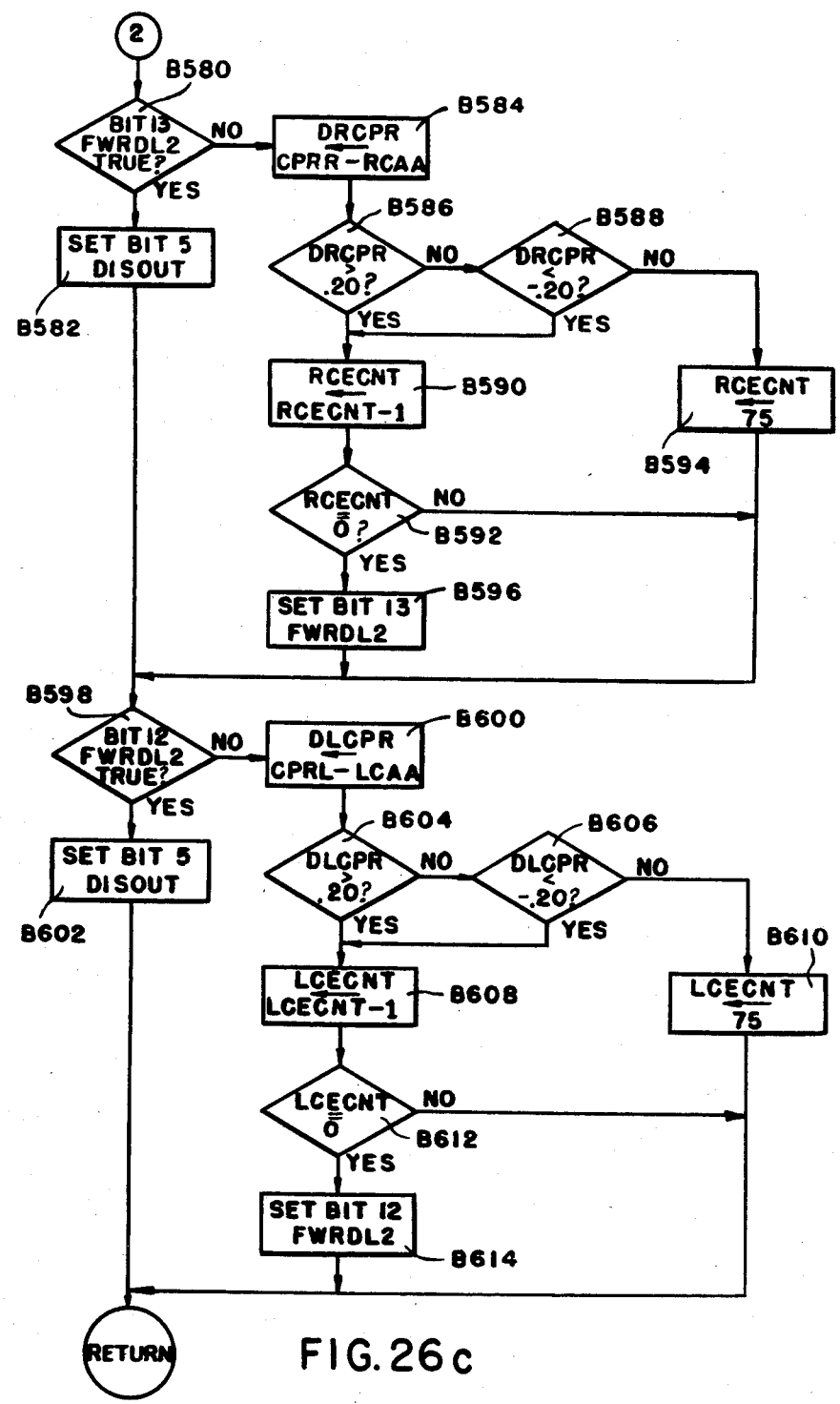

In FIG. 24 there is more fully described the routine that implements the block diagram for the injection pump control of FIG. 11a. At Block B601, bit 2 of the input word DISIN is tested for its presence. If the bit is present this indicates that the tactical idle switch is closed and a proportional and integral control of the error difference between a reference and the actual value of the engine speed RPM is to be generated. Therefore, in Block B603 an error value DELIP is formed by differencing the tactical idle reference value TIA with the actual engine speed value RPM. The error value DELIP is thereafter limited between the values of 0 to 1 in Block B605 before being multiplied by a proportional constant PROC in Block B607. The result of the multiplication becomes the proportional injection pump request PROIP in Block B607. The integral portion of the injection pump request IPPRI is formed by multiplying the error value DELIP by an integral constant INTC in Block B611. The present integral value IPPRI is added to an old integral value IPRPO in Block B613 to increment the old integral value by the new integral error value. In Block B615 the old integral value IPRRO is then replaced by the new integral value IPPRI. The injection pump request IPPRO in Block B617 is calculated as a summation of the integral portion IPPRI and the proportional portion PROIP.

The output of the integral plus proportional controller IPPR which varies in accordance with the error between the tactical idle reference value TIA and the engine speed value RPM. Returning now to the Block B601, if conversely it is found that bit 2 of the input word DISIN is false, the program will sequence to Block B609 where the parameter value IPPR is replaced by the negative value of the engine speed −RPM. The program then sequences down to Block B619 which performs a table lookup for the injection pump request value IPREQ. The look-up table which is stored for the value IPREQ is a function of theta and is more fully illustrated in FIG 10c.

Thereafter, from other paths the program flows to Block B621 where the injection pump request IPREQ is limited to be greater than or equal to the position request IPPR. This limiting functions as a select high gate where if IPREQ is greater than the output from the integral plus proportional controller Blocks B603–B617, then that value will become the injection pump position request XR(IP) when output via the serial-to-parallel converter and digital-to-analog converter. However, if IPREQ output from the schedule is less than the controller value IPPR, then the controller value will regulate the speed of the engine to more fully approximate the tactical idle reference value TIA. This accurs, however, only if the tactical idle switch TAC is closed and the path through Blocks B603–B617 is taken. If the tactical idle switch is not closed, the −RPM value generated in Block B609 will assure that the position request value IPREQ from the table is larger than the output of the second path.

Figure 25:
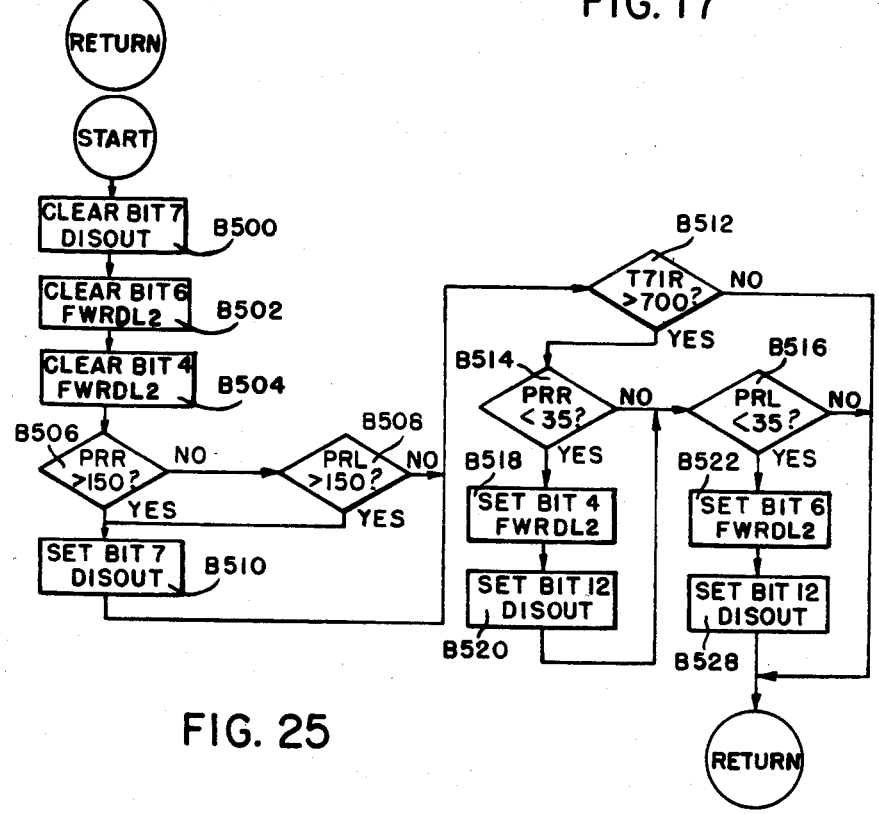
FIG. 25 is a detailed system flow chart of the pressure sensor checking routine illustrated in FIG. 13.

The routine that checks the pressure sensors will now be more fully explained with respect to FIG. 25. This routine implements the functional Block B32 of FIG. 13 and is part of the functional element 940 of the block diagrams illustrated in FIG 11c. The routine begins in Block B500 where bit 7 of the output word DISOUT is cleared. The program then sequences to Blocks B502, B504 where bits 4 and 6 of the second flag word FWDRL2 are cleared. Bit 7 of the output word DISOUT indicates an overpressure fault and bits 4 and 6 are the fault flags for the right pressure sensor and left pressure sensor, respectively. Thus, the routine by initially clearing these three bits allows a fail-soft recovery for the system if the sensors pass the following fault tests. Only when the sensors fail these tests on successive iterations of the program (hard fault) will the flags and indicators remain set.

Initially, in Block B506, the pressure value PRR for the right intake manifold is tested to determine whether it is greater than 150 PSI. If the right intake manifold pressure is not greater than this magnitude, then the left intake manifold pressure PRL is tested in Block B508 to determine if it is greater than 150 PSI. If neither of the pressure values is greater than this pressure limit, the program flows to Block B512. However, if either of the pressure values PRR, PRL fail the tests in Blocks B506, B508, then bit 7 of the output word DISOUT is set in Block B510 before continuing to Block B512. Bit 7, therefore, indicates that at least one of the intake manifold pressures is overpressure. The overpressure condition is communicated to the operator by bit 7 enabling the driver that generates the OPF signal.

In Block B512 an immediate value for the right exhaust gas temperature T7IR is tested to see whether it is greater than 700° F. If it is not, then the pressure sensors will not be tested and the program returns to the next sequential task in the real task monitor. However, if the temperature value T7IR is greater than 700° F., the program enters two testing paths, one in Block B514 and the other in Block B516 to check the pressure sensors. In Block B514, the pressure value PRR is tested to see if it is less than 35 PSI. If not, then the left pressure value PRL is tested to determine whether it is less than 35 PSI in Block B516. If neither of the pressure values are reading low, then both values are taken as correct and the program returns to the real time task monitor. However, if the right pressure value is less than 35 PSI in Block B518, bit 4 of the second flag word FWDRL2 and bit 12 of the output word DISOUT to set prior to entering Block B516. If, in addition, the left pressure value PRL is less than 35 PSI, then bit 6 of the second flag word FWDRL2 and bit 12 of the output word DISOUT in Blocks B522, B528, respectively, are set.

The routine operates on the premise that if the exhaust gas temperature T7IR is greater than 700° F., then a normally operating engine will have manifold pressure values greater than 35 PSI. Thus, if the pressure values are not greater than this minimum value, they are determined to be incorrect and cannot be used in control calculations. It is noted that the intermediate value for the right exhaust gas temperature T7IR is used but it should be understood that T7IL could just as easily have been chosen. Further, it is noted that neither of the temperature sensors actually has to be operable to perform the test. If one of the temperature sensors is operable as determined by the temperator sensor checking routine, then T7IR will be of that value. If neither reading is valid, then the value for T7IR which is taken is the safe value will be used and, as previously described, will be greater than 1200° F. Bit 4 and bit 6, respectively, as mentioned above, are the fault flags which will identify that the pressure sensor for the right cylinder bank and the pressure sensor for the left cylinder bank are faulty. Bit 12 of the output word DISOUT enables an operator readable device which indicates that one of the VAT sensors is faulty.

The routine for checking the actuators of the turbocharger will now be more fully described with respect to FIGS. 26a, b, and c. This routine implements the function Block B34 in FIG. 13 and a portion of the functional element 940 in the block diagram in FIG. 11c. Initially, bit 8 of the first flag word FWRDL is tested to determine whether it is present in Block B530. If the tests results in a negative answer the bit indicates that the engine speed is still less than the starting speed 400 rpm. Therefore, the system will not sequence through the checking routine and returns to the real time monitor.

However, during normal operations, upon finding that bit 8 of the flag word FWRDL is false in Block B530 the program will sequence to block B532 where bit 13 of the output word DISOUT is cleared. This provides checking for an over-temperature condition by testing whether the value for T7R is greater than 1625° F. in Block B534 and whether the value for T7L is greater than 1625° F. in Block B538. If neither of these tests is affirmative the program will sequence to Block B542. If either one of the tests is affirmative, the program will set bit 13 of the output word DISOUT in Block B536 or Block B540, respectively, indicating an overtemperature fault for one of the temperature values T7R and T7L.

In Block B542, bit 5 of the output word DISOUT is cleared to initiate a test for the faults of any of the turbocharger actuators in the system. The first actuator in the system that is tested is the right turbine actuator via the test in Block B544. The test examines the right turbine actuator fault flag, bit 15 of the second flag word FWRDL2, and if the bit is true, immediately energizes the turbocharger fault lamp in Block B546 by setting bit 5 of the output word DISOUT. Similarly, in sequence fault flags for the left turbine actuator in Block B562, the right compressor actuator in Block B580, the left compressor actuator in Block B580, and the left compressor actuator in Block B598 are tested to determine their state. Upon finding any of the fault flags present in the tests, Blocks B566, B582, and B602, associated with the fault flag bits 14, 13, and 12, respectively, will set bit 5 of the second flag word FWRDL2.

Each of the fault flags is set in response to a test path that differences the position request of the actuator with the actual position of the actuator and compares this difference against a range. For example, if bit 15 of the second flag word FWRDL2 in Block B544 is not true, then the program sequences to Block B548 where the actual position of the right turbine actuator RTAA is subtracted from the position request for the right turbine actuator RTTR and an error value DRTPR formed therefrom. The error value DRTPR is tested in Blocks B550 and Blocks B552 to determine whether it is within a predetermined range (−0.25 to 0.25). If it is within this range the answer to both of the tests will be negative and the right turbine error count RTECNT will be reinitialized in Block B558. The program will then continue to test the next actuators in this manner searching for an actuator error value which is out of range.

If the error value for the actuator DRTPR is not within the predetermined range, that is either the test in Block B50 or the test in Block B552 is affirmative, then the error count RTECNT is reduced by one in Block B554 and then tested in Block B556 to determine whether it is zero. If the answer is negative, the program continues to return and sequences in this manner until the error value is either within the range or the error count is zero. If the error count RTECNT reaches zero, the program flows to Block B560 and bit 15 of the second flag word FWRDL2 is set. This indicates an actuator fault for the right turbine actuator has taken place and the fault flag in the second flag word is set. Thus, if the actuator error is not within the range of valid error values and remains outside that range for a predetermined amount of time, the system infers that the actuator or one of the system components driving the actuator is faulty and therefore sets an error flag corresponding to that actuator.

In a similar manner the rest of the routine tests the other three actuators by first forming an error difference between their actual positions and their requested positions. The error value DLTPR is formed for the left turbine actuator from the difference of the left turbine actuator position request LTPR and actual position of the left turbine actuator LTAA in Block B564, the error value DRCPR is formed for the right compressor actuator from the difference of the right compressor actuator position request CPRR and the actual position of the right compressor actuator RCAA in Block B584, and the error value for the left compressor actuator DLCPR is formed from the difference of the position request for the right compressor actuator CPRL and the actual position of the left compressor actuator LCAA in Block B600.

The left turbine error value DLTPR is tested to determine whether it is within range by Blocks B568 and Blocks B570 and the left turbine error count LTECNT reset in Block B578 if the error is within normal bounds. If the left turbine error DLTPR is not within bounds the timer loop is starter where the error count LTECNT is decremented in Block B572 and tested for a time out in Block B574. When the left turbine error value DLTPR is out of range for a period of time in excess of the left turbine error count LTECNT then the program will branch to Block B576 where bit 14 of the second flag word FWDRL2 is set. This is an indication of a left turbine actuator fault and will set bit 5 of the output word DISOUT in Block B566 during the next program cycle.

Similarly, the right compressor and the left compressor error values, DRCPR and DLCPR, are formed in Blocks B584 and Blocks B600, respectively, are tested in Blocks B586, B588, and Blocks B604 and B606, respectively, to determine whether the errors are within a normal range. If the errors are within range, the right compressor error count RCECNT is reset in Block B594 and the left compressor error count LCECNT is reset in Block B610. If the compressor error values DRCPR and DLCPR are not within range, the error counts are counted down until the values are zero in Block B592 and Blocks B612, respectively. If either loop reaches an error count of zero it will set the fault flags for the right compressor actuator and left compressor actuators, bits 13 and 12, respectively, of the second flag word FWDRL2 in Blocks B596 and Blocks B614. Thus, this routine will indicate when any of the four actuators of the turbocharger ar inoperative for a period greater than two seconds. This inactivity is recognized as a fault and the appropriate fault flag, bits 12–15 of FWRDL2, and an operator indication, bit 5 of the output word DISOUT, are set. It is seen that once an error flag in this is set by this routine, this part of the program will not provide a reset of any of the flag bits 12–15 in the second flag word FWRDL2.

Figure 27:
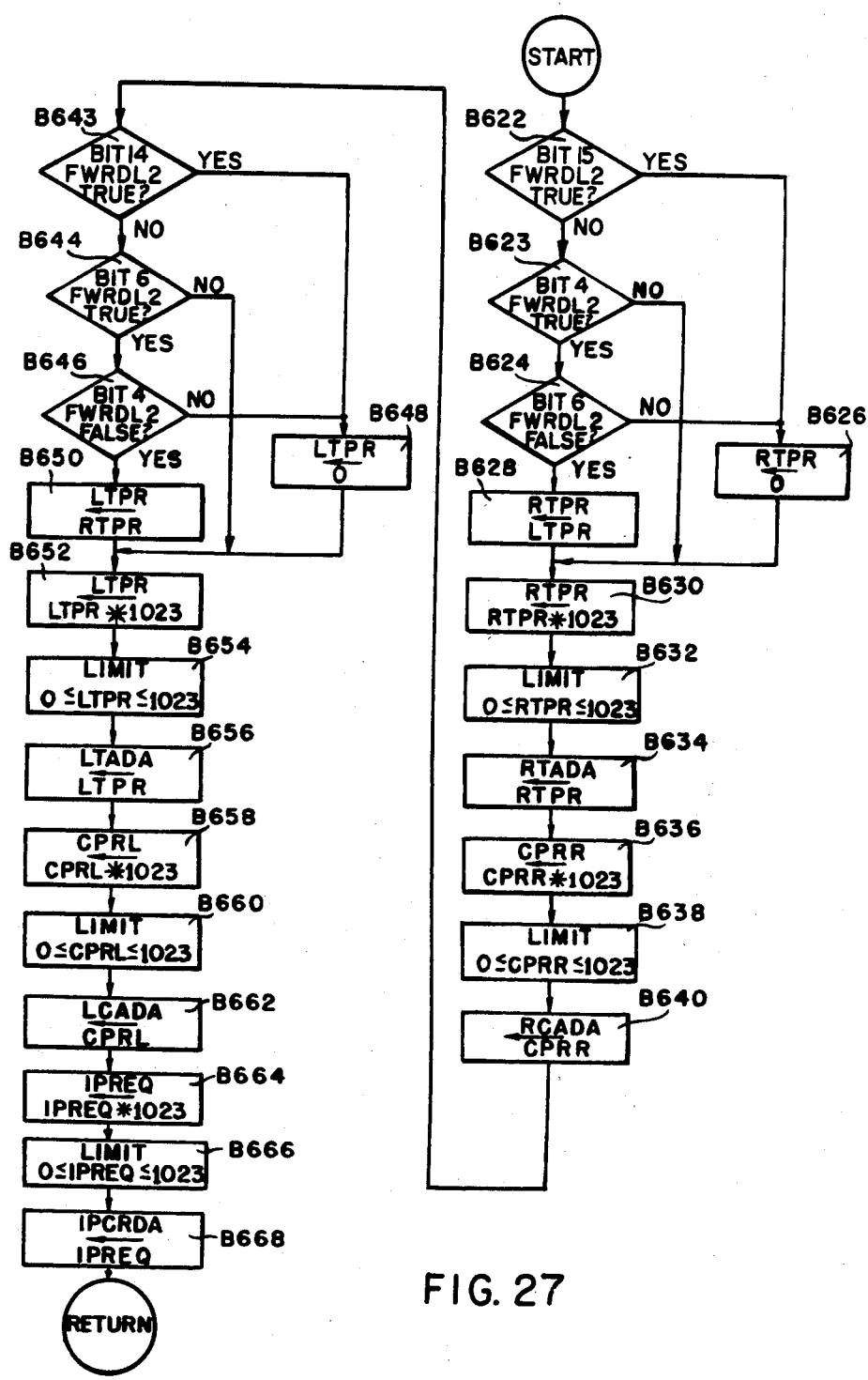
FIG. 27 is a detailed system flow chart of the faulty turbine request correction routine, and the turbine, compressor, and injection pump request scaling routine illustrated in FIG. 13.

FIG. 27 illustrates the routine in which the position requests for the turbocharger and the injection pump are scaled and prepared for digital-to-analog conversion. The routine implements the functional Blocks B36, B38 in FIG. 13. Initially, the routine will check for an inactive turbine actuator by testing bit 15 in the second flag word FWRDL2 by Block B622. The presence of bit 15 indicates a fault either in the actuator or control circuitry associated therewith. If a fault has occurred, then the program sequences to Block B626 where the turbine position request RTPR is set equal to zero. If the turbine actuator fault bit is not present the program will continue to Block B623.

Additionally, the routine provides a replacement for an incorrect turbine position request for the left or right turbine actuator. In Block B623, bit 4 of the second flag word is tested for its presence. The presence of bit 4 indicates that the right pressure sensor is faulty and therefore, the value calculated for the right turbine position request from that parameter is invalid. If, however, the bit is absent, as indicated by a failure of the test in Block B622, then the position request value is valid and the program will immediately sequence to Block B630.

If the test is affirmative in Block B623 indicating that the right pressure value is faulty, then whether a fault for the left pressure sensor has occurred is checked in Block B624 by testing bit 6 of the second flag word FWRDL2. If this test is false, it indicates that the left turbine pressure request LTPR is a good value and can be used in place of the right turbine pressure request value RTPR. Therefore, in Block B628 the value of RTPR is replaced by the value of LTPR. However, if the test is negative in Block B624, this indicates that both pressure values PRR and PRL are faulty and therefore the right turbine pressure request should be set to 0. This is accomplished in Block B626 by replacing the value of RTPR with the value 0.

Once the value of RTPR has been determined (the original value of RTPR, LTPR, or 0), it is multiplied by a constant 1023 in Block B630. This is a scaling constant to produce a digital 10-bit output that is representative of the postive request desired. The next step is to limit the value RTPR between 0 and 1023 (decimal) which provides the outer bounds for a digital 10-bit number. Thereafter, in Block B634 the scaled value of RTPR is loaded into a memory location which is labelled RTADA. The memory location RTADA is used in conjunction with an output routine to convert the 10-bit digital position request to an analog signal.

Similarly, the digitial number representative of the right compressor position request CPRR is multiplied by the constant 1023 in Block B636 and limited between 0 and 1023 (decimal) in Block B638 to provide a number that can be converted into the analog position request signal. The scaled value of CPRR is then loaded into a memory location labelled RCADA in Block B640 for use in conjunction with the output routine.

At this point the position request for the right turbine and right compressor are ready to be converted and output to the particular actuator. The program continues in Block B643 into another sequence to provide the same scaling for variables associated with the left turbine, left compressor, and injection pump. Block B643 determines the operability of the left turbine actuator by testing bit 14 of the second flag word FWRDL2. The program sets the left actuator position request equal to zero in Block B648 if the bit is present or continues to Block B644 if the bit is not present. In Block B644, bit 6 of the second flag word FWRDL2 is tested for its presence. If it is not present the left turbine position request LTTR which was based on the pressure value PRL is correct and may be used as the position. However, if the bit is present this indicates that the left pressure value PRL is faulty and therefore, the right pressure value PRR should be tested for validity in Block B646. If bit 4, in Block B646 is not present, then the left turbine position request LTTR may be replaced by a valid right turbine requested RTPR in Block B640. However, as previously discussed, if neither it 6 nor bit 4 of the second flag word FWRDL2 are false, then Block B648 replaces the value of LTPR with 0. As is with the case with the right turbine actuator position request, the left turbine position request LTPR cannot take on a value if both pressure sensors signals are determined to be faulty.

When the value of the left turbine position request LTPR (either the original value, the right turbine position request value RTPR, or 0) has been determined, it is multiplied by the scaling constant 1023 in Block B652 and thereafter limited in Block B654 between the values 0 and 1023 (decimal). Thereafter, the memory location labelled LTADA is loaded with the value of the variable LTPR in Block B656. The left compressor position request CPRL is likewise prepared for digital-to-analog conversion by multiplying the value by the scaling constant 1023 in Block B658. CPRL is then limited between 0 and 1023 (decimal) in Block B660 and loaded into the memory location labelled LCADA in Block B662. In block B664, B666, and B668, the same scaling and limiting functions are providing for the injection pump request IPREQ. In the first block, IPREQ is multiplied by the constant 1023 and in the second block, limited between 0 and 1023 (decimal). The third Block B668, loads the scaled and limited value IPREQ into the memory address labelled IPCRDA.

At this point in the program all five position request signals are in condition for being converted to an analog signal and then output to the particular driver. The values of the position requested are stored in the memory locations RTDADA, RCADA, LTADA, LCADA, and IPCRDA, respectively for use in the output routine which transfers the information serially to the serial-to-parallel conversion.

Figure 28:
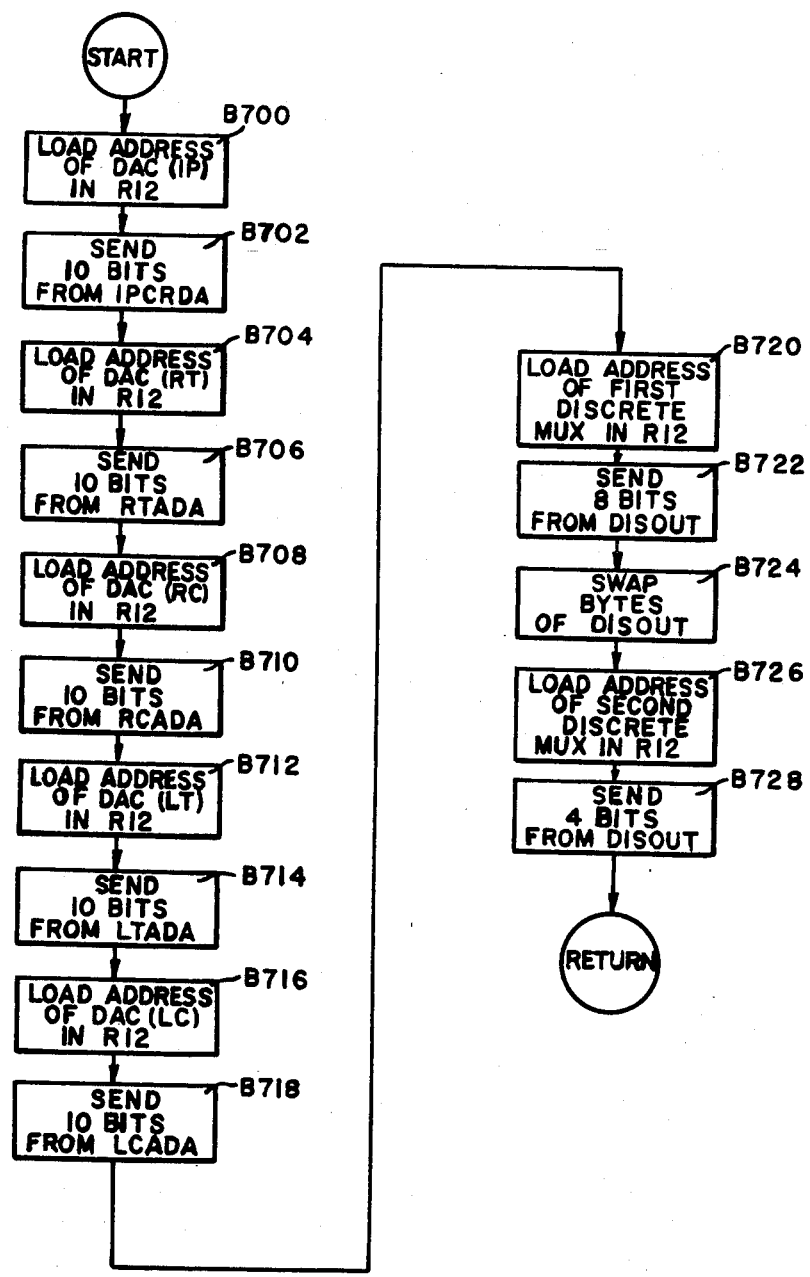
FIG. 28 is a detailed system flow chart of the analog position request and discrete control bit output routine illustrated in FIG. 13.

The output routine (labelled functionally Block B40 and Block B42 In FIG. 13) which outputs both the analog positions requests and the discrete control bits is more fully described in FIG. 28. The routine in FIG. 28 makes use of the serial data transfer capability of the processor in which a register and a special CRU command are used. In Block B700 the address of the digital-to-analog converter for the injection pump is loaded into register 12. This register stores the CRU serial data transfer address designated as the memory location to which transferred data is sent. Thereafter, upon the special command the CRU circuits of the processor sends the first 10 bits of the memory location IRPCRDA serially to the enabled bit positions of the serial-to-parallel converter. This 10-bit data word is converted into an analog signal by the associated digital-to-analog converter.

Similarly, for the right turbine position request, the first bit address of the digital-to-analog converter for the right turbine is loaded into register R12 in Block B704. Thereafter, the CRU circuitry is requested to send 10 bits of data from the memory location RTADA in Block B706. In a similar fashion, the right compressor, left turbine, and left compressor position requests are converted to an analog signals. The first bit addresses of the digital-to-analog converters for the right compressor, left turbine, and left compressor are loaded into the register R12 in Blocks B708, B712, and B716, respectively. After the address of the digital-to-analog converter has been loaded, 10 bits from the particular memory location holding the position request values RCADA, LTADA, and LCADA in Blocks B710, B714 and B718, respectively, are sent to the parallel-to-serial converter.

Identical in function with the analog position requests, the output discrete control bits are provided by the output word DISOUT. Initially, in Block 720 the address of the first bit of the discrete multiplexer is loaded into R12. Then the first 8 bits from the output word DISOUT are set serially to the initial address of the discrete multiplexer and thereafter to the next 8 sequential addresses.

This operation will load the first 8 bits of DISOUT into the respective multiplexer positions to enable the particular driver circuits that the bits are associated with. Thereafter, in Block B724, the bytes of the output word DISOUT are swapped. This positions the last four discrete bits in a position to be output with the output routine. Therefore, the address of the second discrete multiplexer is loaded into R12 by Block B726 and subsequently the four bits sent from the output word DISOUT Block B728.

While the preferred embodiment of the invention has been shown and described, it will be obvious to those skilled in the art that various modifications and the variations may be made thereto without departing from the spirit and scope of the invention as defined hereinafter in the appended claims.

We claim:

1. A turbocharger control system for an engine having a turbocharger with a variable output compressor driven by a variable input turbine, said compressor boosting the pressure of an input manifold of the engine and said turbine being run from the exhaust gases of the engine, said control system comprising:

a computing circuit including input circuit means for receiving input signals representative of operational parameters of said engine, programmable memory means for storing predetermined tabular data and sequential and computational instructions, processor means responsive to said memory means for receiving said input signals and generating a plurality of output signals as a function of said input signals, tabular data, and instructions, and output circuit means for outputing said plurality of output signals, sensor means connected to said engine and said computing circuit for sensing the pressure in said manifold, the temperature of said exhaust gases, the speed of said engine, and position of the throttle, compressor and turbine actuators of said engine and generating signals representative thereof;

and actuator means connected to said output circuit means for controlling the position of said actuators in response to predetermined ones of said output signals, respectively;

said computing circuit, sensor means, and actuator means defining a turbine control loop for regulating the input of the exhaust gasses to the turbine as a function of the error difference between an optimum manifold pressure of the engine and the actual manifold pressure of the engine; and a compressor control loop for regulating the output of airflow from the compressor as a function of the speed and acceleration of the engine, said compressor control loop generating a high position request value as a function of engine speed and providing the most efficient output from the compressor available at a particular engine speed, a low position request value as a function of engine speed and providing the highest output from the compressor available without surge when the engine is accelerating and further including means for detecting an acceleration of the engine and for generating an acceleration signal and means, responsive to said acceleration signal, for switching to said low position request value from said high request value when the engine is accelerating, said actuator means being responsive to said high and low position request values for regulating the output of the compressor.

2. A control system as defined in claim 1, wherein said compressor control loop further includes:

means for transferring from said low request value to said high request value at a controlled rate subsequent to an engine acceleration.

3. A control system as defined in claim 2, wherein said means for transferring further includes:

means for varying said controlled rate.

4. A control system as defined in claim 3, wherein said means for transferring includes:

means for generating a factor (F) based upon said controlled rate and for generating a cofactor (CF) which is calculated as:

$$CF = 1 - F$$

means for multiplying said factor by said high position request value to obtain a first product;

means for multiplying said cofactor by said low position request value to obtain a second product; and means for adding said first product to said second product to obtain a compressor actuator position request.

5. A control system as defined in claim 4, wherein said compressor control loop includes:

means for differencing said compressor actuator position request signal with a signal indicative of the actual position of said compressor actuator; and means for regulating said compressor actuator position in a direction to null said error signal.

6. A control system as defined in claim 5, wherein said factor generating means includes:

means for generating an initial value based upon the speed of the engine, said low and high position request values, and said compressor actuator position request;

means for generating a delta value based upon the speed of the engine, the high position request value, and said compressor actuator position request; and means for incrementing said initial value by said delta value.

7. A control system as defined in claim 6, wherein:

said initial value generating means calculates said initial value (INIT) from the equation:

$$INIT = \frac{ACTREQ - LOREQ}{LHIREQ - ACTREQ}$$

where LOREQ is the low position request value, HIREQ is the high position request value, and ACTREQ is the compressor position request value.

8. A control system as defined in claim 6, wherein:

said delta value generating means generates said delta value as zero if the compressor actuator position request is greater than said high position request value.

9. A control system as defined in claim 6, wherein:

said delta value generating means generates said delta value as a first constant if the engine speed is less than a reference value and as a second constant if the engine speed is greater than or equal to said reference value; said first constant being greater than said second constant thereby causing the transfer from said low position request value to said high position request value in less time than said second constant.

10. A control system as defined in claim 1, wherein said turbine control loop includes:

means for generating a turbine actuator position request signal from said manifold pressure error difference;

means for differencing said turbine actuator position request signal with a signal indicative of the actual position of the turbine actuator and for generating a position error signal from the difference; and means for regulating said turbine actuator position to null said error signal.

11. A control system as defined in claim 10, wherein said turbine actuator position request signal generating means includes a proportional plus integral controller having:
- a proportional loop where said manifold pressure error difference is multiplied by a proportional constant to yield a proportional term;
- an integral loop where said manifold pressure error difference is multiplied by an integral constant to form an integral product and thereafter the product is input to an integrator whose output yields an integral term; and
- means for combining said proportional term and said integral term and for generating said turbine actuator position request signal from the combination.

12. A control system as defined in claim 11, wherein said proportional loop includes:
- a limiter for limiting said proportional term between an upper proportional limit and a lower proportional limit.

13. A control system as defined in claim 12, wherein said proportional loop includes:
- means for generating a maximum pressure limit term as a function of engine speed.

14. A control system as defined in claim 13, wherein: said upper proportional limit is defined as said maximum pressure limit term.

15. A control system as defined in claim 11, wherein said integral loop includes:
- a limiter for limiting said integral term between an upper integral limit and a lower integral limit.

16. A control system as defined in claim 15, wherein said integral loop further includes:
- means for generating said upper integral limit as the difference between a total limit term and said proportional term.

17. A control system as defined in claim 16, wherein said integral loop further includes:
- means for generating said lower integral limit as the difference between zero and said proportional term.

18. A control system as defined in claim 17, wherein said integral loop further includes:
- means for generating a maximum pressure limit term as a function of engine speed.

19. A control system as defined in claim 18, wherein: said total limit term is defined as said maximum pressure limit term.

20. A control system as defined in claim 15, wherein: the integration sum stored in said integrator is reset to the output value of said limiter for each integration period.

21. A control system as defined in claim 1, which further includes:
- means for replacing said turbine position request signal with zero if the speed of the engine is less than an operational speed.

* * * * *